(12) United States Patent
Hunzinger et al.

(10) Patent No.: US 8,964,781 B2
(45) Date of Patent: Feb. 24, 2015

(54) RELAYS IN A MULTIHOP HETEROGENEOUS UMTS WIRELESS COMMUNICATION SYSTEM

(75) Inventors: Jason F. Hunzinger, Escondido, CA (US); Jilel Hou, Carlsbad, CA (US); Rohit Kapoor, San Diego, CA (US); Bibhu P. Mohanty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1109 days.

(21) Appl. No.: 12/612,176

(22) Filed: Nov. 4, 2009

(65) Prior Publication Data

US 2010/0202343 A1 Aug. 12, 2010

Related U.S. Application Data

(60) Provisional application No. 61/111,668, filed on Nov. 5, 2008, provisional application No. 61/111,677, filed on Nov. 5, 2008.

(51) Int. Cl.
*H04J 3/16* (2006.01)
*H04W 16/26* (2009.01)
(Continued)

(52) U.S. Cl.
CPC .............. *H04W 16/26* (2013.01); *H04B 7/155* (2013.01); *H04B 7/2606* (2013.01); *H04W 84/047* (2013.01)
USPC ........... 370/467; 370/236; 370/315; 370/469; 370/536; 370/537

(58) Field of Classification Search
CPC .................................................. H04W 92/045

USPC .................. 370/236, 252, 315, 469, 536, 537; 455/7, 14, 15
See application file for complete search history.

(56) References Cited

U.S. PATENT DOCUMENTS 5,408,679 A * 4/1995 Masuda ....................... 455/11.1
7,321,571 B2 1/2008 Schnack et al.
(Continued)

FOREIGN PATENT DOCUMENTS

CN 1964521 A 5/2007
EP 1755354 A1 2/2007
(Continued)

OTHER PUBLICATIONS

Abdulkareem Adinoyi et al: "Description of identified new relay based radio network deployment concepts and first assessment by comparison against benchmarks of well known1 deployment concepts using enhanced radio interface technologies" Internet Citation, [Online] No. IST-2003-507581, pp. 1-14, XP002522415, 2004.
(Continued)

*Primary Examiner* — Christopher Grey

(57) ABSTRACT

Aspects relate to a Remote NodeB Relay that appears similar to a NodeB, a Radio Network Controller (RNC), and served mobile devices. Also provided is a Super-Light Router Relay that can provide better performance and QoS to served mobile devices while mitigating modifications to mobile devices, NodeBs, or interfaces between RNC and intermediary NodeBs. Aspects also relate to an Internet Protocol (IP) Relay that requires few, if any, modifications to mobile devices, NodeBs, or interfaces between RNC and intermediary NodeBs. Further, changes to an RNC and/or a core network can be mitigated though utilization of a strategic Relay Gateway.

13 Claims, 38 Drawing Sheets

(51) Int. Cl.
  *H04B 7/155* (2006.01)
  *H04B 7/26* (2006.01)
  *H04W 84/04* (2009.01)

(56) References Cited

U.S. PATENT DOCUMENTS

| | | | | |
|---|---|---|---|---|
| 2006/0003696 | A1* | 1/2006 | Diaz Cervera et al. | 455/11.1 |
| 2007/0110005 | A1 | 5/2007 | Jin et al. | |
| 2008/0285501 | A1* | 11/2008 | Zhang et al. | 370/315 |
| 2008/0310338 | A1* | 12/2008 | Charpenter et al. | 370/315 |
| 2011/0170471 | A1* | 7/2011 | Dahlman et al. | 370/312 |

FOREIGN PATENT DOCUMENTS

| | | |
|---|---|---|
| EP | 1881635 A2 | 1/2008 |
| EP | 1912452 A2 | 4/2008 |
| WO | 2007053950 A1 | 5/2007 |

OTHER PUBLICATIONS

International Search Report and Written Opinion—PCT/US2009/063451, International Search Authority—European Patent Office—Mar. 4, 2010.

Boariu A, et al., "DL HARQ for centralized scheduling using data tunneling," IEEE 802.16 Broadband Wireless Access Working Group <http://ieee802.org/16>, U.S.A., IEEE, Sep. 9, 2007, IEEE C802.16j-07/403r3, pp. 1-7, [Jan. 25, 2015], <http://www.ieee802.org/16/relay/contrib/C80216j-07_403r3.doc>,URL, http://www.ieee802.org/16/relay/contrib/C80216j-07_403r3.doc.

Kim C. et al., "Simple Path Management by Encapsulation in MMR system", IEEE 802.16 Broadband Wireless Access Working Group <http://ieee802.org/16>, U.S.A., IEEE, Jan. 8, 2007,IEEE C802.16j-07/168, pp. 0-9, [Jan. 25, 2015], <URL:http://www.ieee802.org/16/relay/contrib/C80216j-07_168.pdf>, URL, http://www.ieee802.org/16/relay/contrib/C80216j-07_168.pdf.

Kim C, et al., "Tunnel Establishment", IEEE 802.16 Broadband Wireless Access Working Group <http://ieee802.org/16>, U.S,A., IEEE, Apr. 24, 2007, IEEE C802.16j-07/264r4, pp. 0-4,[Jan. 25, 2015], <URL:http://www.ieee802.org/16/relay/contrib/C80216j-07_264r4.pdf>, URL, http://www.ieee802.org/16/relay/contrib/C80216j-07_264r4.pdf.

Loa K et al., "Comment on data forwarding schemes for the transparent RS". IEEE 802.16 Broadband Wireless Access Working Group <http://ieee802.org/16>, U.S.A., IEEE, Sep. 10, 2008, IEEE C802.16j-08/147, pp. 1-5, [Jan. 25, 2015], <URL:http://www.ieee802.org/16/relay/contrib/C80216j-08_147.doc >, URL, http://www.ieee802.org/16/relay/contrib/C80216j-08_147.doc.

Tao J.Z., et al., "Relay Tunnel Connection for 802.16j", IEEE 802.16j Mobile Relay Task Group, U.S.A., IEEE, Jan. 16, 2007, IEEE C802.16j-07/115r3, pp. 1-7,[Jan. 25, 2015], <URL:http://www.ieee802.org/16/relay/contrib/C80216j-07_115r3.pdf>, URL, http://www.ieee802.org/16/relay/contrib/C80216j-07_115r3.pdf.

Taiwan Search Report—TW100148451—TIPO—Jan. 21, 2014.

Zhang H. et al., "MMR Protocol Stack and Definition of RS Types", [online], IEEE 802.16 Broadband Wireless Access Working Group, Mar. 5, 2007, IEEE C802.16j-07/096r3, pp. 0-12, URL:http://www.ieee802.org/16/relay/contrib/C80216j-07_096r3.pdf.

Taiwan Search Report—TW098137633—TIPO—Mar. 20, 2013.

* cited by examiner

RELAYS IN A MULTIHOP HETEROGENEOUS UMTS WIRELESS COMMUNICATION SYSTEM

CROSS-REFERENCE

This is an application claiming priority to U.S. Provisional Application No. 61/111,668 entitled "A METHOD FOR BASE STATION RELAYING IN A MULTIHOP HETEROGENEOUS UMTS WIRELESS COMMUNICATION SYSTEM" filed Nov. 5, 2008, and U.S. Provisional Application No. 61/111,677 entitled "A METHOD FOR SUPER-LIGHT ROUTER RELAYING IN A MULTIHOP HETEROGENEOUS UMTS WIRELESS COMMUNICATION SYSTEM" filed Nov. 5, 2008, which are assigned to the assignee hereof and hereby expressly incorporated by reference herein.

BACKGROUND

I. Field

The following description relates generally to wireless communications and more particularly to deployment of wireless relays in a wireless communications network.

II. Background

Wireless communication systems are widely deployed to provide various types of communication and to communicate information regardless of where a user is located (e.g., inside or outside a structure) and whether a user is stationary or moving (e.g., in a vehicle, walking) For example, voice, data, video, and so forth can be provided through wireless communication systems. A typical wireless communication system, or network, can provide multiple users access to one or more shared resources. A system can use a variety of multiple access techniques such as Frequency Division Multiplexing (FDM), Time Division Multiplexing (TDM), Code Division Multiplexing (CDM), Orthogonal Frequency Division Multiplexing (OFDM), 3GPP Long Term Evolution (LTE), and others.

Wireless relays are deployed in wireless networks (such as Universal Mobile Telecommunications System (UMTS) High Speed Packet Access Evolution (HSPA+), for example) to achieve coverage extension and capacity increases at relatively low cost. However, the design of a relay (e.g., a multihop system) presents problems related to inclusion of relays in an air-interface system designed for single-hop. Further, there is motivation to mitigate changes that would require new or modified user equipment (or mobile devices), network elements such as base stations (NodeBs), and interfaces. Further, networking and processing should be harmonized for mobile devices on relays versus mobile devices not on relays.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a Remote NodeB Relay is described wherein there are few, if any, modifications needed to mobile devices. Further, any modifications needed to a Radio Network Controller (RNC) can be limited since the Remote NodeB Relay appears similar to a NodeB from the perspective of the RNC and the served mobile devices. Further, more effective performance and Quality of Service (QoS) can be provided to mobile devices served by the Remote NodeB Relay.

In accordance with another aspect, a Super-Light Router Relay is provided wherein no (or very few) modifications are required to mobile devices, NodeBs, or interfaces between RNC and intermediary NodeBs. Furthermore, better performance and QoS can be provided to mobile devices served by the Super-Light Router Relay.

In yet another aspect, provided is an Internet Protocol (IP) Relay that requires few, if any, modifications to mobile devices, NodeBs, or interfaces between RNC and intermediary NodeBs. Furthermore, in some aspects, changes to an RNC and/or a core network can be mitigated though utilization of a strategic Relay Gateway, even though the infrastructure might not necessarily be all-IP (e.g., NodeBs and RNCs may not include corresponding IP protocol layers).

An aspect relates to a method performed by a relay for routing data in a multihop communication network. Method includes employing a processor executing computer executable instructions stored on a computer readable storage medium to implement the following acts. Method includes communicating with a radio network controller though an intermediary base station on behalf of a mobile device, wherein the communicating is a same signaling method as the signaling method used between radio network controller and intermediary base station. Further, method includes operating as at least one served mobile device, wherein the operating comprises using a first set of lower layer air interface protocol instances for a self-backhaul link between relay and intermediary base station and a second set of lower layer air interface protocol instances for a wireless access link to the at least one served mobile device.

Another aspect relates to a wireless communications apparatus that includes a memory and a processor. Memory retains instructions related to communicating on behalf of a mobile device with a radio network controller through an intermediary base station and operating as at least one served flow using a first set of lower layer air interface protocol instances and a second set of lower layer air interface protocol instances. Processor is coupled to memory and is configured to execute instructions retained in memory.

Another aspect relates to a wireless communications apparatus that includes means for communicating with a radio network controller though an intermediary base station on behalf of a mobile device, wherein the communicating is a same signaling method as the signaling method used between radio network controller and intermediary base station. Wireless communications apparatus also includes means for operating as at least one served mobile device. The operating comprises using a first set of lower layer air interface protocol instances for a self-backhaul link between a relay and intermediary base station and a second set of lower layer air interface protocol instances for a wireless access link to the at least one served mobile device.

In accordance with some aspects, wireless communications apparatus includes means for receiving, from intermediary base station, data for at least one served mobile device and at least a second served mobile device, wherein the data is received as a single flow. Also included can be means for de-multiplexing the data received as the single flow and means for transmitting the data separately to the at least one served mobile device and the at least the second served mobile device. According to some aspects, wireless communications apparatus includes means for receiving data from the at least one served mobile device and the at least a second served mobile device. Also included can be means for multiplexing the data to create an aggregated data and means for transmitting the aggregated data to intermediary base station.

Still another aspect relates to a computer program product comprising a computer readable storage medium. Included in computer readable storage medium is a first set of codes for causing a computer to communicate, on behalf of a mobile device, with a radio network controller through an intermediary base station. Also included in computer readable storage medium are a second set of codes for causing computer to operate as at least one served flow using a first set of lower layer air interface protocol instances and a second set of lower layer air interface protocol instances.

Another aspect relates to at least one processor that includes a first module that communicates on behalf of a mobile device and a second module that operates as at least one served mobile device. At least one processor also includes a third module that multiplexes and demultiplexes received data to or from the at least one served mobile device.

Another related aspect is a method performed by a relay for conveying data in a wireless communications network. Method can include employing a processor executing computer executable instructions stored on a computer readable storage medium to implement the following acts. Method includes serving at least one mobile device over a wireless access link, wherein the serving comprises using a first physical layer, data link layer protocol stack and radio resource control server. Further, method includes connecting to a host radio network controller with a second physical layer, data link layer protocol stack and a radio resource control client, the connecting is over a wireless backhaul link to an intermediary base station. Additionally method includes communicating with host radio network controller with a remote radio network control protocol that is transparent to intermediary base station and mapping data flows between wireless backhaul link and wireless access link with coordination information communicated over remote radio network control protocol.

In a related aspect is a wireless communications apparatus that includes a memory and a processor. Memory retains instructions related to serving at least one mobile device over a wireless access link, connecting to a host radio network controller and communicating with host radio network controller with a remote radio network control protocol that is transparent to an intermediary base station. Memory retains further instructions related to mapping data flows between a wireless backhaul link and wireless access link with coordination information communicated over remote radio network control protocol. Processor is coupled to memory and is configured to execute instructions retained in memory.

Another aspect relates to a wireless communications apparatus that includes means for serving at least one mobile device over a wireless access link though use of a first physical layer, data link layer protocol stack and radio resource control server. Also included in wireless communications apparatus is means for connecting to a host radio network controller with a second physical layer, data link layer protocol stack and a radio resource control client over a wireless backhaul link to an intermediary base station. Also included is means for communicating with host radio network controller with a remote radio network control protocol that is transparent to intermediary base station. Further, wireless communications apparatus includes means for mapping data flows between wireless backhaul link and wireless access link with coordination information communicated over remote radio network control protocol.

In accordance with some aspects, wireless communications apparatus includes means for aggregating a connection to a served mobile device with another connection over a backhaul link and means for exchanging information with host radio network controller to map non-aggregated access links for connections to an aggregated backhaul link. According to some aspects, wireless communications apparatus includes means for restricting at least one served mobile device from being in soft-handoff and a mobile device served by a base station from being in soft-handoff with a relay.

Another aspect relates to a computer program product comprising a computer readable storage medium. Included in computer readable storage medium is a first set of codes for causing a computer to serve at least one mobile device over a wireless access link, wherein the serving comprises using a first physical layer, data link layer protocol stack and radio resource control server. Also included in computer readable storage medium is a second set of codes for causing computer to connect to a host radio network controller with a second physical layer, data link layer protocol stack and a radio resource control client, the connecting is over a wireless backhaul link to an intermediary base station. Also included is a third set of codes for causing computer to communicate with host radio network controller with a remote radio network control protocol that is transparent to intermediary base station. Further, computer readable storage medium includes a fourth set of codes for causing computer to map data flows between wireless backhaul link and wireless access link with coordination information communicated over remote radio network control protocol.

Yet another aspect relates to at least one processor that includes a first module that serves at least one mobile device over a wireless access link using a first physical layer, data link layer protocol stack and radio resource control server. Also included is a second module that connects to a host radio network controller with a second physical layer, data link layer protocol stack and a radio resource control client over a wireless backhaul link to an intermediary base station. Further, the at least one processor includes a third module that communicates with host radio network controller with a remote radio network control protocol that is transparent to intermediary base station and a fourth module that maps data flows between wireless backhaul link and wireless access link with coordination information communicated over remote radio network control protocol.

A further aspect relates to a method performed by a relay for conveying relayed data in a wireless communications network. Method includes employing a processor executing computer executable instructions stored on a computer readable storage medium to implement the following acts. Method includes utilizing base station protocols to communicate as a base station to a served mobile device and mobile device protocols to communicate with an intermediary base station as a mobile device. Further, method includes carrying data transparently across at least one intermediary network element, wherein relay has a relay self-backhaul internet protocol to carry data to or from mobile device and to or from a relay gateway transparently across the at least one intermediary network element.

Another aspect relates to a wireless communications apparatus that includes a memory and a processor. Memory retains instructions related to utilizing base station protocols to communicate as a base station to a served mobile device and mobile device protocols to communicate with an intermediary base station as a mobile device and carrying data transparently across at least one intermediary network element.

Processor is coupled to memory and is configured to execute instructions retained in memory.

Still another aspect relates to a wireless communications apparatus that supports radio access technology interworking. Included in wireless communications apparatus is means for communicating with base station protocols to communicate as a base station to a served mobile device and with mobile device protocols to communicate with an intermediary base station as a mobile device. Wireless communications apparatus also includes means for carrying data transparently across at least one intermediary network element.

Another aspect relates to a computer program product comprising a computer readable storage medium. Included in computer readable storage medium is a first set of codes for causing a computer to communicate, as a base station, with base station protocols and as a mobile device, with mobile device protocols. Also included in computer readable storage medium is a second set of codes for causing computer to relay data transparently across at least one intermediary network element.

A further aspect relates to at least one processor that includes a first module that communicates with base station protocols to communicate as a base station to a served mobile device and with mobile device protocols to communicate with an intermediary base station as a mobile device. Also included is a second module that carries data transparently across at least one intermediary network element.

Another aspect relates to a method performed by a base station for communicating in a multihop communication network. Method includes employing a processor executing computer executable instructions stored on a computer readable storage medium to implement the following acts. Method includes communicating with a radio network controller with a first backhaul communication protocol and with a relay with a second backhaul communication protocol, wherein first backhaul communication protocol includes data between relay and radio network controller. Further, method includes forwarding data for relay on second backhaul communication protocol based on information included in first backhaul communication protocol.

To the accomplishment of the foregoing and related ends, one or more aspects comprise features hereinafter fully described and particularly pointed out in the claims. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
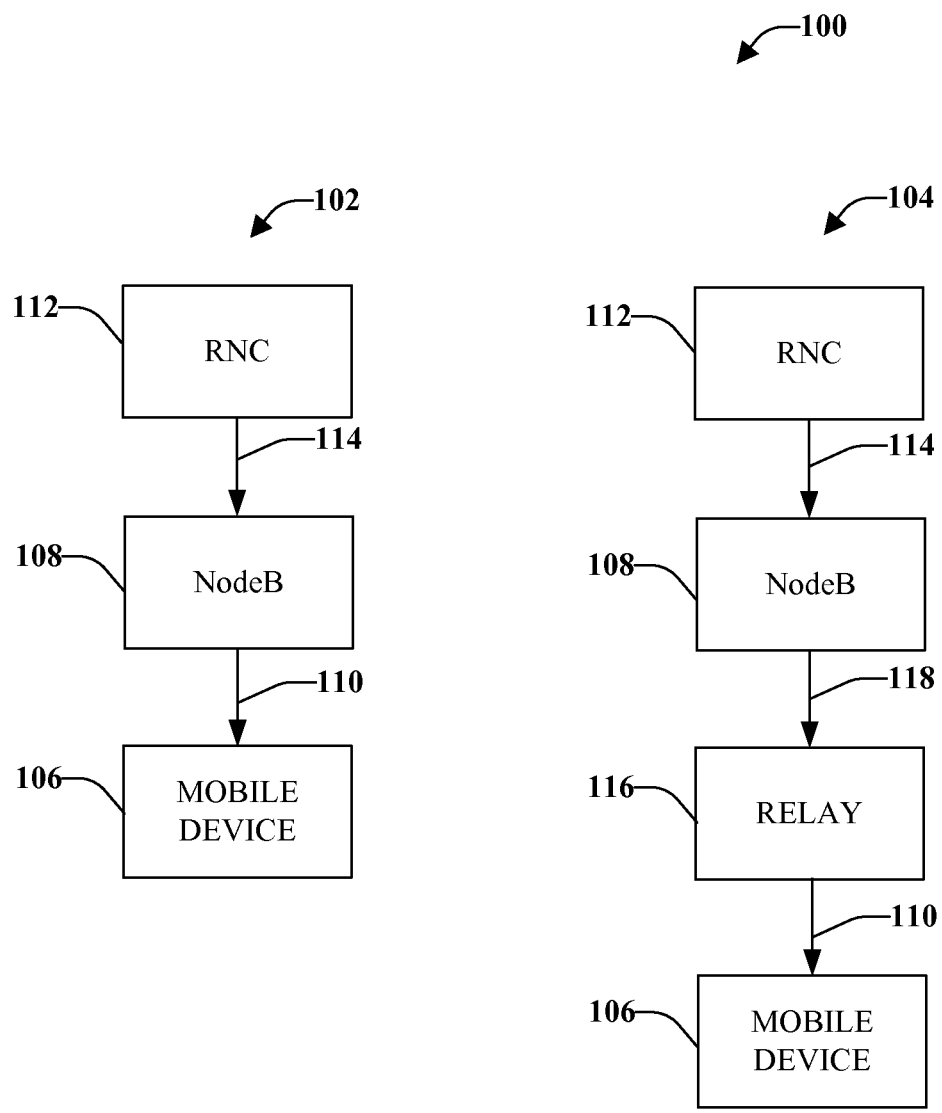
FIG. 1 illustrates a schematic representation of a comparison between a single hop network and a multi-hop network.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. Components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card, and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that various systems may include additional devices, components, modules, and so forth, and/or may not include all devices, components, modules, and so on, discussed in connection with the figures. A combination of these approaches may also be used.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word "exemplary" is intended to present concepts in a concrete manner.

FIG. 1 illustrates a schematic representation 100 of a comparison between a single hop network 102 and a multi-hop network 104. Single-hop network 102 (or single-hop access) includes a mobile device 106 that communicates with a NodeB 108 over a wireless access link 110. Further, NodeB 108 communicates with an RNC 112 over a wired backhaul link 114.

Multi-hop network 104, is similar to single-hop network 102; however, a relay 116 is inserted between mobile device 106 and NodeB 108. Mobile device 106 communicates over wireless access link 110 to relay 116 and relay 116 communicates with NodeB 108 over a wireless backhaul link 118. Further, NodeB 108 communicates with RNC 112 over wireless backhaul link 114. Backhaul link and access link are different links over different mediums (e.g., different carrier, time (e.g., retransmission slots), spatial dimension, and so on).

The deployment of relays (which can be inexpensive) in wireless networks to achieve wireless multi-hoping within the domain of the air-interface has the potential to: (1) extend coverage to holes or poor coverage areas (e.g., pockets of a geographic area that are without coverage), (2) increase capacity, by cell splitting gain, and (3) offload resource requirements from base stations. While pico cells or femto cells (e.g., home NodeBs) may be motivated by similar goals, such cells generally require either wired backhaul (such as fiber, cable, or digital subscriber line (DSL)) or wireless backhaul over a different wireless technology (e.g., microwave). Femto cells may also have restrictions on which mobile devices can associate with the femto cells and thus have additional interference issues.

Repeaters are sometimes considered a sub-class of relays. However, repeaters generally amplify and forward an "unclean" copy of signals. Therefore, relays can amplify interference and noise as well as the useful signal. Further, relays may be unnecessarily redundant. This low protocol layer level of repeaters also means the repeaters generally do not take advantage of different medium and link conditions (channel quality) on different hops. Furthermore, emergency or (E-911) capabilities are important and repeaters or low-layer-only devices may present a challenge for identifying user location based on serving node location.

Relays may act similar to base stations (NodeBs), from the point of view of mobile devices, although typically with smaller coverage areas than micro cells or macro cells (e.g., similar to pico cells or femto cells). In fact, it can be beneficial if mobiles devices do not have to knowingly distinguish between a relay and a NodeB at all, in order to support legacy mobile devices (e.g., no changes needed to existing mobile devices). However, while relays are similar to NodeBs, the relays can "self-backhaul". "Self-backhaul" refers to relay 116 connecting through wireless backhaul link 118 to (regular) NodeB 108 and NodeB 108 connecting to RNC 112, as illustrated in FIG. 1. Relays thus can mitigate issues associated with wiring backhaul to the relay site.

However, these characteristics of relays result in at least two issues. First, the backhaul payload is carried part-way over a wireless link (with wireless characteristics) instead of only a wired link. Second, relays, which act as NodeBs for mobile devices and as mobile devices for their self-backhaul, are inserted (merged) into a single-hop access network architecture.

These two issues each present a number of complex and inter-related challenges. For example, wired backhauls for UMTS can be carried over an Iub interface between RNC 112 and NodeB 108. An Iub link can carry such information and signaling as: operation and maintenance (O&M), handover, resource allocation, transport traffic management, timing and synchronization, NodeB power control, admission control, measurement and reporting, and other information.

The Iub interface can be carried by Asynchronous Transfer Mode (ATM) adaptation protocols and ATM MAC (Medium Access Control) layers or User Datagram Protocol/Internet Protocol (UDP/IP) protocols. However, while there may be standards for the backhaul, these standards may not be strictly adhered to (in contrast to protocols between other network elements). Additionally, signaling from network control points, such as RNC to the relay (not to mobile devices served by relay), may add additional overhead for the backhaul to carry (e.g., in addition to user data and user control signaling). For example, Iub overhead from RNC 112 to NodeB 108 may be as much as around 10% for NodeB control and an additional 10% (more or less) for mobile devices. In addition, RNC 112 may interface with many NodeBs (although only one is illustrated for purposes of simplicity). Finally, when relay 116 uses the same technology and same signaling space as mobile devices, relay 116 is in effect sharing the backhaul with other mobile devices (typically those not served by relay 116 but by neighboring NodeB (not shown) or host-NodeB 108), but potentially increasing latency for those mobile devices served by relay 116 due to additional hop(s). In addition, prioritization and Quality of Service (QoS) should be maintained not only for relay versus actual mobile devices served by intermediary NodeB but also between mobile devices served by relay.

The design of an IP Relay is even further complicated for UMTS HSPA+because user IP protocols are above the NodeB 108, RNC 112 (access stratum), and even above the Serving GPRS (General Packet Radio Service) Support Node (SGSN). In UMTS HSPA+, the GPRS Gateway Support Node (GGSN) (core network) is the IP protocol end-point. Inserting a relay with upper layers up to IP or higher into the chain of connections between NodeB 108 and mobile device 106 changes the protocol scenario. This is because other intermediary nodes in the UTRAN (Universal Terrestrial Radio Access Network) do not have the corresponding IP layers and mobile devices on relays may have to pass through an additional Relay Gateway inserted elsewhere in the chain of connections (e.g. in the core network). However, both protocol configurations should be supported in order for the system to support mobile devices on relays and mobile devices not on relays.

In accordance with some aspects, relay 116 can be configured to appear as a NodeB to RNC 112 and to mobile devices 106 and to appear as a mobile device to an intermediary NodeB 108. In accordance with these aspects, relay 116 will be referred to herein as Remote NodeB Relay. In accordance with these aspects, RNC 112 delivers user data and signaling as well as signaling for Remote NodeB Relay through intermediary NodeB. Remote NodeB Relay has NodeB functionality layers, however, there is additional protocol to carry the backhaul over/past the hosting NodeB and to (modified) RNC. There are three main aspects disclosed herein related to a Remote NodeB Relay that provides the functionality of a NodeB from the access link perspective. These three aspects of a Remote NodeB Relay relate to different aspects utilized to interface relay with RNC and/or NodeB. These three aspects are referred to as "RNC Pseudo-Transparent", "RNC Agent", and "RNC Remote Signaling", which will now be described in further detail.

A first aspect of Remote NodeB Relay is referred to as "RNC Pseudo-Transparent". In the RNC Pseudo-Transparent aspect, a Relay to RNC interface may be the same as a NodeB to RNC interface but tunneled over the intermediary NodeB to RNC interface (e.g. Iub tunneled over Iub). This aspect will be described in further detail with reference to FIG. 2, FIG. 3, and FIG. 4 below.

Figure 2:
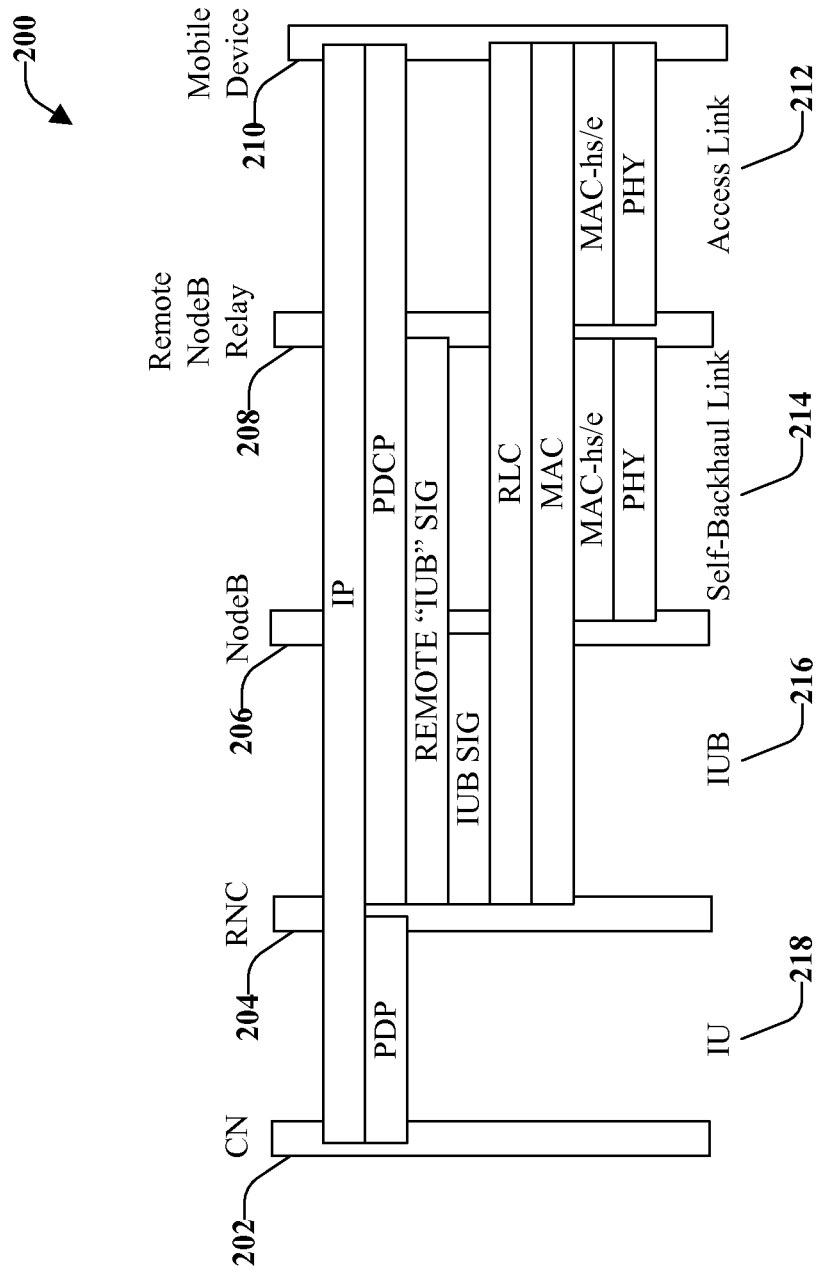
FIG. 2 illustrates a schematic representation of protocol end-points for RNC pseudo-transparent aspects disclosed herein.
Figure 3:
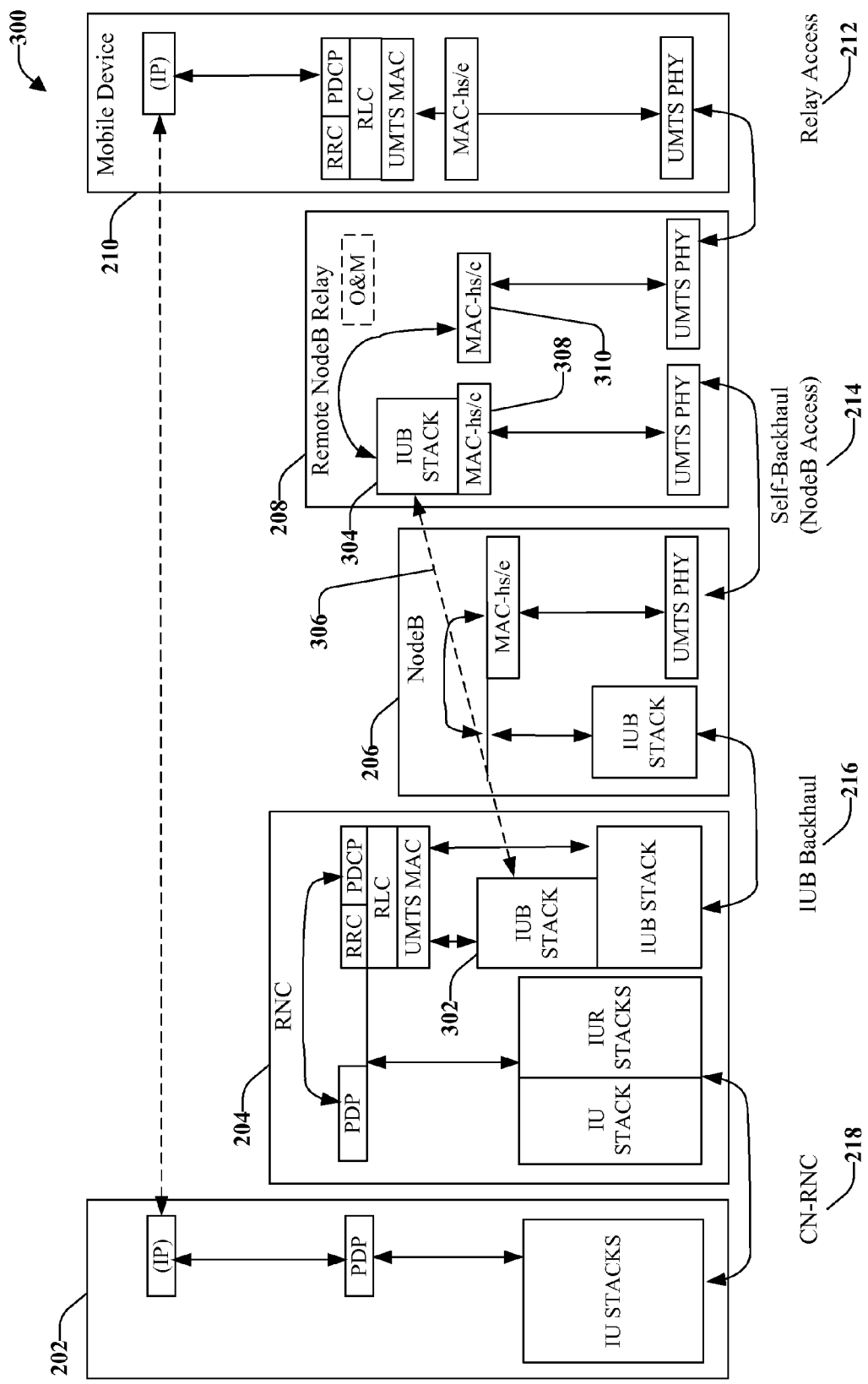
FIG. 3 illustrates a protocol architecture for an RNC pseudo-transparent aspect, as discussed herein.

FIG. 2 illustrates a schematic representation 200 of protocol end-points for RNC pseudo-transparent aspects disclosed herein. FIG. 3 illustrates a protocol architecture 300 for RNC pseudo-transparent aspects, as discussed herein. Illustrated are blocks that represent a core network (CN 202), an RNC 204, a NodeB 206, a Remote NodeB Relay 208, and a mobile device 210. Mobile device 210 communicates with Remote NodeB Relay 208 over an Access Link 212, which can be a wireless access link. Remote NodeB Relay 208 communicates with NodeB 206 over a Self-Backhaul Link 214, which can be wireless. NodeB 206 communicates with RNC 204 over an Iub Interface 216, which can be wired or wireless. RNC 204 communicates with CN 202 over an Iu interface 218. RNC 204 treats an interface 302 to Remote NodeB Relay 208 similar to interface (Iub Interface 216) to NodeB 206. Thus, RNC 204 treats interface 302 as an embedded Iub interface with a full Iub stack protocol 304 (such as asynchronous transfer mode (ATM) or user datagram protocol/Internet protocol (UDP/IP)).

Interface 306 between Remote NodeB Relay 208 and RNC 204 may be the same as a NodeB 206 to RNC 204 interface (e.g., Iub interface 216). However, interface 306 is tunneled over intermediary NodeB 206 to RNC 204 interface (e.g. Iub tunneled over Iub). The term "tunneling" means a first protocol (e.g. Iub) is treated as data as far as a second protocol (e.g. Iub) is concerned. Thus, as illustrated, the second protocol distinguishes only control information for NodeB 206 to RNC 204 interface (e.g., Iub interface 216) and what it views only as data (which is actually embedded control and data for Remote NodeB Relay 208 to RNC 204 interface). Since the first protocol may distinguish control and actual data information, the end-point (Remote NodeB Relay 208) is able to separate control and actual data once this embedded portion is extracted by the second protocol.

However, since this interface must be communicated over the first hop to the intermediary NodeB 206, the protocols may be passed through the Iub stack for that link. This results in overhead. Nevertheless, only one set of Iub stack protocols are passed over the self-backhaul link 214 since NodeB 206 is the end-point for the underlying Iub backhaul stack.

An advantage of the disclosed architecture is that Remote NodeB Relay 208 appears the same as NodeB 206 from the interface perspective. Another advantage is that Remote NodeB Relay 208 has a distinct NodeB identity and thus can accommodate E-911 emergency services. Depending on whether aggregation (whether relay acts as one mobile device or multiple mobile devices (per mobile device served by relay) is used or is not used (which will be discussed in further detail below), the architecture may also be completely transparent to NodeBs (requiring no NodeB modifications). Furthermore, RNC 204 modifications can be encapsulated into an additional instance(s) of already supported common protocol stacks.

Figure 4:
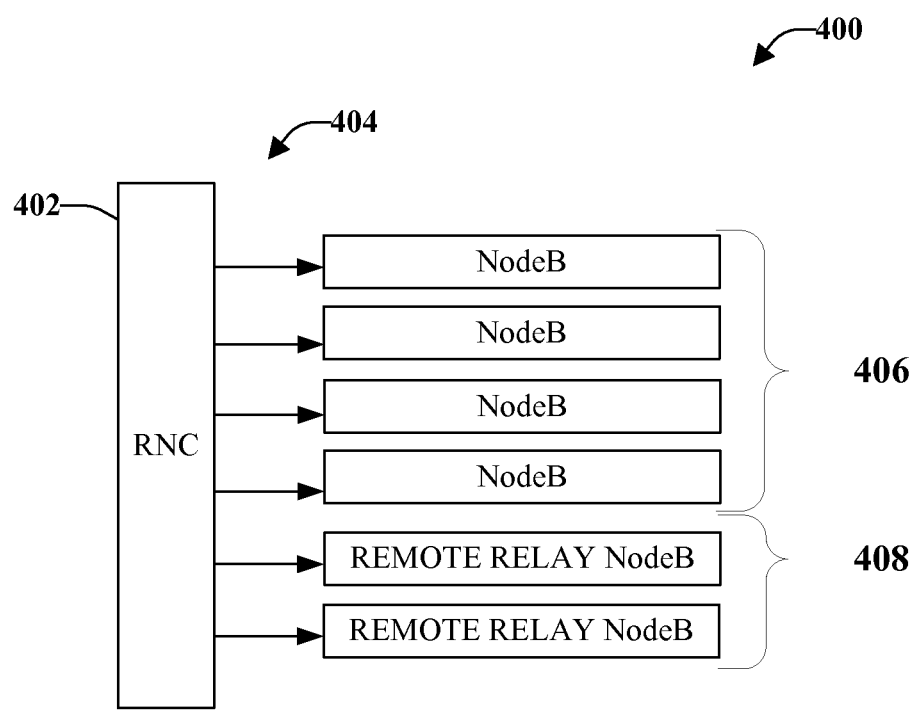
FIG. 4 illustrates an abstraction (logical) view of RNC Iub Interfaces, according to an aspect.

From a conceptual view, the connection appears as in FIG. 4, which illustrates an abstraction (logical) view of RNC Iub Interfaces 400, according to an aspect. Illustrated are an RNC 402 with Iub Interfaces 404 to multiple NodeBs 406 and multiple Remote Relay NodeBs 408. It should be noted that the number of NodeBs 406 and Remote Relay NodeBs 408 can be fewer or more than those shown, as this figure is for example purposes only.

Figure 5:
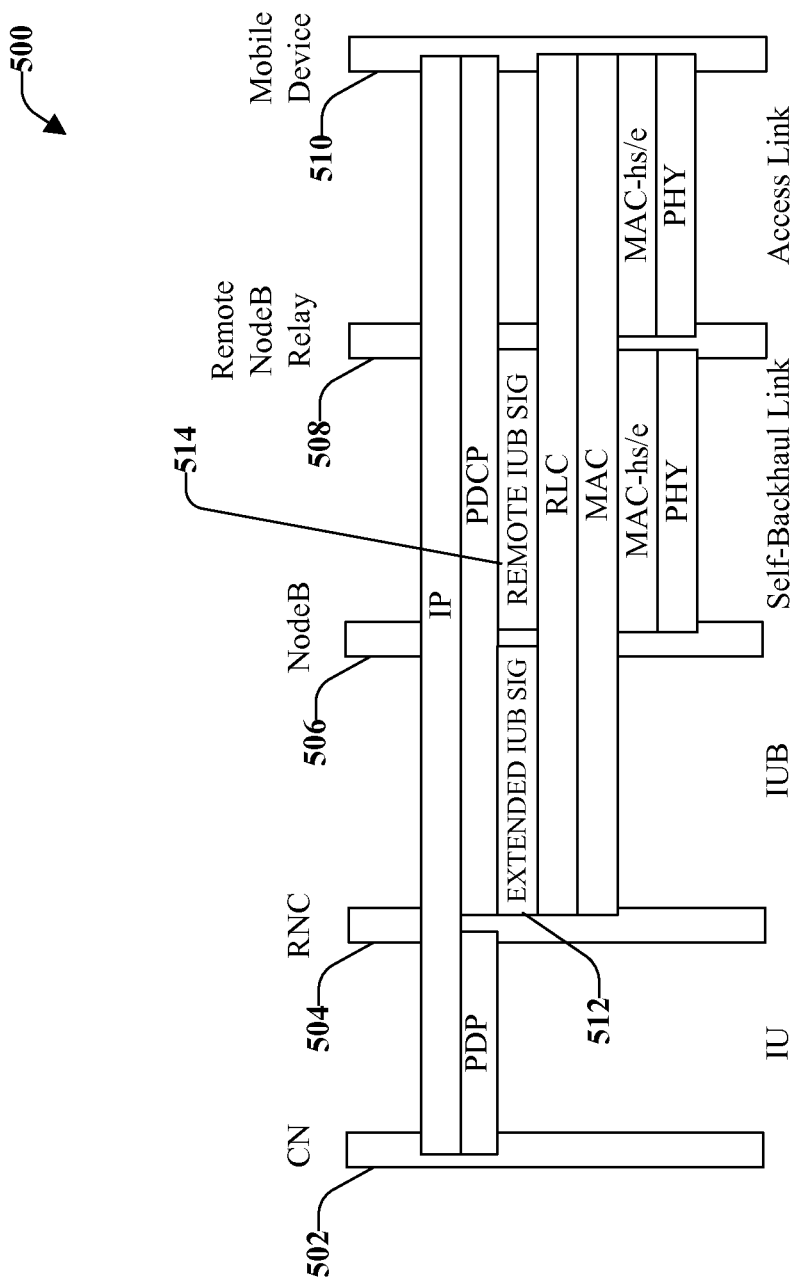
FIG. 5 illustrates a schematic representation of air-interface protocol end-points for an RNC Agent, according to an aspect.
Figure 6:
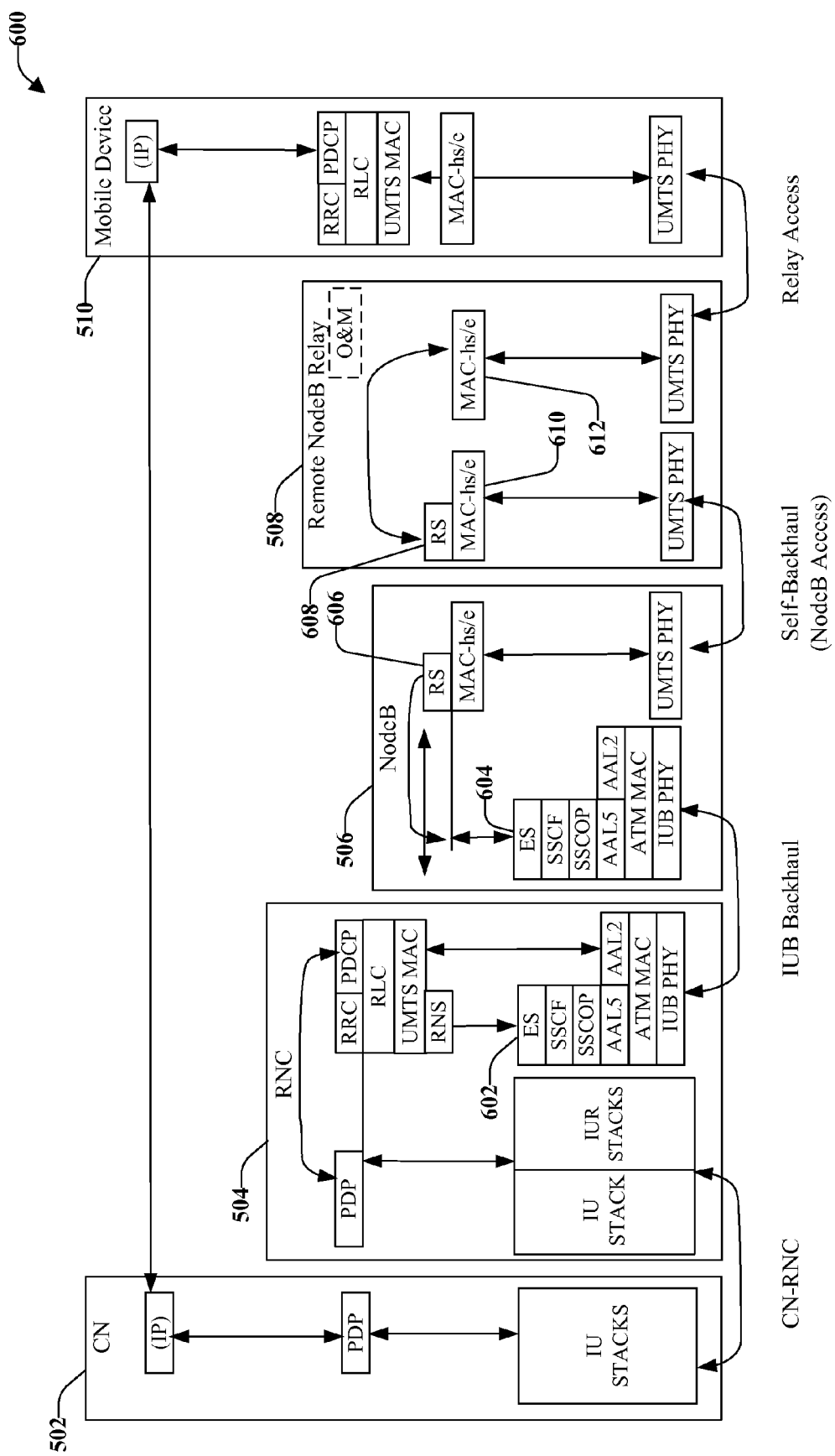
FIG. 6 illustrates a protocol architecture for an RNC Agent, according to an aspect.

A second aspect of Remote NodeB Relay, referred to as "RNC Agent", includes a relay to RNC interface that can be controlled through an interface between intermediary NodeB and RNC where NodeB, in turn, controls relay. This is similar to the RNC controlling a NodeB (e.g., as an agent of the RNC). In the RNC Agent aspect, hosting NodeB controls Remote NodeB Relay as if Remote NodeB Relay is part of hosting NodeB. FIG. 5 illustrates a schematic representation 500 of air-interface protocol end-points for RNC Agent, according to an aspect. FIG. 6 illustrates a protocol architecture 600 for RNC Agent, according to an aspect.

Illustrated are representations of CN 502, RNC 504, NodeB 506, Remote NodeB Relay 508, and mobile device 510. In this aspect, Remote NodeB Relay 508 is controlled with signaling from NodeB 506, which is in turn controlled by RNC 504. NodeB 506 is an agent for RNC 504, acting on behalf of RNC 504, to instruct Remote NodeB Relay 508 and to deliver user data and signaling to Remote NodeB Relay 508. In this aspect, signaling to NodeB 506 is extended. This Extended Signaling (ES) service (Extended Iub Sig 512 (FIG. 5) and ES 602, 604 (FIG. 6)) at RNC 504 allows Remote NodeB Signaling (RNS) function at RNC 504 to instruct NodeB 506 on how to control Remote NodeB Relay 508. NodeB Extended Signaling (ES) client receives the instructions or notifications and may respond with reports or indications. NodeB 506 uses the received information to control Remote NodeB Relay 508 using a Relay Signaling (RS) service (Remote Iub Sig 514 (FIG. 5) and RS 606, 608 (FIG. 6)). The RS 606, 608 can also be used for various functions such as measurement and reporting by Remote NodeB Relay 508. Remote NodeB Relay 508 has a Relay Signaling client (RS 608) which communicates with RS service (RS 606) at NodeB 506 and performs the functions typical for a NodeB.

As illustrated in FIG. 6 the RNC Agent aspect can include modifications and/or extensions to the Iub signaling to accommodate control of Remote NodeB Relay 508 by the intermediary NodeB on behalf of RNC 504 and reporting from Remote NodeB Relay 508. NodeB 506 (and thus Extended Signaling (ES)) should be able to distinguish data for mobile devices (e.g., mobile device 510) versus signaling for Remote NodeB Relay 508 so that NodeB 506 can use the Remote Signaling (RS) for signaling Remote NodeB Relay 508 and bypass this for user data and user signaling (e.g., for mobile device 510).

For example, not only would NodeB 506 need to know about mobile devices being served by Remote NodeB Relay 508, so that user data and control (e.g., Radio Resource Control (RRC) signaling, System Information Blocks (SIBs), and so forth) can be forwarded, but also about the configuration of relay as a remote NodeB (see above list of features for which a subset may be required between NodeB 506 and Remote NodeB Relay 508). In accordance with some aspects, some features may not be supported at Remote NodeB Relay 508, such as random access or call setup. In this case, mobile devices may be restricted from using these features on Remote NodeB Relay 508 or the communications may be forwarded to NodeB 506 or RNC 504 to handle.

It should be noted that in accordance with the RNC Agent aspect there might need to be modifications on NodeB 506 to add the new Extended Signaling (ES 604) client and to add the Relay Signaling (RS 606) service. In accordance with some aspects, ES 604 and RS 606 are combined into one function. Thus, Remote NodeB Relay 508 is not transparent to NodeB 506 for the RNC Agent aspect. However, Remote NodeB Relay 508 can be transparent from the perspective of mobile device(s) 510.

A third aspect of the Remote NodeB Relay is referred to as "RNC Remote Signaling". In this aspect, Relay to RNC interface may be the same as the interface (Iub) protocol level as NodeB to RNC interface but not duplicative of the underlying backhaul protocols (Iub thin signaling over Iub).

Figure 7:
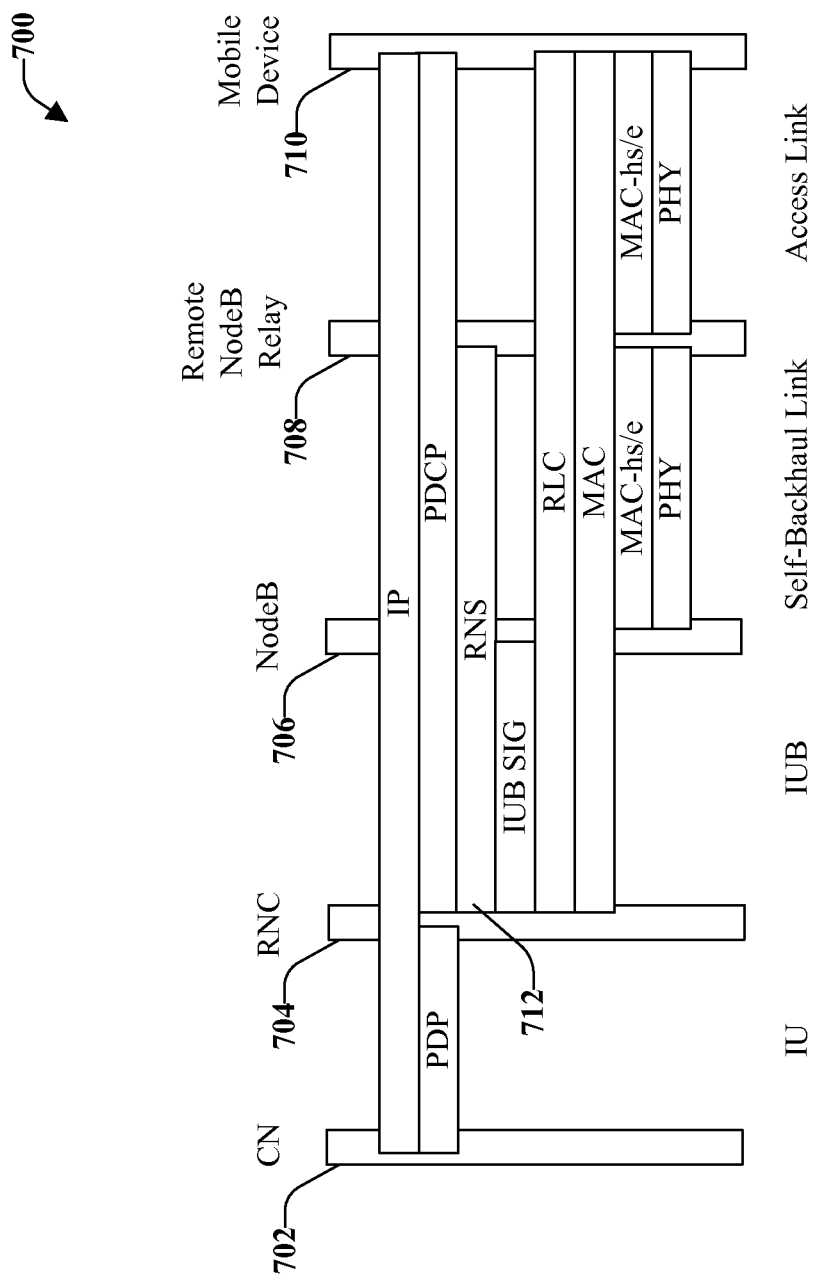
FIG. 7 illustrates a schematic representation of protocol end-points for RNC remote signaling, according to an aspect.
Figure 8:
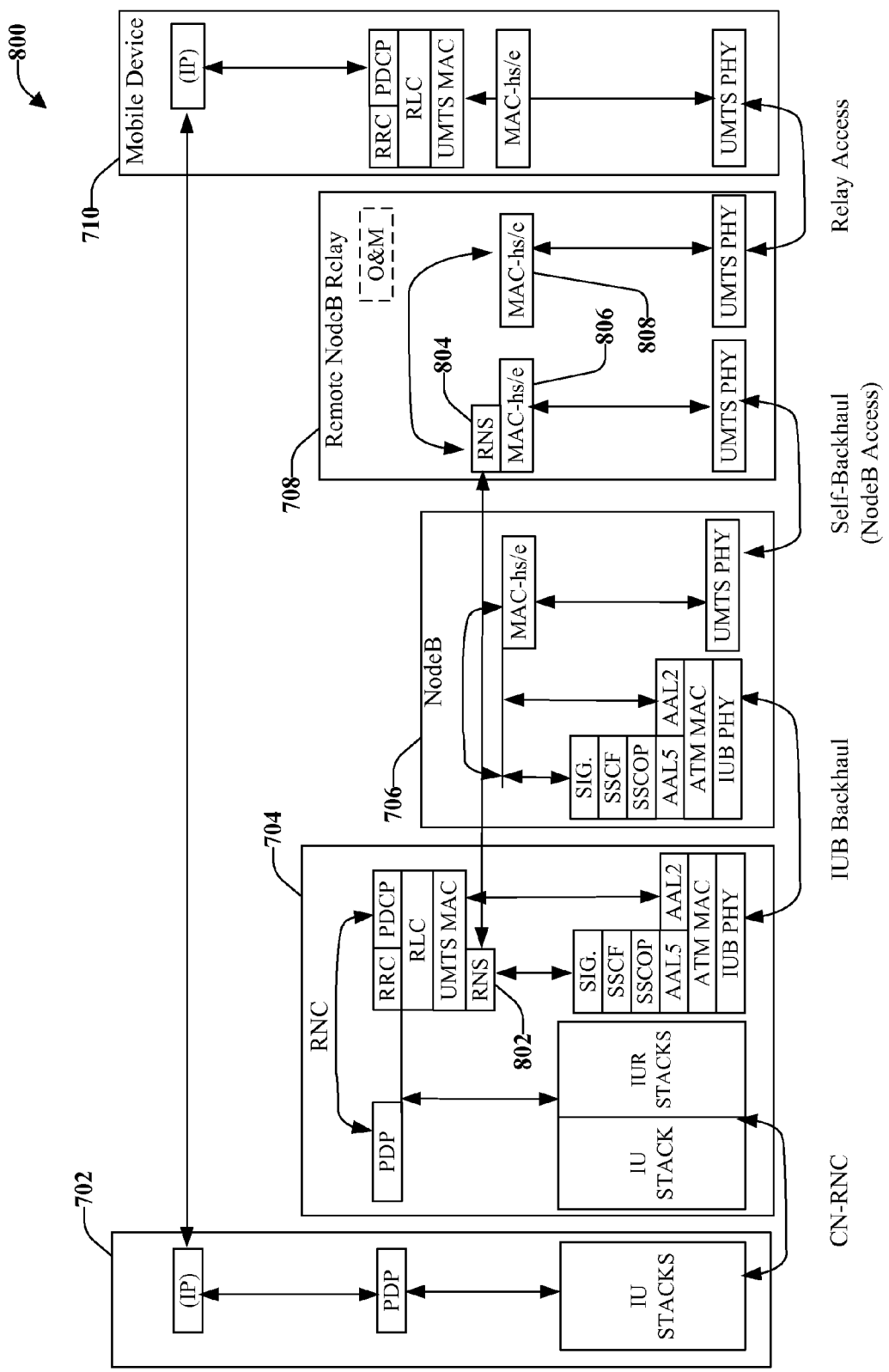
FIG. 8 illustrates a protocol architecture for RNC Remote Signaling, according to an aspect.

FIG. 7 illustrates a schematic representation 700 of protocol end-points for RNC remote signaling, according to an aspect and FIG. 8 illustrates a protocol architecture 800 for RNC Remote Signaling, according to an aspect. Illustrated by blocks are CN 702, RNC 704, NodeB 706, Remote NodeB Relay 708, and mobile device 710. For the RNC Remote Signaling aspect, RNC 704 additions include only a signaling and control layer called the Remote NodeB Signaling (RNS 712 (FIG. 7) and RNS 802 (FIG. 8)) service (not an entire embedded Iub stack). This service (e.g., RNS 802) interfaces with a counterpart RNS client 804 at Remote NodeB Relay 708. RNS 712, 802, 804 may use the same messaging as Iub but does not require the underlying link, medium access, or physical layer protocols because RNS 712, 802, 804 is carried over the Iub stack for the first hop and the air-interface stack for the second hop. Thus, the RNC Remote Signaling aspect has less overhead than the RNC Pseudo-Transparent aspect (discussed above) and may be less complex than the RNC Agent aspect (discussed above). However, the RNC Remote Signaling aspect may require modification to be flexible and efficiently carried over with the lower-layer air-interface stack as well the Iub stack.

Further, depending on whether aggregation is used or is not used (as will be discussed below), the architecture 800 (e.g., RNS 712, 802, 804) may also be transparent to NodeBs (requiring no NodeB modifications), which is an advantage relative to the RNC Agent aspect. Transparency to NodeB 706, is an advantage. For example, there can be one RNC 704 and hundreds of NodeBs (only one of which is shown). Therefore, if RNS 712, 802, 804 is transparent to the hundreds of NodeBs, it means that there are no changes needed to the hundreds of NodeBs. Furthermore, RNC modifications are encapsulated into an additional inserted layer (RNS 712 shown in FIG. 7).

RNS 712 distinguishes user data and signaling (from RNC 704 destined to the user (or mobile device 710)) from relay signaling (from RNC 704 destined to Remote NodeB Relay 708). RNS does not necessarily have to implement all signaling supported by a typical NodeB since Remote NodeB Relay 708 may have limited functionality compared to a NodeB. For example, Remote NodeB Relay 708 may not transmit all overhead channels. However, the RNS may support additional features unavailable in a NodeB, such as multiplexing and de-multiplexing functions to aggregate users over the self-backhaul and Iub Backhaul. In other words, RNC 704 and Remote NodeB Relay 708 coordinate to achieve aggregation transparently (or unbeknownst) to NodeB 706.

Modifications to NodeB 706 may be limited (or there may be no modifications needed) for RNC Remote Signaling. Further, the overhead is limited or minimal, and Remote NodeB Relay 708 can be efficiently and effectively controlled by RNC 704.

Alternatively, there are variations between the RNC Pseudo-Transparent aspect and the RNC Remote Signaling aspect with a subset of the stack components. Additional protocols add overhead, but can benefit RNC to Relay connection since it is carried over a wireless link instead of a wired link. For example, a wireless link layer retransmission capability can be beneficial to recover from lost signaling intended for relay 708 itself.

In the three aspects described above (RNC Pseudo-Transparent, RNC Agent, and RNC Remote Signaling), relay 208, 508, 708 has at least one MAC (MAC-hs/e 308, 610, 806) instance for the backhaul and one instance (MAC-hs/e 310, 612, 808) for the access link per mobile device (only one of which is shown). This allows the relay 208, 508, 708 to take advantage of potentially different conditions on the backhaul link's wireless medium and the access link's wireless medium. Furthermore, it allows relay 208, 508, 708 to do more than mere repeating of MAC frames (although this can be done). In other words, relay 208, 508, 708 can select a MAC frame format for access link (or backhaul link) suitable for that link, according to a channel quality indication (or the like) for that link. Furthermore, this separation of links at the lower-MAC level presents the possibility for aggregating mobile device traffic over the backhaul. Thus a single MAC frame on the backhaul may hold data for multiple mobile devices. relay 208, 508, 708 de-multiplexes the data and creates separate MAC frames for mobile devices on the access link. In reverse, relay 208, 508, 708 multiplexes data from frames received from mobile devices into one frame for the backhaul.

Figure 9:
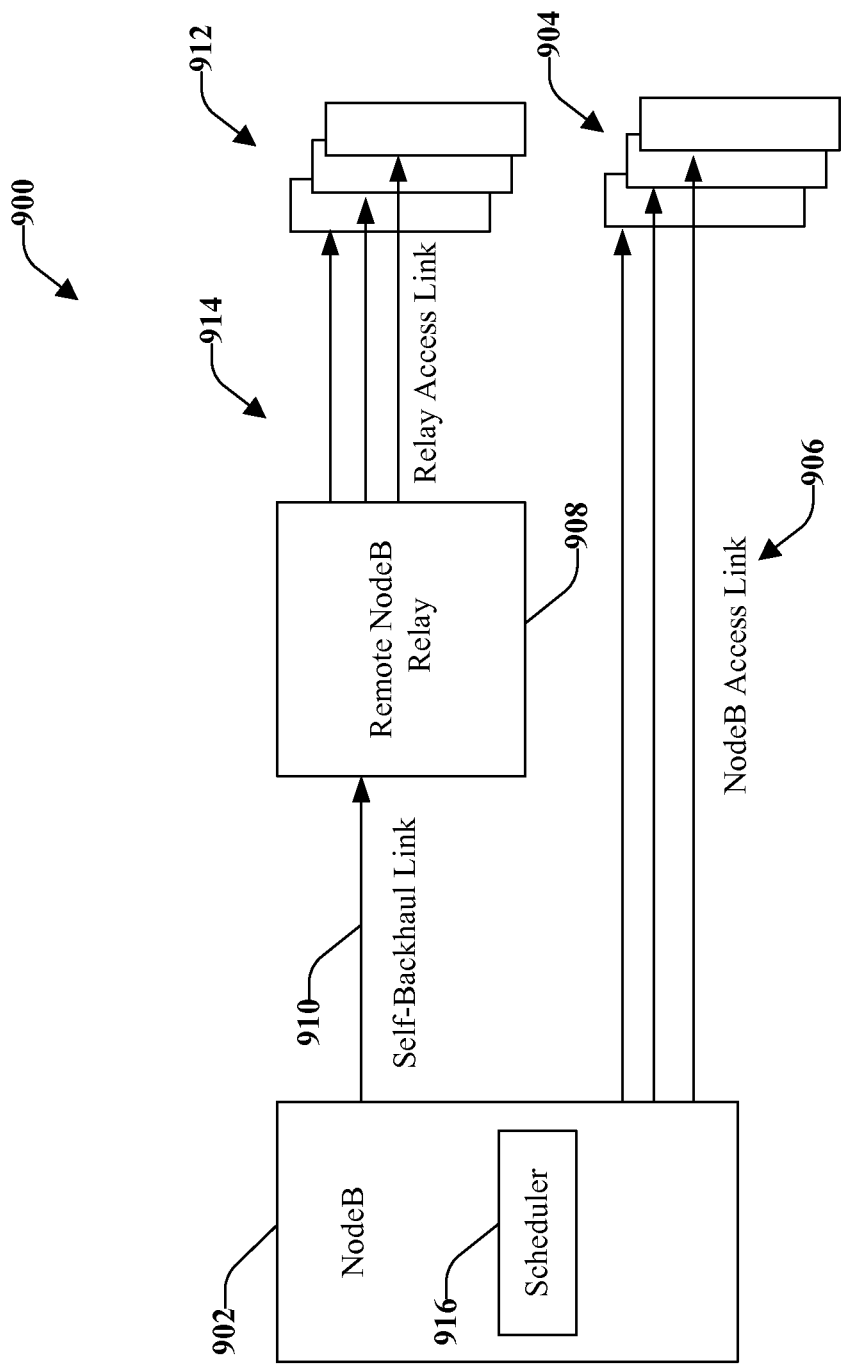
FIG. 9 illustrates self-backhaul aggregation, according to an aspect.

FIG. 9 illustrates self-backhaul aggregation 900, according to an aspect. Aggregation relates to the situation where there are multiple mobile devices (e.g., n mobile devices) being served by Remote NodeB Relay. On an uplink (e.g., communication from mobile device), each mobile device can be transmitting a pilot. For aggregation, Remote NodeB Relay does not operate as n mobile device instead, Remote NodeB Relay operates as a single mobile device and transmits a single pilot. Aggregation can be at an IP level, wherein an IP packet can contain IP packets from multiple mobile devices and the IP packet is de-aggregated later (e.g., at a gateway or RNC).

Illustrated are representations of a NodeB 902 and a first set of mobile devices 904 served directly by NodeB 902 over NodeB Access Links 906, which can be wireless. Also illustrated is a Remote NodeB Relay 908 that communicates with NodeB 902 over a Self-Backhaul Link 910, which can be wireless. In this figure, Remote NodeB Relay 908 is communicating with a second set of mobile devices 912 over Relay Access Links 914, which may be wireless.

In accordance with the illustrated aspect, mobile device traffic can be aggregated on the backhaul link(s). In other words, instead of relay 908 acting as one mobile device per mobile device it serves (or one backhaul flow per mobile device access link flow), the Relay to NodeB or Relay to RNC links can be combined into one connection or flow. NodeB 902 can receive un-aggregated traffic from the RNC (not shown), buffer the individual traffic flows in NodeB 902, and then aggregate on self-backhaul link 910.

Figure 10:
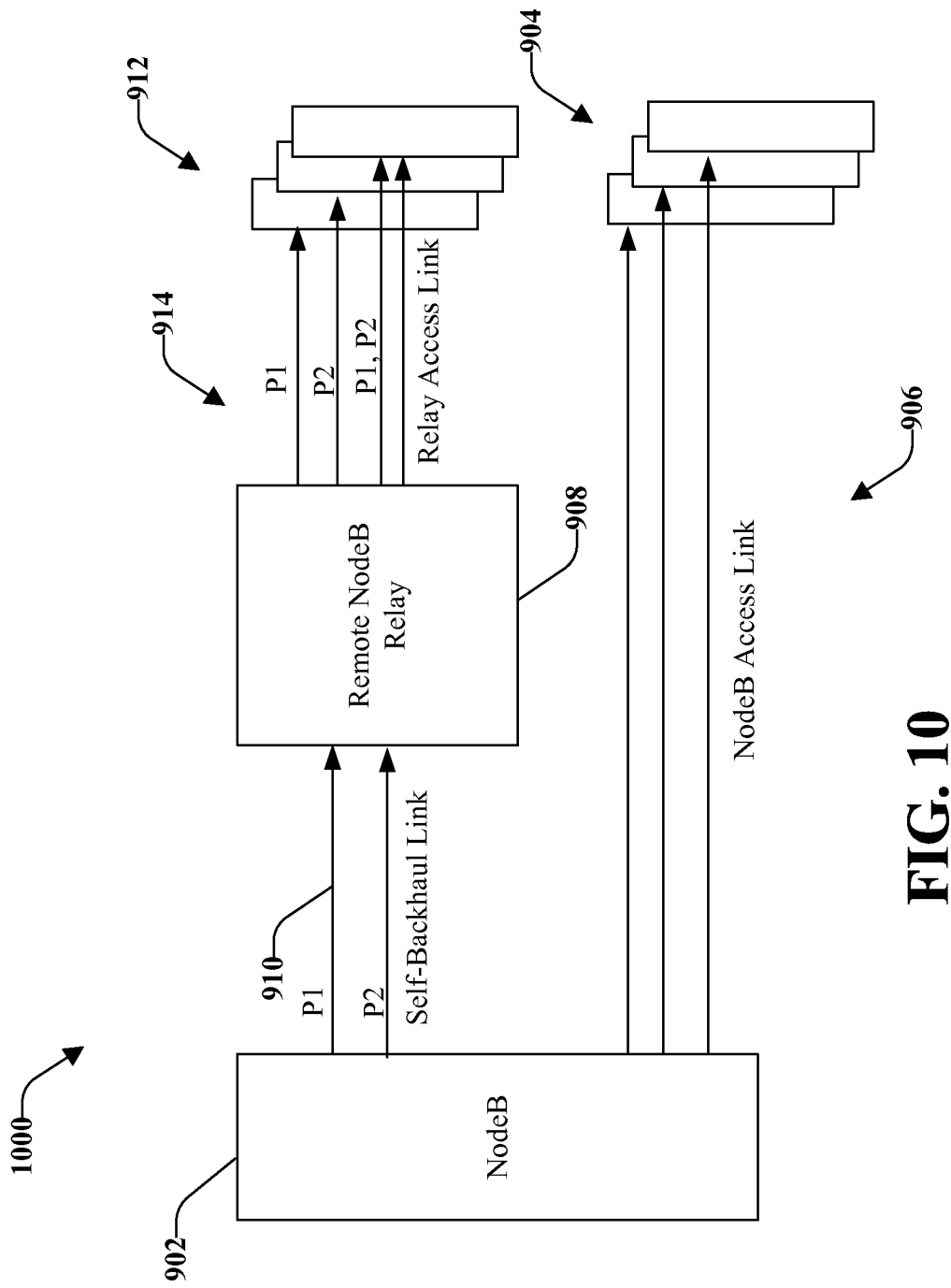
FIG. 10 illustrates a self-backhaul aggregation per priority flow, according to an aspect.

However, NodeB 902 may then require knowledge of the content of the aggregated frames in order to properly prioritize the aggregated self-backhaul link 910 relative to mobile devices 904 served directly by NodeB 902. This problem can be partially addressed by only aggregating traffic of like priority. FIG. 10 illustrates a self-backhaul aggregation per priority flow 1000, according to an aspect. Having an aggregated flow per priority in the union or priority levels of relay served mobile device 912 flows. Relay 908 can use signaling from the network to know how to multiplex or de-multiplex each flow from NodeB 902. This signaling can be embedded in the frames within the flow (e.g., addressing the mobile device (flow)).

However, if NodeB 902 uses a scheduling algorithm proportionally fair for users (flows), then a scheduler 916 might not take into account the fact that the aggregated flows represent multiple users or the ratio of users on relay 908 to those on the direct NodeB Access Link 906. Thus, NodeB 902 may be modified to receive control information from relay 908 (or from RNC) indicating the prioritization and scheduling preference to give to the relay self-backhaul link 910 (and properly account for billing of users). This may be accomplished by modifying the NodeB scheduler algorithm to bias relay 908 according to the number or priority of mobile devices (flows) on relay 908 whose self-backhaul is through that intermediate NodeB 902. Thus, Remote NodeB Relay 908 architecture may have NodeB modifications for efficient, high performance operation but may be deployed without aggregation or without NodeB changes at the tradeoff of performance, functionality, or efficiency. In the case without aggregation, the flow for each user (e.g., mobile device) can be mapped to a separate MAC-d flow on the backhaul so that the NodeB scheduler 916 does not need to know which user (e.g., mobile device) the flow is destined for in order to schedule the transmission to relay 908.

With a Remote NodeB Relay 908, there are at least two possible approaches for aggregation: (1) no changes to Node B or (2) changes to Node B. Without making changes to NodeB, aggregation may be achieved in this architecture by mapping each flow of each user to a separate MAC-d flow. The Remote NodeB Signaling (RNS) service can be used to set up control information at the Remote NodeB Relay, mapping a MAC-d flow to a user's flow. However, since the number of MAC-d flows per mobile device may be limited (e.g., to around eight), this can allow only a limited amount of aggregation (e.g., sets of two, three, or more, aggregated mobile devices since mobile devices may have multiple flows).

By making changes to Node B, more flexible aggregation compared to the case of no changes to NodeB can be achieved. An alternative is for NodeB to aggregate data from flows of multiple mobile devices in the same MAC packet, and add mobile device identifiers (e.g., High Speed-Downlink Shared Channel (HS-DSCH) Radio Network Temporary Identifiers (H-RNTIs)) to allow Remote NodeB Relay to demultiplex flows. In another aspect, this involves changing the MAC-hs header and changes to the NodeB.

Further, in at least the aspects related to a Remote NodeB Relay, there are few (if any) modifications needed to mobile devices and modification to RNC are limited since Remote NodeB Relay appears as a NodeB to the RNC as well as the served mobile devices. Additionally, effective performance and QoS can be provided to mobile devices served by Remote NodeB Relay. Another advantage is that Remote NodeB Relay appears similar to a NodeB from the interface perspective. A related advantage is that the Remote NodeB Relay has a distinct NodeB identity and, thus, can accommodate E-911 emergency services. Depending on whether aggregation is used (or not used), the architecture may also be transparent to nodeBs (necessitating no NodeB modifications. Further, RNC modifications can be encapsulated into an additional instance(s) of already supported common protocol stacks. Modifications to NodeB can be limited or none at all, the overhead is limited or minimal, and the Remote NodeB Relay can be efficiently and effectively controlled by the RNC.

In accordance with some aspects, Remote NodeB Relay can include memory operatively coupled (internally or externally) to Remote NodeB Relay. A processor can be coupled to memory and can be configured to execute instructions retained in memory. Memory can retain instructions related to communicating on behalf of a mobile device with a radio network controller through an intermediary base station and operating as at least one served flow using a first set of lower layer air interface protocol instances and a second set of lower layer air interface protocol instances. The instructions related to communicating use a same signaling method as the signaling method used between the radio network controller and the intermediary base station.

According to some aspects, memory retains further instructions related to receiving data as a single flow for the at least one served flow and at least a second served flow, demultiplexing the data received as the single flow, and transmitting the data separately to the at least one served flow and the at least a second served flow. Additionally or alternatively, memory retains further instructions related to receiving data from at least two user flows, multiplexing the data to create an aggregated data, and transmitting the aggregated data to the intermediary base station.

In accordance with some aspects, Remote NodeB Relay includes at least one processor (which can be operatively connected to memory). Processor includes a first module that communicates on behalf of a mobile device and a second module that operates as at least one served mobile device. Processor also includes a third module that multiplexes and demultiplexes received data to or from the at least one served mobile device.

Figure 11:
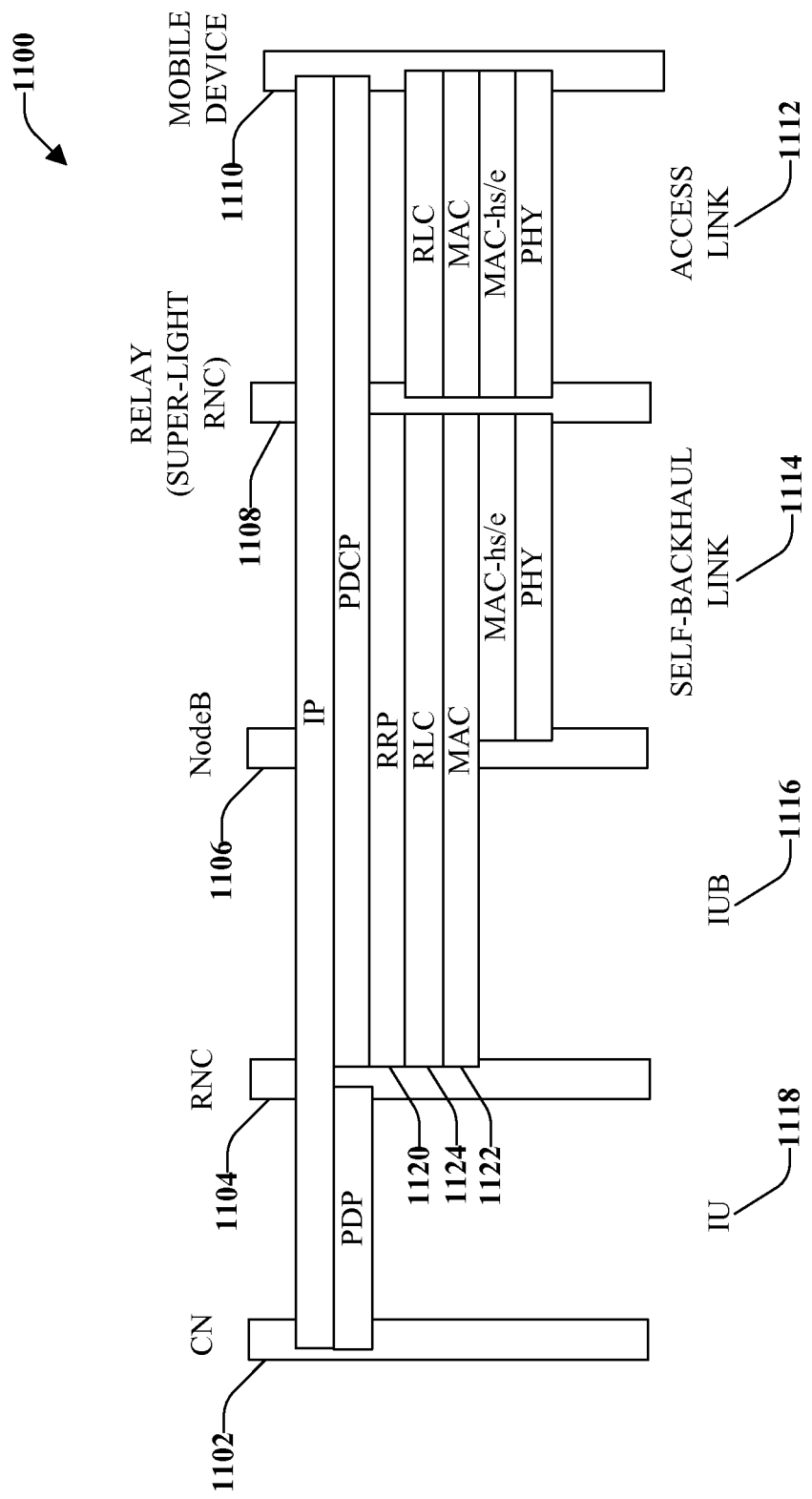
FIG. 11 illustrates a schematic representation of air-interface protocols and their end-points along a path from mobile device to core network for a Super-Light Router Relay, according to an aspect.

FIG. 11 illustrates a schematic representation 1100 of air-interface protocols and their end-points along the path from mobile device to core network for a Super Light Router Relay, according to an aspect. According to some aspects, relay is a referred to as a Super-Light Router Relay. In this aspect, a Remote RNC Protocol (RRP) is utilized between RNC and relay, which is transparent to intermediate base station (or NobeB). In this aspect, relay utilizes a first physical layer, data link layer protocol stack and radio resource control server to serve a mobile device over a wireless access link. Further, relay utilizes a second physical layer, data link layer protocol stack and radio resource control client to connect to an RNC through a wireless backhaul link to NobeB. Relay communications with RNC using a remote radio network control protocol that is transparent to NobeB. Further, relay maps data flows between wireless backhaul link and wireless access link utilizing coordination information communicated over the remote radio network control protocol.

Figure 12:
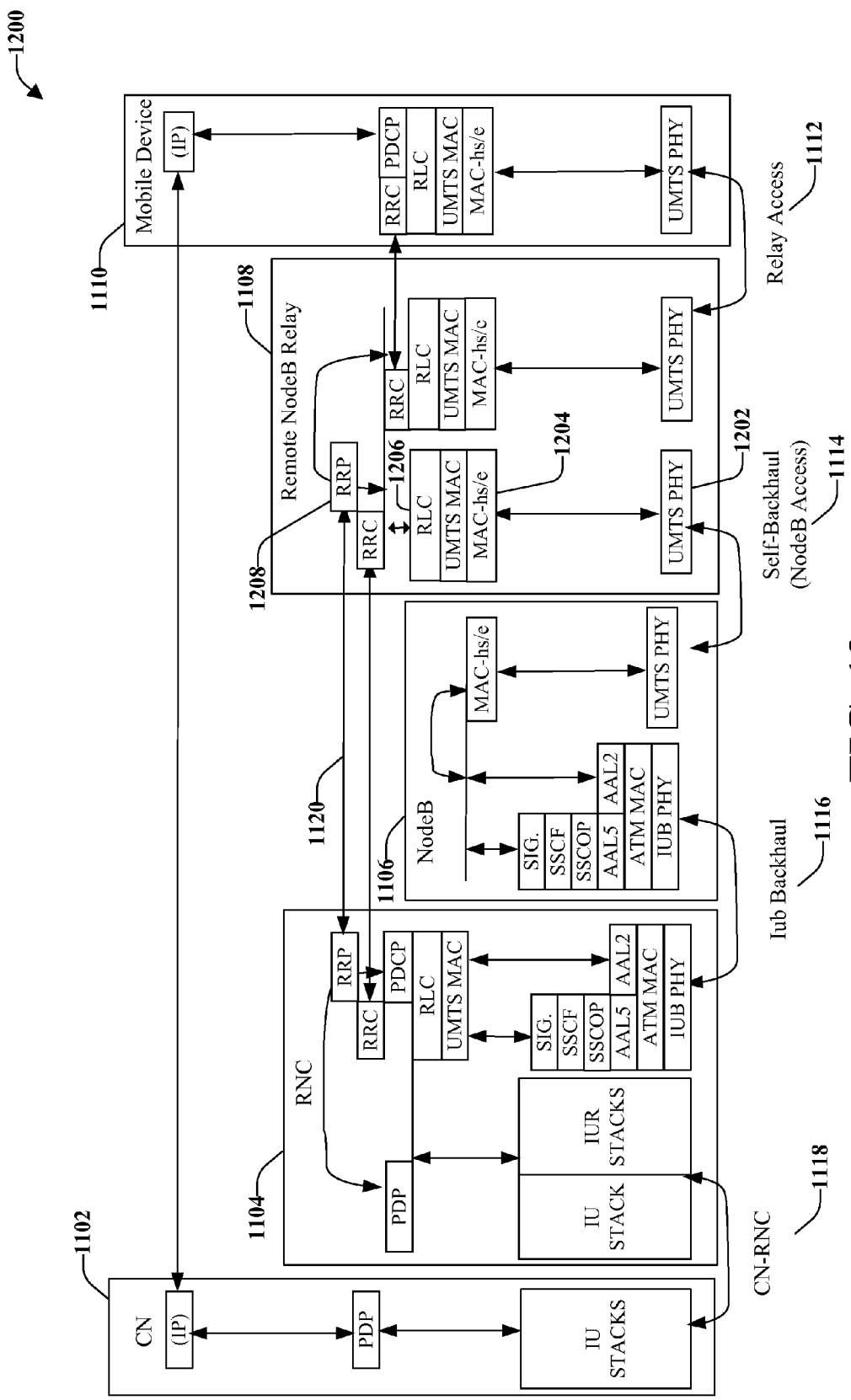
FIG. 12 illustrates a protocol architecture of a Super-Light Router Relay and related network elements, according to an aspect.

Illustrated are a core network (CN 1102), an RNC 1104, a NodeB 1106, a Relay (Super-light RNC Relay 1108) and a mobile device 1110 (or User Equipment (UE)). Mobile device 1110 communicates with Relay 1108 over Access Link 1112, which can be a wireless link. Relay 1108 communicates with NodeB 1106 over a Self-Backhaul Link 1114, which can be a wireless link. NodeB 1106 communicates with RNC 1104 over Iub 1116, which can be wireless or wired. RNC 1104 communicates with CN over an Iu 1118. FIG. 12 illustrates a protocol architecture 1200 of the Super-light Router Relay and related network elements, according to an aspect, and will be discussed in combination with FIG. 11.

In accordance with this aspect, there is a Super-Light Router Relay 1108 (or Super-Light RNC Relay) and a Remote RNC Protocol (RRP 1120) between host RNC 1104 and Relay 1108, which are transparent to the intermediate NodeB(s) 1106.

Super-Light Router Relay 1108 has air-interface protocols up to at least layer 2 (generally MAC 1122 and RLC 1124), for both backhaul and access links domains, and thus can take advantage of the different medium and link conditions. RRP 1120 provides an efficient means to transport higher layer user data, control signaling and conduct coordination with host RNC 1104 transparent to intermediate NodeB(s) 1106.

Super-Light Router Relay 1108 can help overcome obstacles (described above) by terminating air-interface protocols at strategic points in the network, making some upper layer protocol changes invisible or transparent to intermediate nodes (e.g. intermediary NodeB 1106), and managing a separate air-interface stack for mobile devices 1110 that Relay 1108 serves. The latter also has performance advantages because, for example, having RLC per link allows for fast per-link failure recovery. Increased route-trip time due to multi-hop and in combination with high data rates may cause significant link failure recovery delay in an end-to-end RLC situation. With two RLCs in a two-hop system, the individual RLCs can advance re-transmission windows and re-sequence frames independently. Furthermore, having these layer 2 protocols (MAC 1122 and RLC 1124) allows for segmentation, concatenation, retransmission, in-sequence or out-of-sequence delivery, flow control and possibly ciphering per user (e.g., mobile device 1110) per link per flow. This allows for the option of aggregating mobile device flows on the backhaul above the MAC frame level. Also, with flow control per link, there may be more flexibility in a Relay's implementation (for example, less memory may be needed because it can be managed precisely per flow and overall).

Further, by terminating these lower layer protocols at Super-Light Router Relay 1108, only higher layer signaling (generally less time sensitive and less overhead) needs to be communicated. RRP 1120 can accomplish this function, as well as other functions.

For the following discussion, the Relay's stack(s) for the "Relay acting as mobile device(s)" (e.g., on the Self-Backhaul Link 1114) will be referred to as the Relay's Backhaul Stack or "Backhaul face". The Relay's stack(s) for the "Relay acting as serving cell" will be referred to as the Relay's Access Stack or "Access face".

In the Access face, Super-Light Relay 1108 has one or more UMTS stacks for operating over the backhaul link, in which it appears as a mobile device (or mobile devices) to regular NodeB(s) 1106. In accordance with an aspect, those stacks each include Physical Layer 1202, MAC 1204, and RLC 1206 layers. On top of that, it has the Remote RNC Protocol (RRP 1208) for coordination with hosting RNC 1104. The Super-Light Relay's Access Stack comprises the functions of (1) Relay NodeB (PHY and MAC-hs/e), (2) Relay Radio Resource Control (RRC server), (3) Relay Access Link MAC and RLC, and (4) Relay Host-RNC Coordination Function (HCF).

On the Backhaul face, the Super-Light Relay has a UMTS stack per mobile device it serves through the Relay Access Link. The Super-Light Relay's Backhaul Stack includes the functions of (1) Relay mobile device(s) (PHY, MAC-hs/e, MAC, and RLC as well as RRC client), (2) Relay Remote RNC Protocol (RRP), and (3) Relay Host-RNC Coordination Function (HCF).

The Super-Light Relay's Host-RNC Coordination Function appears in both faces. It coordinates between the Host RNC's RRC impacting the Backhaul face and the relay's RRC server in the Access face. Generally the Coordination Function also accomplishes the mapping and/or transfer within the relay between the faces of the relay. It makes use of the Remote RNC Protocol to coordinate with the host RNC.

Although Super-Light Router Relay 1108 may act (and appear) as a mobile device (or mobile devices) or a NodeB or an RNC from the perspective of other network elements, there are actual differences. Note that in FIG. 11 on the Access face the Relay has NodeB protocols as well as some of the RNC stack. However, on the Backhaul face, the Relay resembles a mobile device stack, rather than a NodeB or RNC. Also note that there are at least two RRC components in the Relay (one or more for each face). The RRC and RLC backhaul face connections are above the intermediary NodeB's protocol layers and thus transparent to that NodeB. Furthermore, mobile device 1110 does not need to know it is served by Relay 1108 as there are no changes to the mobile device stack.

Super-Light Relay 1108 has the capability of a NodeB but also some capabilities of an RNC. The Relay 1108 has responsibility for managing its own radio resources for those Access Link stacks (e.g., Radio Resource Control (RRC)). There is thus a client RRC (or client RRCs) in the Backhaul face and a server RRC for the Access face. However, since Relay 1108 only has the functionality of one NodeB (itself), the RNC functions for the Access Links are simplified (reduced). For example, there is no need for handoff within the Relay RNC's scope or for backhaul protocols since the NodeB functionality may be collocated in the Super-Light Relay 1108. Nor does Relay 1108 need to communicate with core network 1102. Since RRP is transparent to the hosting NodeB, Iub-related problems (such as proprietary Iub implementations) are moot even if traffic for Relay-served mobile devices is aggregated on the backhaul.

Because Super-light Relay 1108 is responsible for Radio Resource Control (RRC) for the mobile devices it serves and handles measurement control and reporting for, it therefore has end-to-end RRC connections with those mobile devices. This is distinct from measurement and reporting for NodeBs, such as load and Rise-over-Thermal (RoT) information that can be reported by the Relay's NodeB functionality to the collocated Relay "RNC" functionality and even over to the host RNC through the new Remote RNC Protocol (RRP).

According to some aspects, the Remote RNC Protocol (RRP) accomplishes several functions. First, RRP transfers user data and/or higher-layer user control signaling between Relay 1108 and host RNC 1104. Second, RRP allows coordination between the Relay RNC functionality and the Host RNC (e.g., for the HCF).

In accordance with some aspects, the user data and higher-layer user control signaling transfer by RRP may use the Iu interface employed between RNCs and the core network in UMTS, but carried over wireless protocols. However, this is unnecessary since there is a host-RNC in the path, which can package the information received over RRP into the Iu interface it uses to connect to the core network. Thus, there is no need to further embed (package) user data and higher-layer control signaling. However, control signaling to the Relay itself may reuse an Iur (the inter-RNC interface) or Iur-like interface, but again over wireless protocols for the self-backhaul part. Since the host-RNC and Relay both have RNC functions, this is a solution and can be improved as the Relay "RNC" is itself served by the host RNC and thus partially controlled by it.

In accordance with some aspects, Super-Light Router Relay 1108 also allows for the flexibility of either aggregation or non-aggregation on the backhaul. This is discussed further below under the context of coordination since aggregating utilizes additional information for Relay 1108 to map flows.

According to some aspects, RRP allows coordination between the host RNC's management of the intermediary NodeB 1106 under its control (which serves the wireless backhaul for the Relay) and Super-Light Relay 1108 which manages the NodeB functions it has in order to serve mobile devices which are on Relay 1108.

The coordination function has several components. First, Relay 1108 maps (multiplex and de-multiplex) traffic flows (such as at RLC for PDCP) to connect flows over the backhaul to flows over the access links to mobile devices. Second, it handles coordination of handoff to and from relay 1108 in a potentially broader capacity than between actual RNCs. Third, it is responsible for measurement and reporting to host RNC 1104. These services are supported by RRP messaging.

In accordance with some aspects, mapping (aggregation and non-aggregation) is provided. To accomplish mapping between backhaul flows and access flows, relay 1108 should also coordinate prioritization and QoS for the access link with that which the host-RNC does for the backhaul. An advantage with this scheme is that relay 1108 has the flexibility to manage its own RLC and MAC-level flows to mobile devices independently of the backhaul. Relay 1108 merely needs to know what upper-layer connections map to which mobile devices (or mobile device flows) so that it can transfer data between the backhaul and access stacks. Relay 1108 may also use prioritization signaling from host-RNC 1104 to prioritize and/or schedule its mobile devices. Host-RNC 1104, on the other hand, should control the priority and/or scheduling given to flows destined to relay 1108 by intermediary (host) NodeB 1106.

When there is a one-to-one relation between relay-served mobile devices and instances of mobile devices that the relay acts like on the backhaul (and between the individual flows to those mobile devices), the situation is referred to herein as "non-aggregation". In non-aggregation mode, relay acts as one mobile device per mobile device it serves, or even one additional mobile device for control signaling destined for itself, rather than a mobile device. However, flexibility can be provided for the relay and host-RNC to aggregate user data and signaling over the backhaul link, either by combining equal priority flows for different relay served mobile devices or by letting the relay act as fewer mobile devices than the number of mobile devices it serves (or even only as one mobile device), which is referred to as "aggregation". Aggregation can provide "trunking efficiency" that may potentially be gained when users are simultaneously active (such as mobile devices with overlapping bursts or which have full transmit buffers).

With non-aggregation, an option is to have the relay act as multiple mobile devices or have a separate flow for control messaging destined for itself (as opposed to a mobile device). This may re-use relative QoS priority levels but may need the RNC bump down the standard priority level set on the intermediary NodeB to make room for one higher priority for RNC-to-Relay signaling. These bumped-down priority levels could then be translated up one by the relay for the access link. With aggregation, the backhaul could be split into N flows, where N is the cardinality of the union of priority levels for flows to relay served mobile devices. The relay can then extract per-mobile device messaging from each of those N flows and distribute to corresponding mobile device flows over access links. For example, all flows from all mobile devices with priority x are aggregated into one flow over the backhaul with priority x. Again, Relay 1108 and host RNC 1104 exchange the proper mapping information and, potentially, a priority translation table.

To accomplish aggregation with Router Relay 1108, there are at least three alternatives, which are: (1) No changes to NodeB, (2) Changes to NodeB, and (3) No Changes to NodeB/Support from RNC. For the first alternative, without making changes to NodeB, one way aggregation can be achieved in this architecture is to map each flow of each user to a separate MAC-d flow. The RRP can be used to set up control information at the Router Relay, mapping a MAC-d flow to a user's flow. However, since the number of MAC-d flows per mobile device may be limited (e.g., to about eight), this may permit only a limited amount of aggregation (e.g., sets of two or three aggregated mobile devices).

For the second alternative, by making changes to Node B, more flexible aggregation compared to the case of No Changes to Node B (first alternative) can be achieved. An alternative may be for the Node B to aggregate data from flows of multiple mobile devices in the same MAC packet, and add mobile device identifiers (example, H-RNTIs) to allow Remote NodeB Relay to de-multiplex downlink flows and multiplex uplink flows. In an aspect, this alternative involves changes to the MAC-hs header to identify the end-target and corresponding changes to the Node B to create the header.

The third alternative for aggregation in the Router Relay case may be for the RNC to map flows of same QoS for different mobile devices to the same MAC-d flow. As an example, a first mobile device has flows f11 and f12 with QoS priorities 1 and 2 respectively. Also, first mobile device has flows f21 and f22 with QoS priorities 1 and 2 respectively. Now, RNC may set up one MAC-d flow carrying f11 and f21, and another mac-d flow carrying f12 and f22. For this example, f11 and f21 each has QoS requirements of 100 kbps guaranteed rate. Thus, RNC could set up the combined MAC-d flow with a QoS requirement of 200 kbps. However, this does not prevent one of the two flows from using the entire 200 kbps. To prevent this, the RNC could run some token bucket filters to limit each user's rate to 100 kbps, however this would prevent a user from getting more than 100 kbps when system bandwidth is empty. Using more sophisticated algorithms at the RNC for traffic shaping/policing, these issues could be handled statistically, for example. Moreover, the RNC may in this case choose to only aggregate certain kinds of QoS flows in the same MAC-d flow (which can more easily be policed/shaped). Thus, this option requires no changes to Node B, but needs support from the RNC in the form of sophisticated shaping/policing to appropriately control flows sharing the same MAC-d flow.

Since Router Relay looks at layers above MAC (such as RLC/PDCP), de-multiplexing of users can be done at a higher layer such as RLC (or PDCP). Note that this option is not possible in the case of Relay strictly behaving as NodeB, since in this case relay does not look at layers above MAC.

An advantage of the disclosed aspects is the facilitation of aggregation of mobile device traffic flows on the backhaul, although aggregation is not required. In this aspect, NodeB may be unmodified because the RNC, being aware of the relay, can coordinate the intermediary NodeB prioritization and scheduling of mobile devices served by that NodeB and Relay. RNC can even use the flow control mechanisms of RLC to manage the queues at NodeB.

Figure 13:
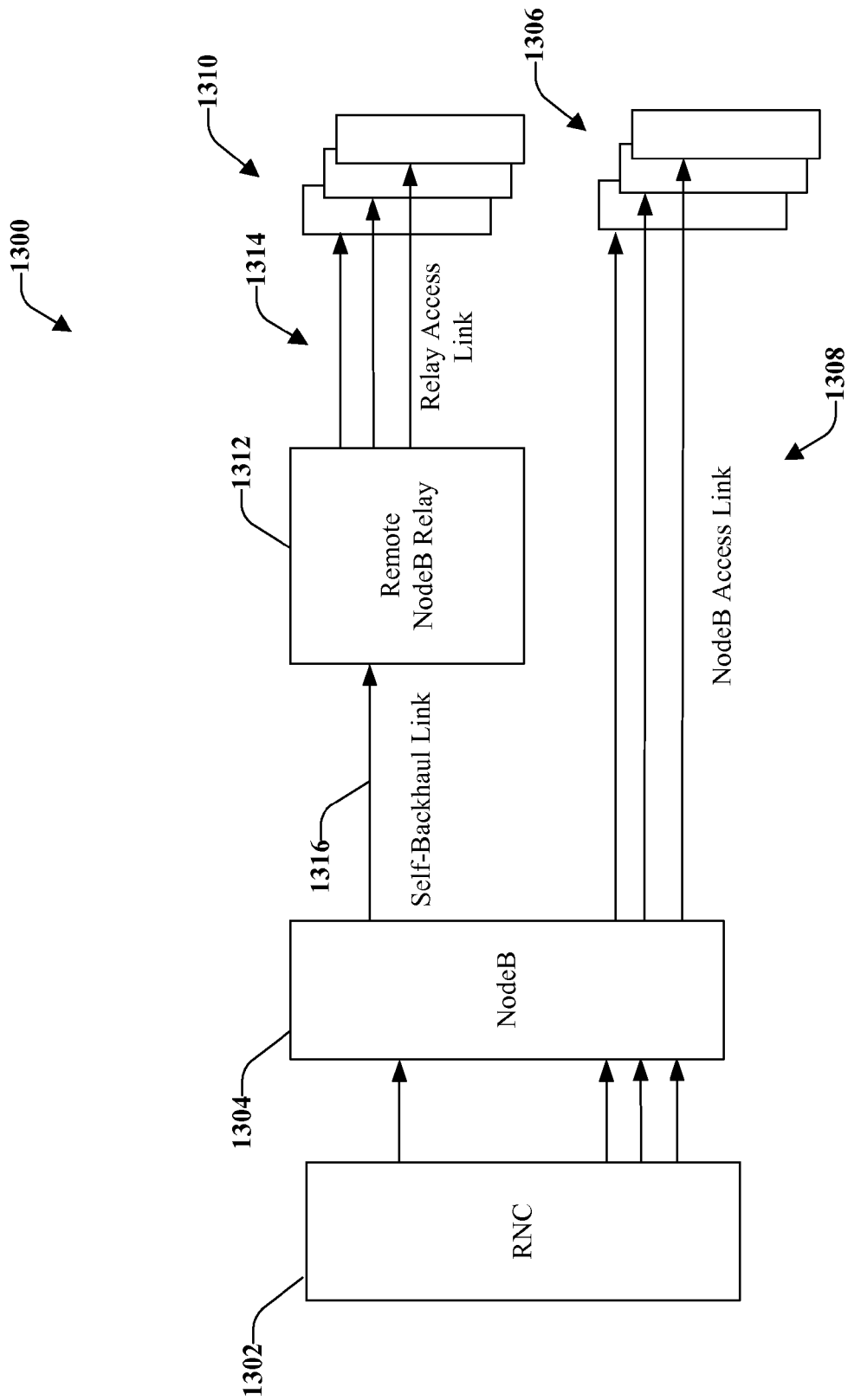
FIG. 13 illustrates a schematic representation of self-backhaul aggregation, according to an aspect.

In an aspect of aggregation, the mobile device traffic may be aggregated on the backhaul link(s). In other words, instead of Relay acting as one mobile device per mobile device it serves (or one backhaul flow per mobile device access link flow), the Relay to NodeB or Relay to RNC links can be combined into one connection or flow. Here, NodeB does not have to multiplex and de-multiplex as that is done at the RNC and Relay end-points FIG. 13 illustrates a schematic representation 1300 of self-backhaul aggregation, according to an aspect. Included are an RNC 1302 and a NodeB 1304 that communicate with a first set of mobile devices 1306 over NodeB Access Links 1308, which can be wireless links. A second subset of mobile devices 1310 communicates with a Remote NodeB Relay over Relay Access Links 1314, which can be wireless links. Remote NodeB Relay 1312 communicates with NodeB 1304 over a Self-Backhaul Link 1316, which can be a wireless link.

RNC 1302 and Relay 1312 can alternatively use multiple flows or "Relay mobile device"-identities. RNC 1302 may inactivate or move a subset of the flows or identities into idle when there are no (active) mobile devices 1310 served by relay 1312 corresponding to the characteristics of pipe or to prioritize another pipe. Since RNC 1302 has control of NodeB 1304 at a low MAC-hs/e level, RNC 1302 can closely coordinate the self-backhaul aggregated link with the Relay's treatment of the Relay access links. Also, since Relay 1312 has layers above the typical NodeB 1304 (e.g. RLC), it can aggregate at or above the MAC protocol level and thereby achieve potentially superior efficiency (e.g., trunking) gain.

Figure 14:
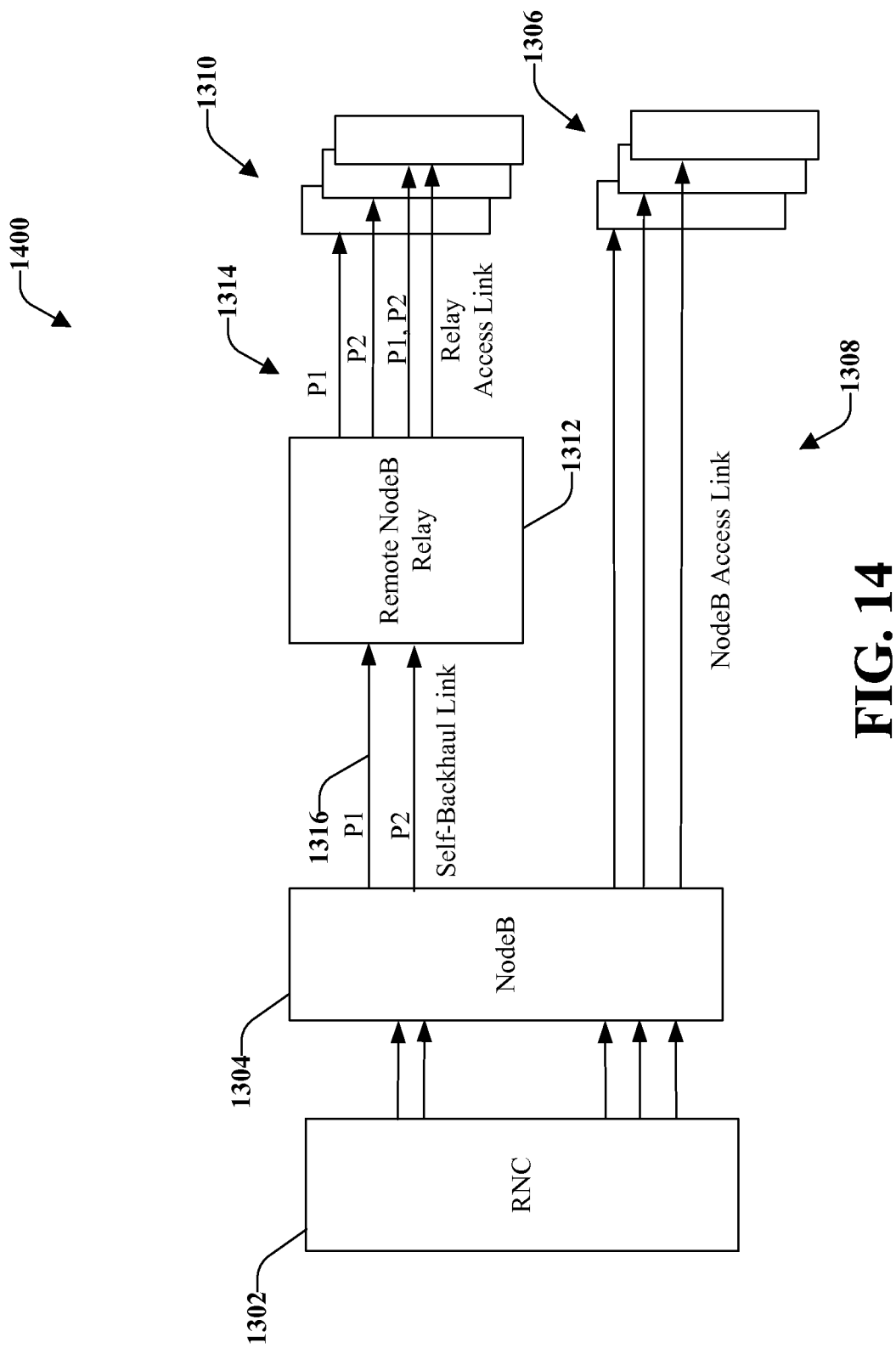
FIG. 14 illustrates a schematic representation of self-backhaul aggregation per priority flow, according to an aspect.

FIG. 14 illustrates a schematic representation 1400 of self-backhaul aggregation per priority flow, according to an aspect. In the case discussed with reference to FIG. 13 above, or in the case of non-aggregation, relay 1312 may be acting as multiple mobile devices from the intermediary NodeB's perspective. Thus, relay 1312 may be scheduled simultaneously on multiple channels. Relay 1312 may thus have multiple "mobile device" identities (H-RNTIs and E-RNTIs). Relay 1312 can scan multiple HS-SCCHs and watch for multiple H-RNTI assignments (and similarly for the uplink using E-RNTIs). Relay 1312 may also have superior demodulation or decoding processing capabilities compared to a regular (non-relaying) mobile device.

In accordance with some aspects, handoff between a relay and a regular NodeB (whether it is the host NodeB or not) is similar, in some aspects, to an inter-RNC handoff, but differs in various ways. Since the RNC hosts the Super-Light Relay, it can use flow control over the RRP to diminish the handoff delay. This can be performed by controlling buffers at the Relay to empty the buffers, keep the buffers small, or coordinate bi-casting (itself being the second party) at an earlier time once the need for handoff is determined or predicted. Thus, the handoff action time can be advanced (earlier) and interruption and delay can be minimized. Furthermore, the drift-RNC concept may be used to support soft-handoff between the Relay "RNC" and the host. Since the Iur interface already has these capabilities, it can be used over the wireless backhaul.

It should also be noted that the drift-RNC concept may be used even with aggregation because the aggregated backhaul can carry the soft-decoded bits from mobile device transmissions (bypassing the upper layers at the Relay) to the combining point in the network.

Latency is another factor that may be considered for handoff. Even though there may be multiple hops for a mobile device connected to a relay, there may be less latency for that mobile device than if it was served by a NodeB directly if there is a scheduling advantage for mobile device given good geometry or link conditions to the relay on the backhaul and prioritization on the relay access link. Thus, it may be beneficial to communicate such information over the RRP and consider latency in the handoff decisions.

In accordance with some aspects, there are at least four Measurement and Reporting contexts when a mobile device is served by a Relay: (1) between mobile device and relay; (2) between regular (intermediary) NodeB and host RNC; (3) between relay acting as mobile devices(s) and host RNC; and (4) between Super-Light Relay "RNC" and the host RNC.

Contexts (1) and (3) include such content as pilot strength measurements (Ec/Io or the like) or event triggers. Context (1) corresponds to the access link while context (3) corresponds to the backhaul link. Contexts (2) and (4) include such content as RoT, load, and other conditions at the NodeB and Relay "NodeB".

Here, (4) is conducted over the RRP. Thus, the RRP (and the Relay and RNC coordination functions) should support exchange of information concerning (2) (and potentially (3), although that may be redundant and unnecessary since the source was the Relay to begin with) from RNC to Relay or of (4) from Relay to RNC (or both). When a mobile device is served by the Relay, the Relay may thus have all the necessary information to determine whether handoff should occur. Conversely, when a mobile device is served by regular NodeB, the RNC may have all the necessary information to determine whether handoff should occur.

In accordance with some aspects, Host-RNC has a counterpart RRP in its stack and a function to coordinate the local RRC management of resources used to serve the Relay as a mobile device (or mobile devices) with the Relay's (e.g., over the RRP). Host-RNC is responsible for managing the backhaul (Iub) and wireless backhaul (NodeB) resources. Host-RNC routes user data into flows over those links. Host-RNC keeps track of this mapping and informs Super-Light Router Relay of this mapping with associated priorities and/or QoS parameters so that the Relay can extract these flows and map them into its own RRC-controlled flows.

According to some aspects, soft-handoff is supported. The Host-RNC should coordinate handoff with Relay and may also support down-link soft-handoff with the Relay acting as a Drift-RNC. In this mode, lower layer frames are brought back up the stack in the Host-RNC and transported over the RRP to the Relay where the Access face upper-layers are bypassed and the lower layer frames are transmitted to the target mobile device. This should be coordinated in time, so the Host-RNC s should provide an action time (slot) for the Relay (or be synchronized) to transmit the frames and provide the frames sufficiently in advance for the frames to arrive at the Relay. Thus, NodeB and Relay transmit the frames at approximately the same time (within the search window) and mobile device can be in soft-handoff.

For uplink soft-handoff, the received lower-layer frames bypass the relay (or RNC) upper layers and are forwarded to the master RNC (either the host RNC or the Super-light Relay RNC) where combining is done and then the frames are processed by higher layers. Because of the delay over RRP, the buffers may have to be larger and jitter may be higher due to variation in the backhaul additional delay.

One alternative is to restrict soft-handoff so that mobile devices can be in soft-handoff with regular NodeBs or relays but not a mix of these. This can be used to control the jitter or delay variance for soft-handoff frames. Alternatively, soft-handoff may be disallowed for mobile devices currently on relays. However, note that it may be advantageous to have relays handoff between NodeBs and potentially even in soft-handoff even if mobile devices a relay serves are not.

Another advantage of this aspect is that the Router Relay has a distinct NodeB identity and even RNC functions, which can thus accommodate E-911 emergency services. Furthermore, since the Relay's RNC signaling functions are collocated with the NodeB functionality, the Relay can control the signaling information sent to mobile devices associated with it and this signaling is usable by the mobile device for such location techniques as trilateration. If the Relay is mobile and has GPS positioning technology, then all the associated mobile devices can benefit from this given the Relay can determine its own location and update a network based device which computes the location based on mobile device measurements of NodeB (and relay) transmitted signals (e.g. pilots) and NodeB (and relay) locations.

In accordance with some aspects, Super Light Router Relay can include memory operatively coupled (internally or externally) to Super Light Router Relay. A processor can be coupled to memory and can be configured to execute instructions retained in memory. Memory can retain instructions related to serving at least one mobile device over a wireless access link, connecting to a host radio network controller, and communicating with the host radio network controller with a remote radio network control protocol that is transparent to an intermediary base station. Memory can also retain instructions related to mapping data flows between a wireless backhaul link and the wireless access link with coordination information communicated over the remote radio network control protocol. The instructions related to serving at least one mobile device can use a first physical layer, data link layer protocol stack and radio resource control server. In accordance with some aspects, the instructions related to connecting to the host radio network controller connects with a second physical layer, data link layer protocol stack and a radio resource control client and the connecting is over the wireless backhaul link to the intermediary base station.

In accordance with some aspects, memory retains further instructions related to aggregating a connection to a served mobile device with another connection over a backhaul link and exchanging information with the host radio network controller to map non-aggregated access links for connections to an aggregated backhaul link. According to some aspects, memory retains further instructions related to restricting at least one served mobile device from being in soft-handoff and a mobile device served by a base station from being in soft-handoff with a relay.

In accordance with some aspects, Super Light Router Relay includes at least one processor (operatively connected to memory). Processor includes a first module that serves at least one mobile device over a wireless access link using a first physical layer, data link layer protocol stack and radio resource control server. Processor also includes a second module that connects to a host radio network controller with a second physical layer, data link layer protocol stack and a radio resource control client over a wireless backhaul link to an intermediary base station. Further, processor includes a third module that communicates with the host radio network controller with a remote radio network control protocol that is transparent to the intermediary base station. Also included in processor is a fourth module that maps data flows between the wireless backhaul link and the wireless access link with coordination information communicated over the remote radio network control protocol.

Figure 15:
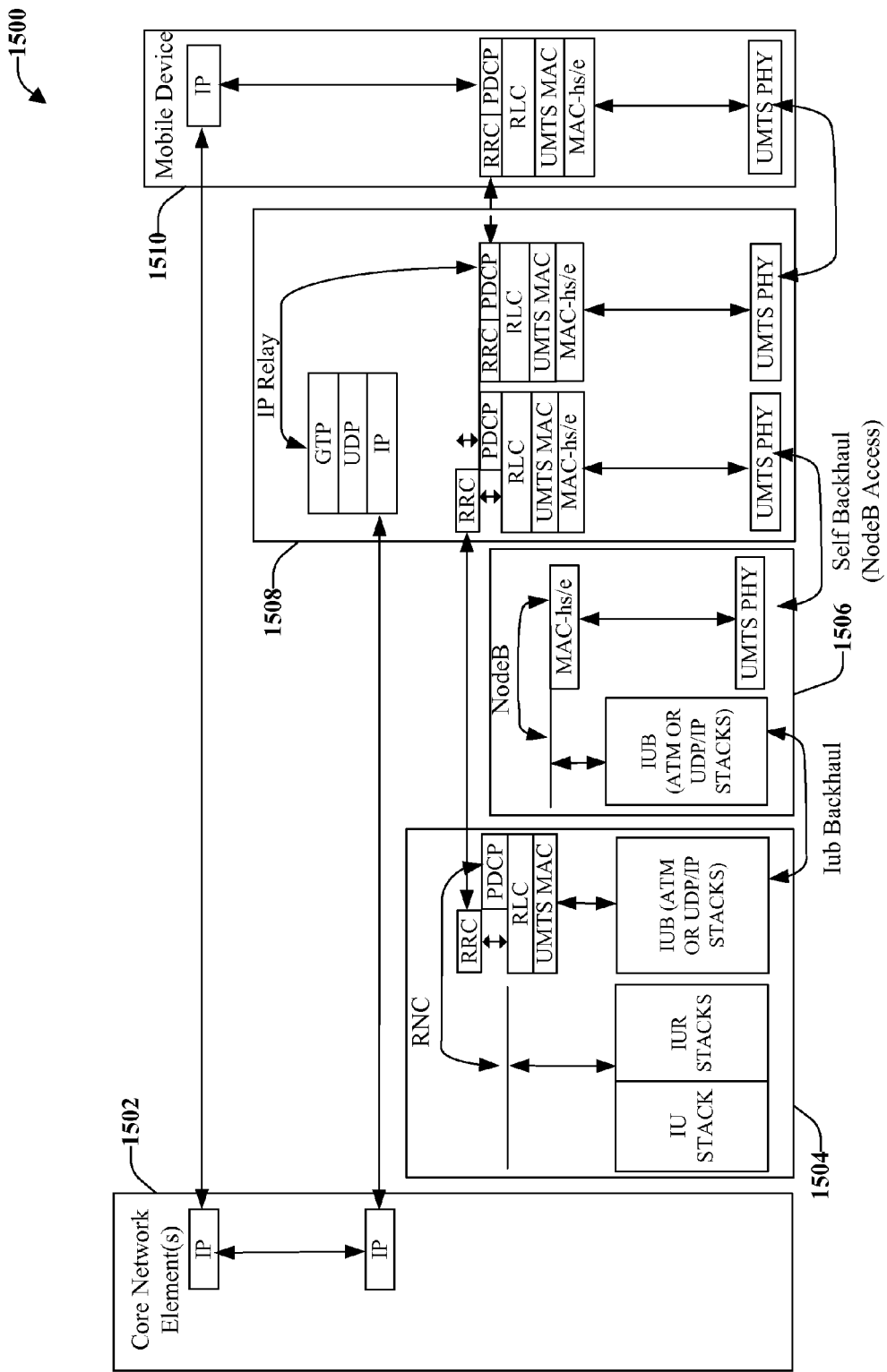
FIG. 15 illustrates a schematic representation with an IP Relay, according to an aspect.

FIG. 15 illustrates a schematic representation 1500 with IP Relay, according to an aspect. In accordance with some aspects, a relay gateway with relay self-backhaul IP is utilized when mobile device in on relay and pass-through protocols are utilized when mobile device is not on relay. Further, a relay with base station protocols to communicate with mobile device as a base station and mobile device protocols to communicate with an intermediary base station (NobeB) as a mobile device is utilized. Relay has a relay self-backhaul IP to carry data to or from a mobile device to or from the relay gateway transparently across one or more intermediary network elements.

Illustrated are core network elements 1502, an RNC 1504, a NodeB 1506, an IP Relay 1508 and a mobile device 1510. In accordance with some aspects, the problems discussed above are mitigated though the use of an IP Relay and a Strategic Relay Gateway (RGW). The IP Relay has NodeB and RNC protocols and functionality to serve End Users (e.g., mobile devices) or subsequent Relays. IP Relay also has mobile device protocols and functionality to connect to a NodeB or other Relay. IP Relay also has higher-layer protocols including at least IP. This IP layer will be referred to as the Relay Self-Backhaul IP (or RSB-IP) and is below the End-User's IP layer but above any underlying backhaul layers (including backhaul UDP/IP or ATM layers). The Strategic Relay Gateway is a counterpart to the IP Relay. Three general aspects (and various sub-options) for the Strategic Relay Gateway (RGW) are described below. The RGW works with one or more of these IP Relays or even one or more IP Relays in a multi-hop sequence of one, two, or more than two hops. These aspects will be described in detail starting with the IP Relay and followed by embodiments of the Strategic Relay Gateway (RGW).

IP Relay 1508 has at least two protocol "faces" (stacks): a self-backhaul face and an access face. There may be multiple instances of such stacks for each face (for example one access face instance for each mobile device 1510 served by IP relay 1508) but for purposes of explanation, these faces will be discussed generally.

The self-backhaul face consists of mobile device-like Physical Layer (PHY) and Medium Access Layer (MAC) protocols to connect to NodeB 1506 and RNC 1504. However, on top of those layer 1 and 2 protocols, IP Relay 1508 has at least a Relay Self-Backhaul IP (or RSB-IP) and may also have UDP and GTP on top of that. This IP layer is similar to (or the same as) a mobile device (end user) IP protocol and, as far as the intermediary NodeB 1506 or RNC 1504 are concerned, it is indiscernible from a mobile device. However, it is not the End User's (mobile device's) IP protocol but rather carries the mobile device IP as data payload.

The access face consists of RNC and NodeB protocols and functionality (or partial aspects thereof) sufficient to serve a mobile device or mobile devices. From a mobile device perspective, IP Relay 1508 appears as a NodeB. These protocol aspects are illustrated in FIG. 15 where the core network has been abstracted for focus on the nodes in the access stratum scope.

As illustrated, Relay Self-Backhaul IP (or RSB-IP) is transparent to NodeB 1506 and RNC 1504 because it is above the protocol processing of those network elements. Thus, IP Relay 1508 is generally transparent to RNC 1504 and NodeB 1506 as it generally appears as a mobile device.

Figure 16:
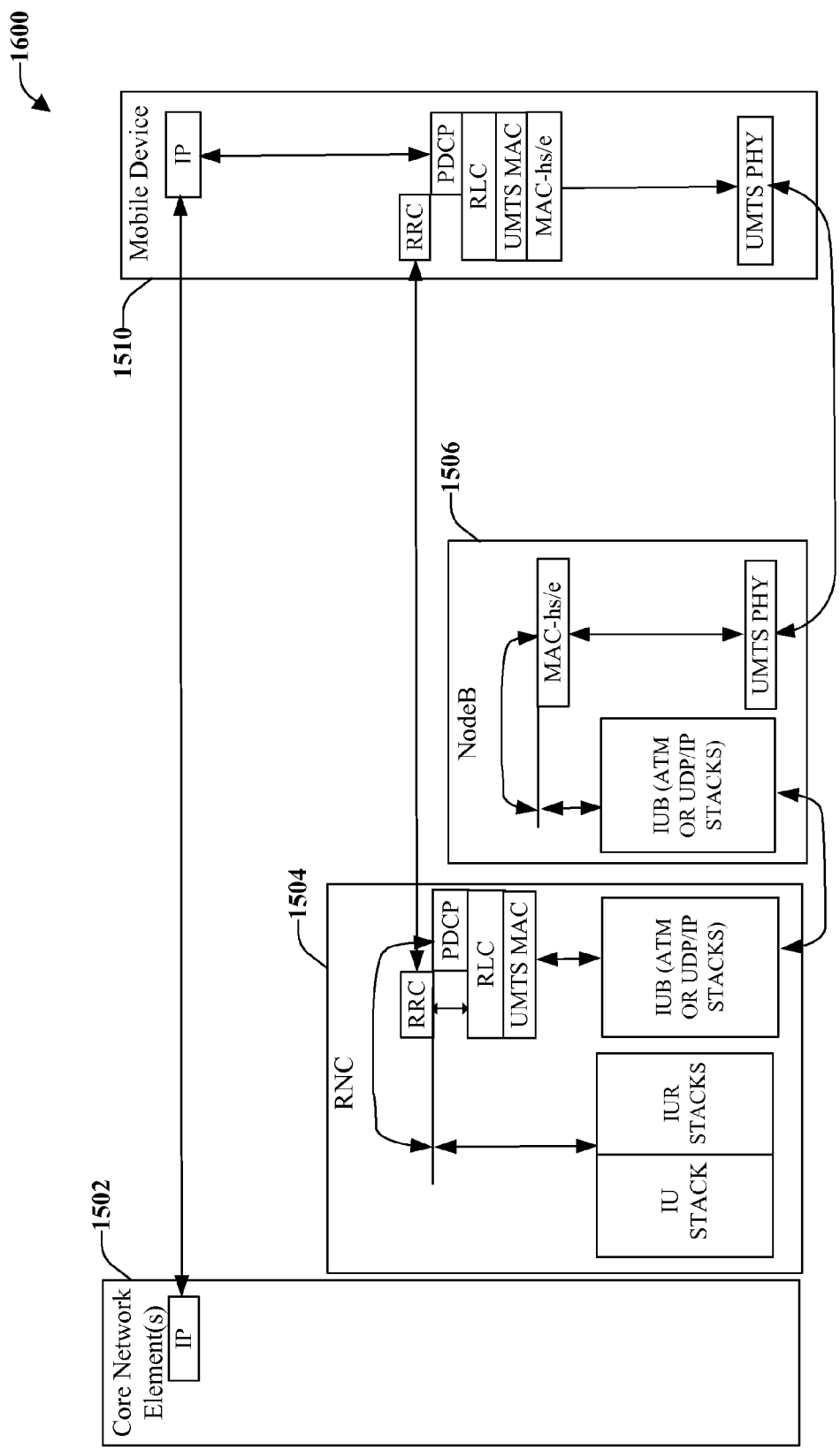
FIG. 16 illustrates a schematic representation of an architecture without a relay, according to an aspect.

The mobile device IP protocol (or whatever application protocol the user is employing) is above the Relay's Self-Backhaul IP protocol. The Relay's Self-Backhaul IP (and UDP, GTP) protocols carry the mobile device IP data to and from mobile device 1510 across RNC 1504 and NodeB 1506. However, note that two IP protocols (one embedded in the other) continue into core network 1502. This is in contrast to a situation where there is no Relay in the chain and only the mobile device's IP protocol continues into core network 1502 (typically to the GPRS Gateway Support Node (GGSN)), which is shown in FIG. 16. With reference to FIG. 15, the underlying Relay Self-Backhaul IP is a transport for the mobile device's (IP) to get to and from core network 1502.

Since the underlying Relay Self-Backhaul IP is only for this purpose of transport across the intermediary nodes transparently (the Relay appearing as if it is the End User), there should be a counterpart function to the IP Relay in the network side. The Strategic Relay Gateway (RGW) solves this problem.

There are at least three aspects for the Strategic Relay Gateway (RGW). These different aspects relate to solving an IP routing problem. The routing problem is one of different operations depending on whether a mobile device is on a Relay or not on a Relay. However, in general the Relay Gateway coordinates the operation of the IP Relay as a forwarder (relayer) and as a served "mobile device" from the intermediary node perspective. This may include coordination not only of communication on the downlink and uplink but also ancillary functions such as location determination.

One perspective is that this routing problem is due to the lack of IP in NodeB or RNC. Without routing in these nodes, there is no router to distinguish and route packets from (1) mobile devices not on Relays and those from (2) mobile devices on Relays. At the same time, changes to the End User's equipment (UE), RNC, and NodeBs as well as core network elements, should be mitigated.

Figure 17:
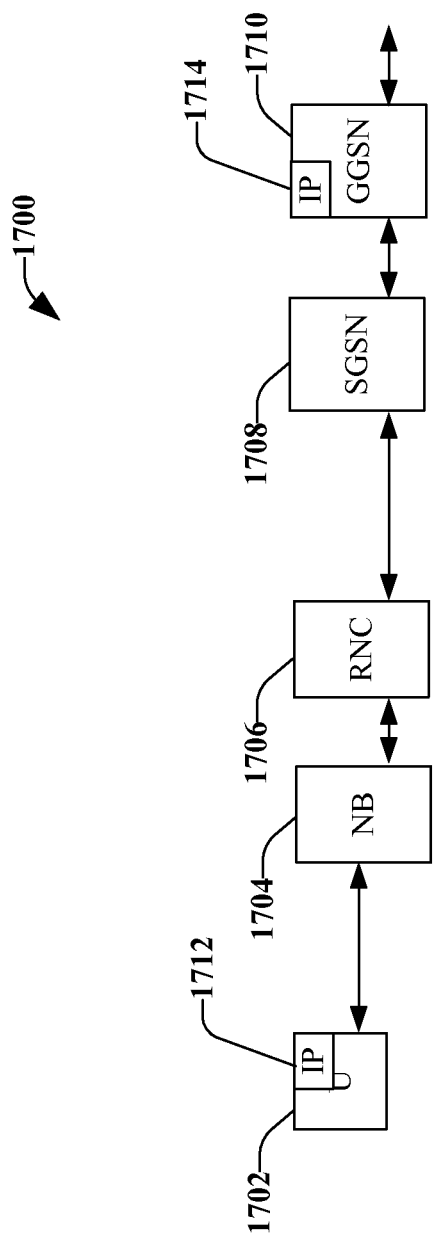
FIG. 17 illustrates a schematic representation of a baseline architecture with no relays, according to an aspect.

FIG. 17 illustrates a schematic representation of a baseline architecture 1700 with no relays, according to an aspect. Illustrated are a mobile device 1702, a NodeB 1704, an RNC 1706, a SGSN 1708, and a GGSN 1710. This architecture may be sufficient if there are no mobile devices on Relays because all application layer IP protocol 1712, 1714 is between the mobile device and the GGSN IP.

Figure 18:
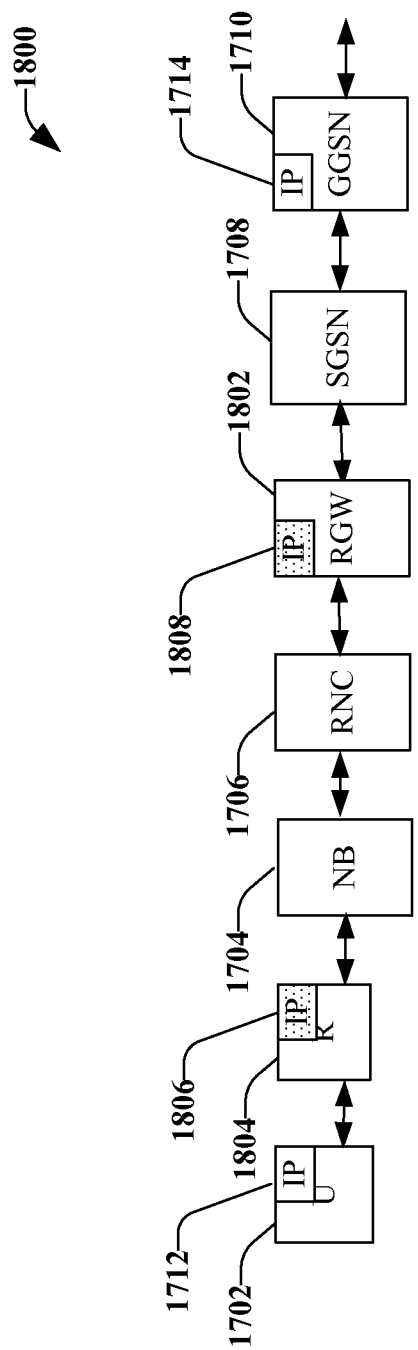
FIG. 18 illustrates an architecture with all mobile devices on IP Relays, according to an aspect.
Figure 19:
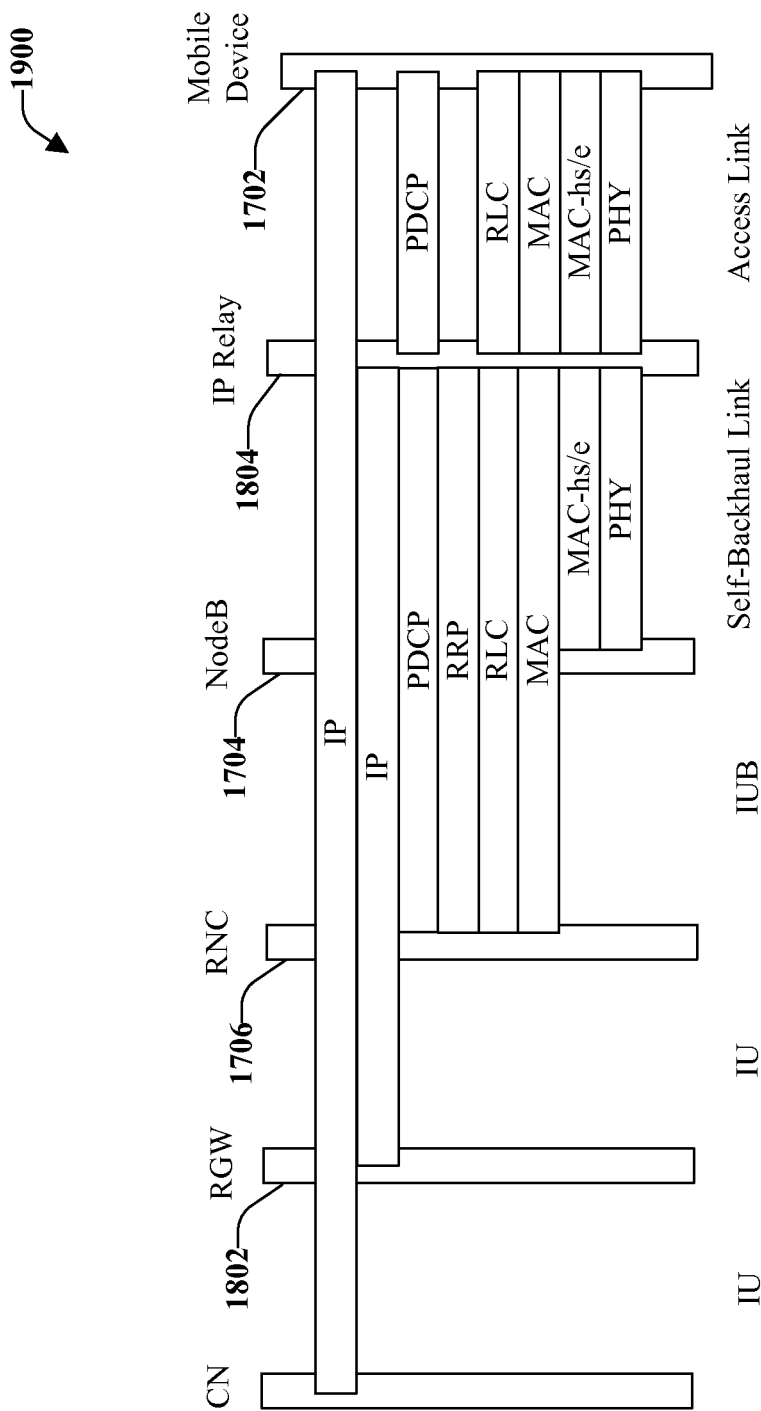
FIG. 19 illustrates a schematic representation of protocol end-points with all mobile devices on relays, according to an aspect.

FIG. 18 illustrates an architecture 1800 with all mobile devices on IP Relays, according to an aspect, and FIG. 19 illustrates a schematic representation 1900 of protocol endpoints with all mobile devices on relays, according to an aspect. Similar to the above figure, illustrated are a mobile device 1702 a NodeB 1704, an RNC 1706, a SGSN 1708, and a GGSN 1710. In this case, a Strategic Relay Gateway (RGW) 1802) could be inserted between RNC 1706 and SGSN 1708 as a counterpart for the inserted Relay Self-Backhaul IP layer at the IP Relay 1804. Here, the Relay Self-Backhaul IP 1806, 1808 is between the IP Relay 1804 and Strategic Relay Gateway (RGW 1802). That Relay Self-Backhaul IP carries the application IP between those points so that NodeB 1704 and RNC 1706 do not need special modifications to handle the IP Relay (as it appears as a mobile device). Finally, the application IP connection from mobile device 1702 to GGSN 1710 is maintained without need to modify SGSN 1708, GGSN 1710, and mobile device 1702 because those elements see the application IP (without the Relay Self-Backhaul IP wrapping).

However, it should be evident by comparing FIG. 17 and FIG. 18 that the routing (either through a RGW or not) would depend on whether a mobile device is on an IP Relay. Yet the RNC and SGSN do not have this capability. While the incoming (Downlink (DL)) traffic may be routed from a different point in or outside the core network, the outgoing (Uplink (UL)) traffic goes through the NodeB and RNC. Here, three alternatives are proposed for solving this problem (e.g., serving both mobile devices on Relays and mobile devices not on Relays simultaneously with the same network design).

The three aspects to support both mobile devices on Relays and mobile devices not on Relays are (1) Relay Non-Relay Gateway (e.g., a Relay Gateway between RNC and GGSN that is capable of supporting non-Relay mobile devices), (2) Relay Access Gateway (e.g., a modified RNC capable of routing Relay UE traffic through a Relay Gateway between RNC and GGSN or bypassing the Relay Gateway for non-Relay UE traffic), and (3) Relay Core Gateway (e.g., a Relay Gateway connected to the GGSN through IP connection(s)).

Figure 20:
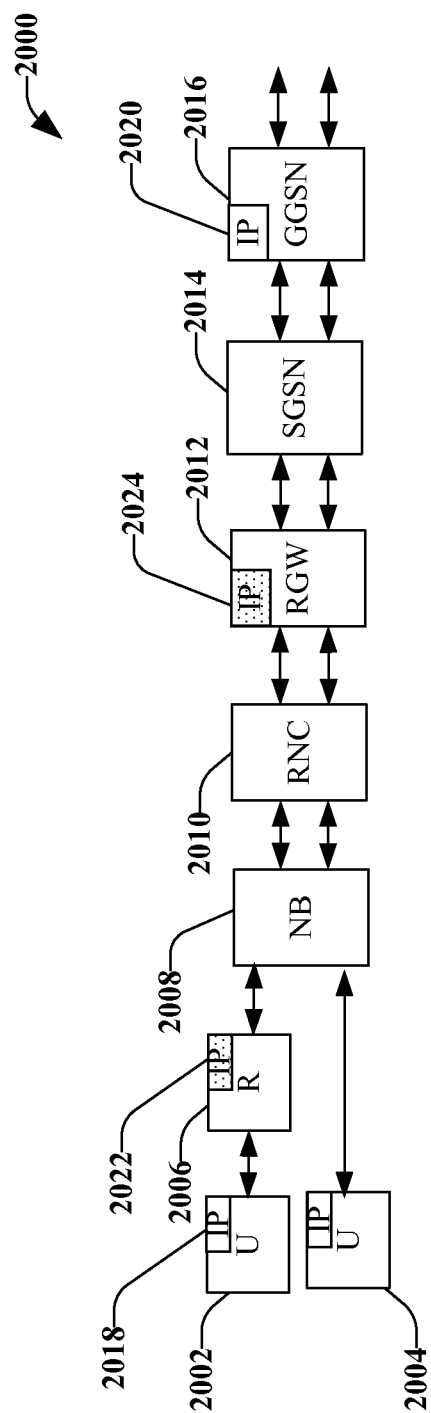
FIG. 20 illustrates a schematic representation of a Relay Non-Relay Gateway, according to an aspect.

FIG. 20 illustrates a schematic representation of a Relay Non-Relay Gateway, according to an aspect. Illustrated are two mobile devices 2002, 2004 and a relay 2006. Also included are a NodeB 2008, an RNC 2010, a RGW 2012, a SGSN 2014, and a GGSN 2016. The Relay Non-Relay Gateway processes mobile device traffic for both mobile devices on Relays and Relays not on mobile devices, as the name implies. For uplink traffic from mobile devices on Relays, Relay Non-Relay Gateway de-embeds End-User IP 2018 from the Relay Self-Backhaul IP (or multiple embedded packets thereof in the case of multiple relay hops) and forwards the End-User IP packets 2020 to the core network. For downlink traffic to mobile devices on Relays, Relay Non-Relay Gateway embeds End-User IP packets into the Relay Self-Backhaul IP (or multiple embedded packets thereof in the case of multiple relay hops) and forwards them to the first IP Relay through RNC 2010 and NodeB 2008. From the core-network perspective, a Relay mobile device thus appears the same as a non-Relay mobile device from the RGW 2012 onward. Note how the Relay Self-Backhaul IP endpoints 2022, 2024 are terminated at the IP Relay 2006 and RGW 2012.

An advantage of this architecture 2000 is that changes to other nodes can be mitigated (including mobile devices, NodeBs, RNC, SGSN, GGSN, and so forth). However, all packets pass through the gateway and thus can experience additional processing delays going up one protocol face (decoding) and down the other (encoding). Thus, even mobile devices, which are not on relays, have their traffic pass through RGW 2012 and experience those associated delays. This link referred to as a "Iu" interface, which may be time sensitive, and the link may not be tolerant of additional delay.

Figure 21:
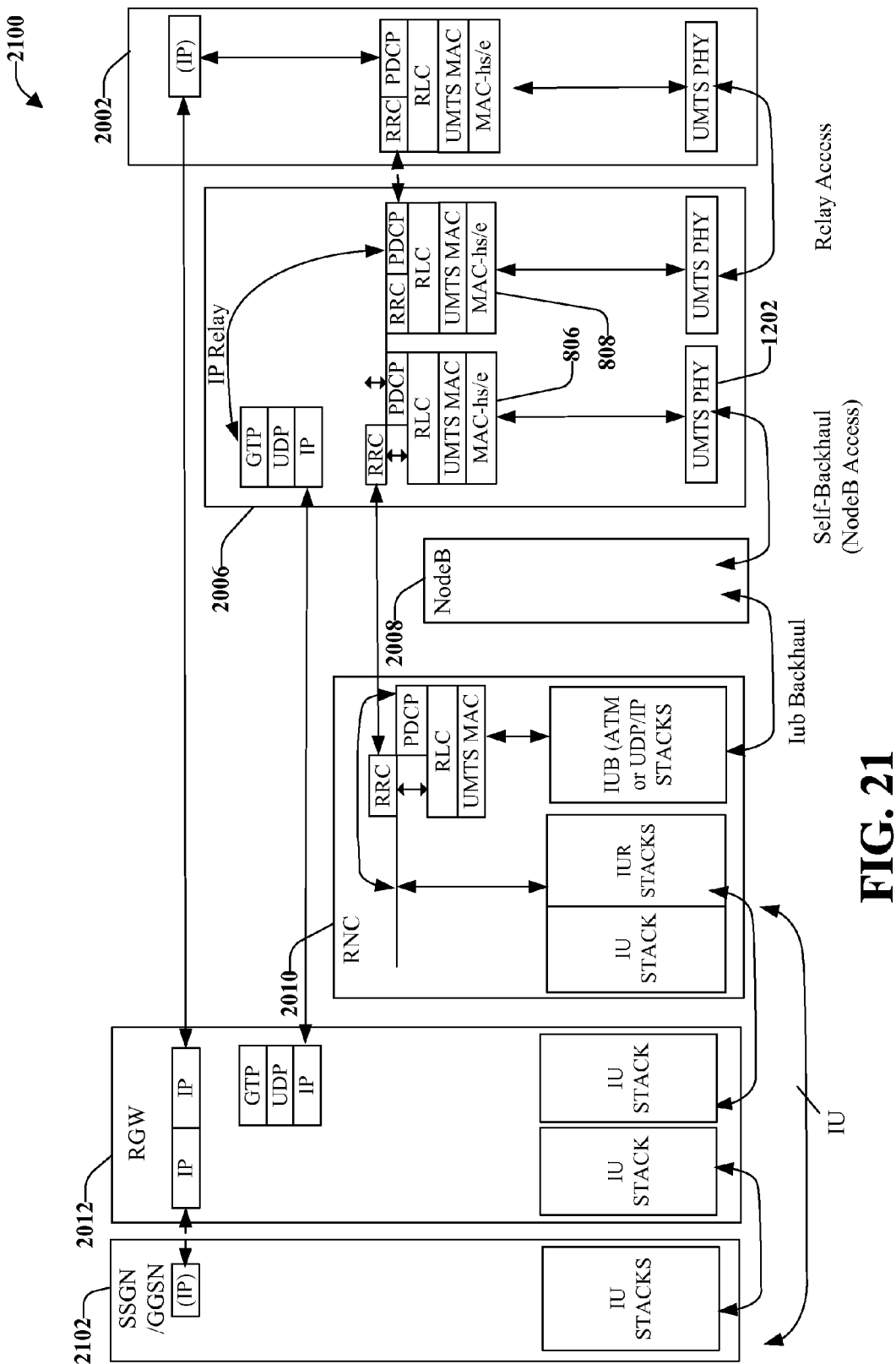
FIG. 21 illustrates protocols for a Relay Non-Relay Gateway architecture, according to an aspect.

FIG. 21 illustrates protocols for the Relay Non-Relay Gateway architecture 2100, according to an aspect. Note that the Iu connection between RNC 2010 and SGSN 2102 is split into two links by the RGW 2012 not just for mobile devices on Relay but for all mobile devices.

Figure 22:
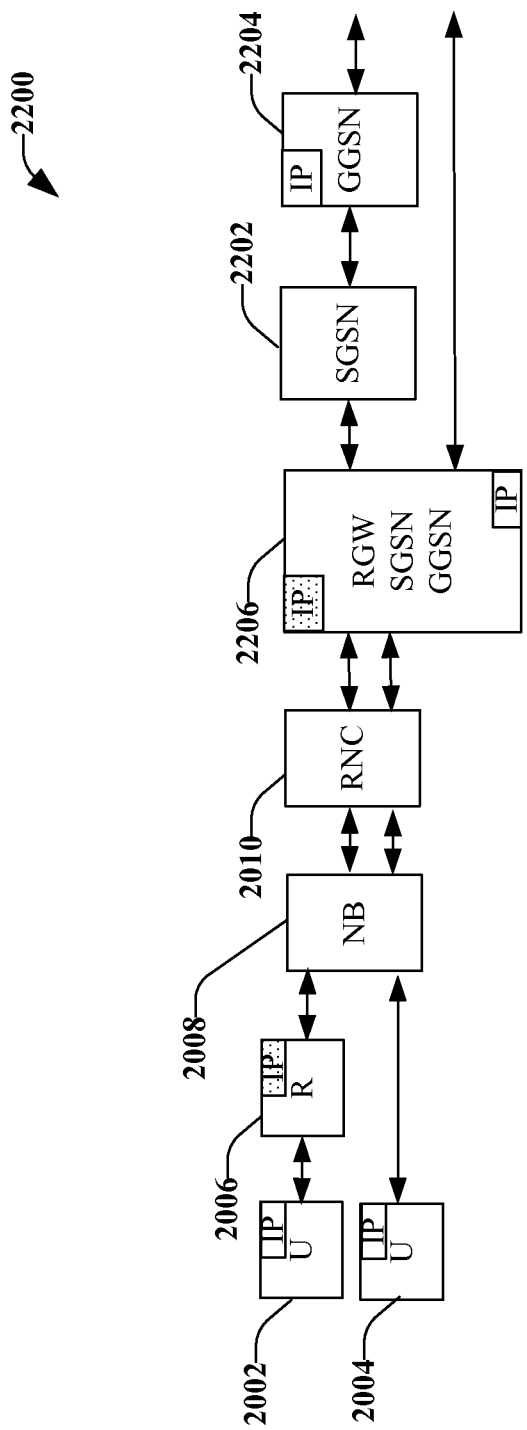
FIG. 22 illustrates a Relay Non-Relay Gateway Break-Out, according to an aspect.

FIG. 22 illustrates a Relay Non-Relay Gateway Break-Out representation 2200, according to an aspect. As mentioned above, an alternative for the core network face is to route incoming and/or outgoing traffic to a different SGSN 2202 GGSN 2204 or even to include SGSN, GGSN functionality in the RGW, illustrated at 2206 for Relay mobile devices as depicted in FIG. 21. However, this "break-out" concept does not avoid the latency problem.

Figure 23:
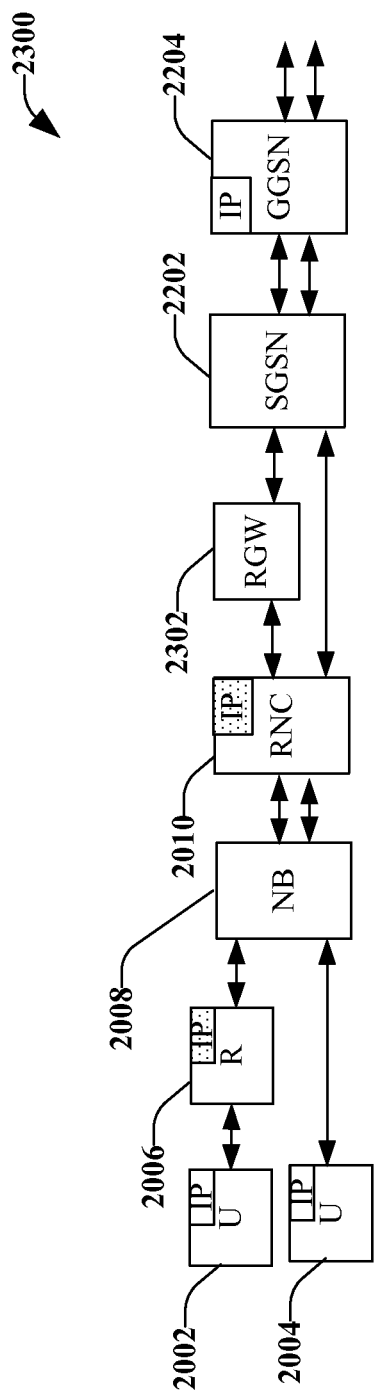
FIG. 23 illustrates a Relay Access Gateway schematic representation, according to an aspect.

With reference now to FIG. 23, illustrated is a Relay Access Gateway schematic representation 2300, according to an aspect. The Relay Access Gateway 2012 processes only traffic for mobile devices on Relays. This is achieved by modifying RNC 2010 to route Relay mobile device traffic through RGW 2302 and bypass it for non-Relay mobile devices. Generally, this can be performed by adding an IP layer with routing to RNC 2010. RGW 2302 can be addressed by IP Relay 2006 and routed there by RNC 2010, whereas other IP addresses bypass RGW 2302.

Figure 24:
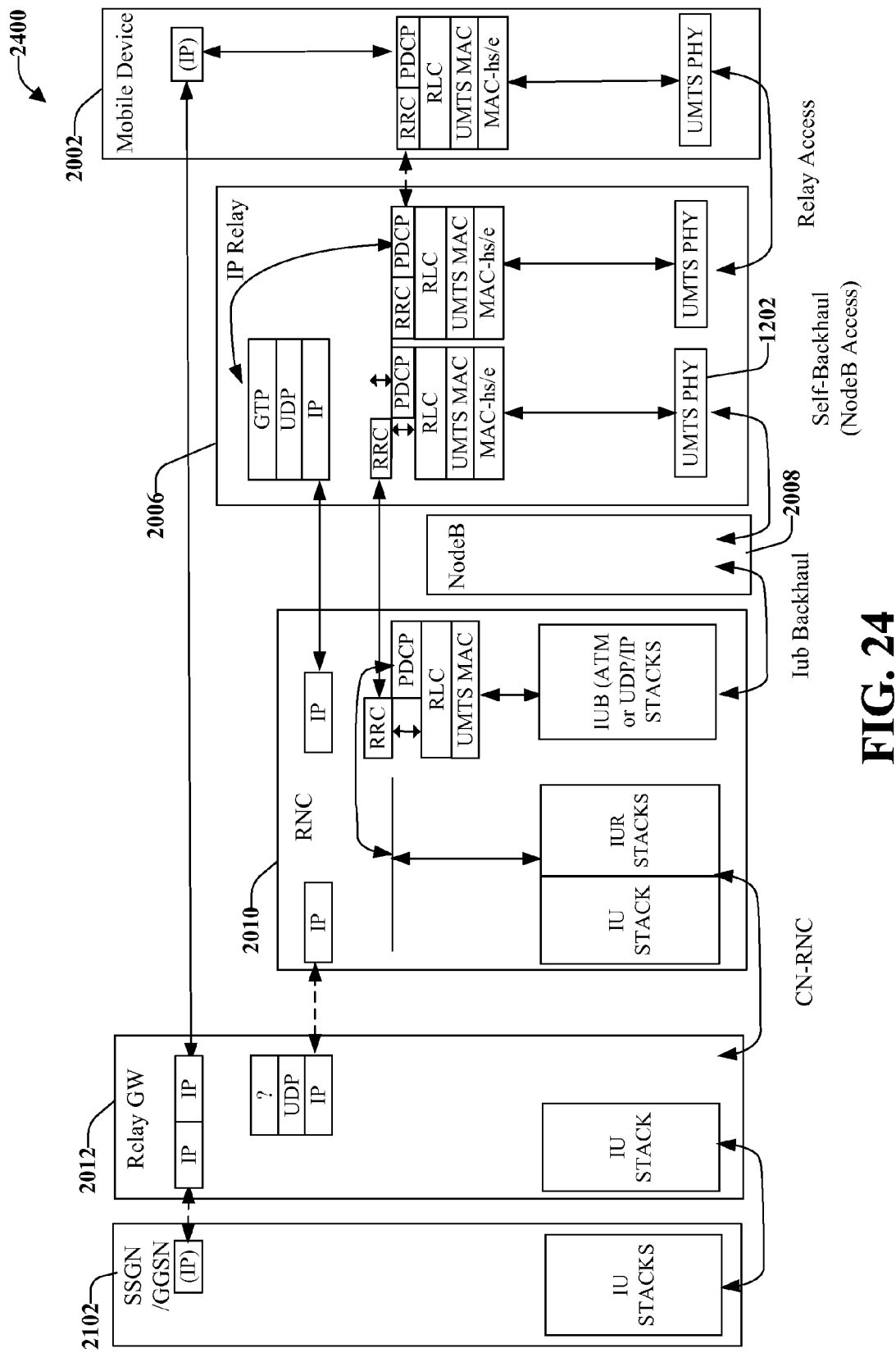
FIG. 24 illustrates a Relay Access Gateway protocol architecture, according to an aspect.
Figure 25:
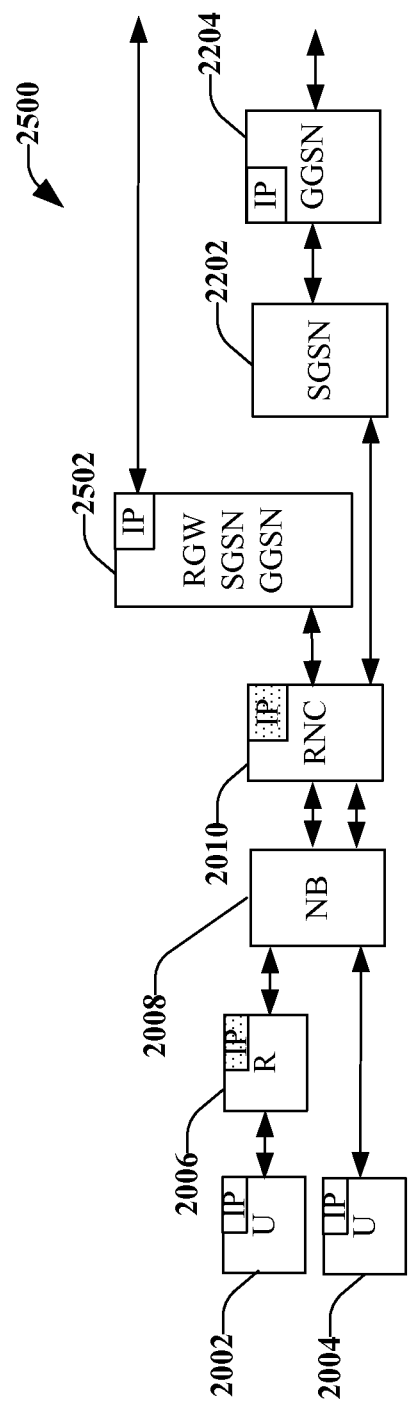
FIG. 25 illustrates a Relay Access Gateway Break-Out, according to an aspect.

One alternative (shown in FIG. 23) is to terminate the Relay Self-Backhaul IP at RNC 2010 (since an IP layer is added there anyway). Illustrated in FIG. 24 is a Relay Access Gateway protocol architecture 2400, according to an aspect and FIG. 25 illustrates a Relay Access Gateway Break-Out 2500, according to an aspect. These aspects involve continuing the Relay Self-Backhaul IP to RGW 2502. In this case both IP faces are at RNC 2010 (e.g., receive and transmit IP).

An advantage of the Relay Access Gateway is that non-Relay mobile devices do not suffer as much additional delays. However, there is still additional delay because of the IP layer in RNC, which routes traffic for mobile devices on Relays and for mobile devices not on Relays. However, compared to the above Relay Non-Relay Gateway design, there is not an additional Iu element inserted with all the Iu stack protocols. Another advantage of the Relay Access Gateway is that there are no modifications required for the core-network, mobile devices, or NodeBs. However, there are modifications to RNC 2010.

Figure 26:
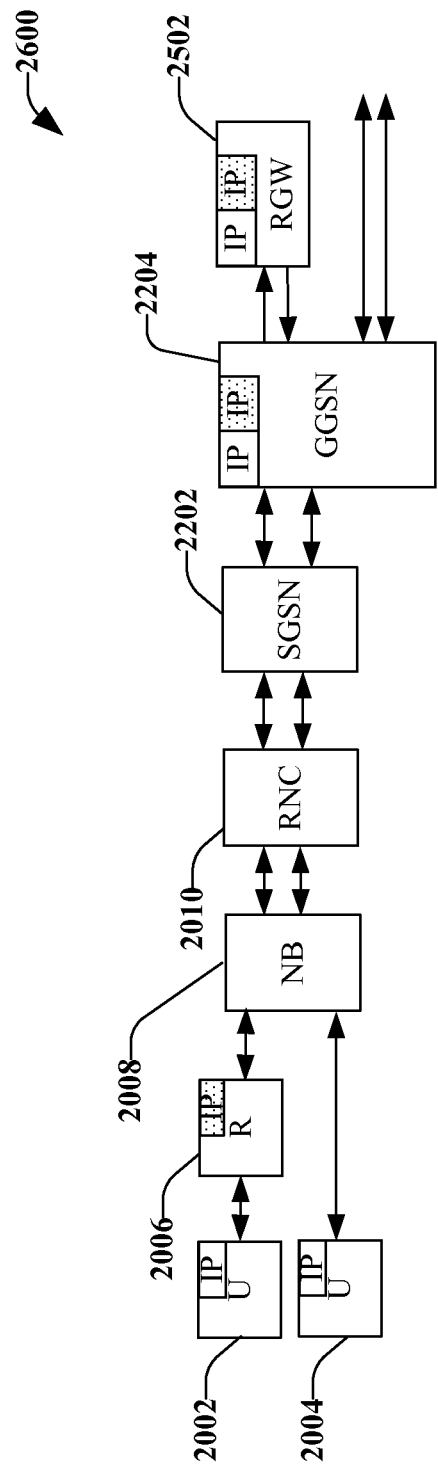
FIG. 26 illustrates a network design for a Relay Core Gateway for a Relay Gateway, according to an aspect.

FIG. 26 illustrates a network design 2600 for a Relay Core Gateway for the RGW, according to an aspect. This figure will be discussed with reference also to FIG. 27, which illustrates Relay Core Gateway Protocols from a protocol viewpoint 2700, according to an aspect, and FIG. 28, which illustrates a Relay Core Gateway Break-Out 2800, according to an aspect. Relay Core Gateway 2802 lies outside the access stratum scope, in a sense, past the GGSN. Since GGSN has IP, it can route IP packets. Thus, RGW 2802 can be connected directly or indirectly to the GGSN through IP connection(s) (even a generic IP network like the internet). IP Relay 2006 is treated by the UTRAN as a mobile device. IP traffic of IP Relay 2006 transports End-User traffic embedded in it, but that is transparent to NodeB 2008, RNC 2010, SGSN, and even GGSN. Since IP Relay 2006 can address the IP RGW, only Relay mobile device traffic goes to RGW 2502. Uplink End-User IP traffic is de-embedded by RGW 2502 from the Relay Self-Backhaul IP and forwarded back to the GGSN as if coming from another RNC/SGSN. Downlink End-User IP is embedded into Relay Self-Backhaul IP and forwarded back to the GGSN for transmission to the IP Relay. The IP Relay de-embeds the End-User IP and forward to the mobile device.

It should be noted that RGW 2502 may alternatively connect to two or more different GGSNs because the GGSN handling for the outside network connection may be different from the GGSN handling the Relay and mobile device. In other words, the Relay Self-Backhaul IP connection passes through one GGSN 2702 and is routed out to the RGW 2502 then back into a different GGSN 2702 to be routed out of the UTRAN to a destination network (e.g. destination server or second party of a VoIP call).

Figure 27:
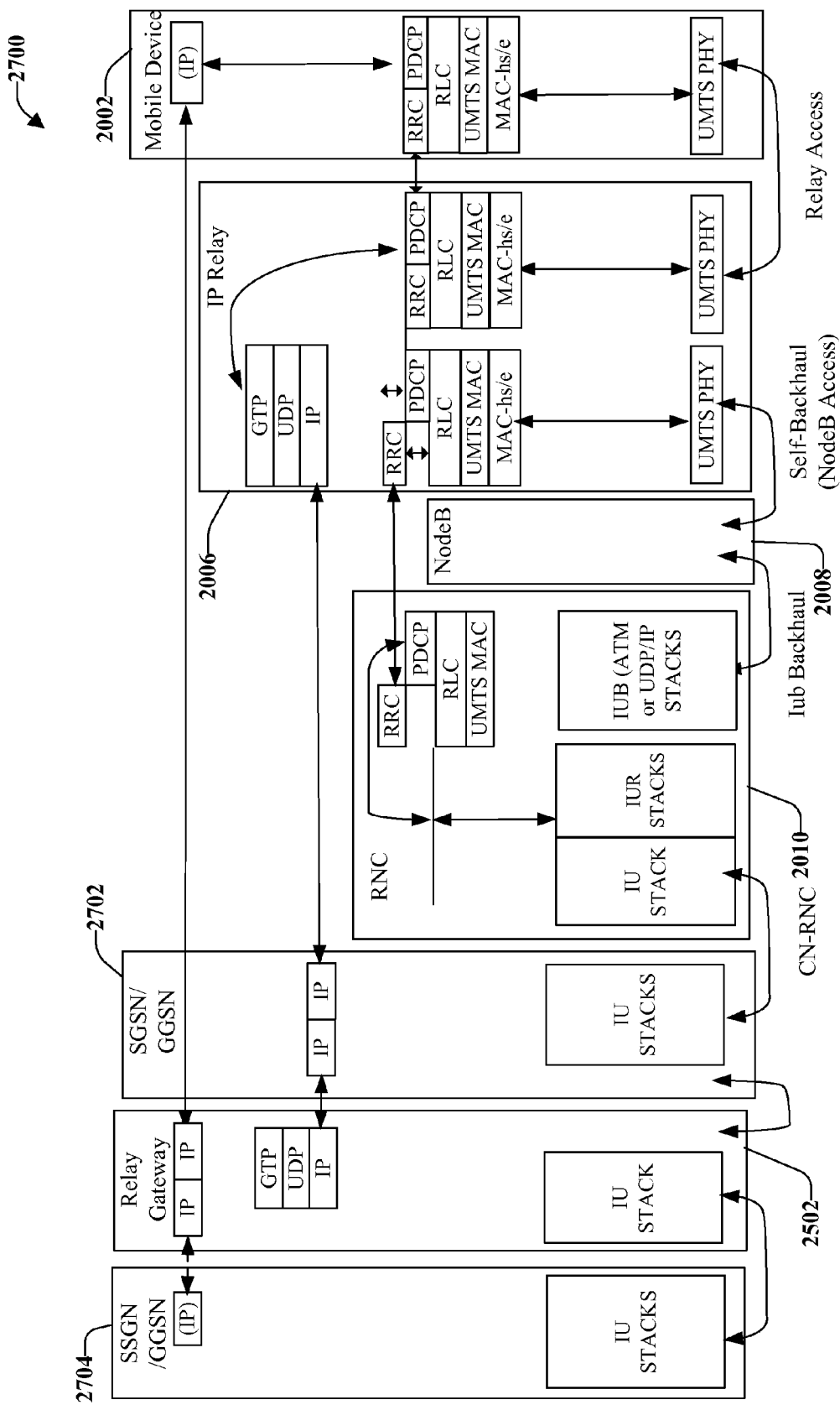
FIG. 27 illustrates Relay Core Gateway Protocols from a protocol viewpoint, according to an aspect.
Figure 28:
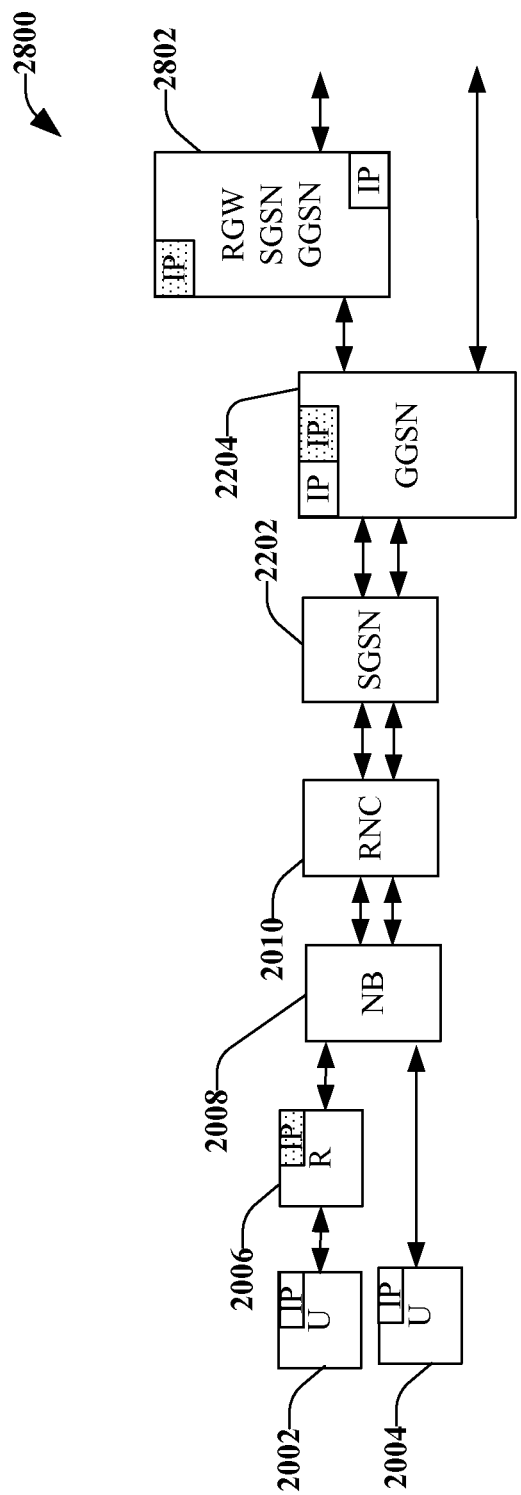
FIG. 28 illustrates a Relay Core Gateway Break-Out, according to an aspect.

There are several advantages to the aspect of FIG. 27. First, RNC, NodeB, SGSN, GGSN, and mobile device do not necessarily have to be modified. Second, mobile devices that are not on Relays do not incur additional delay since the Relay GW is not imposed in the connection path for those mobile devices.

In an alternative aspect, the Relay GW may appear to the GGSN as either a SGSN or RNC for delivering or accepting End User IP data while at the same time the Relay GW may appear to the GGSN as another (or the same) GGSN or RNC of delivering or accepting Relay Self-Backhaul IP data as if it is a mobile device. In other words, the mobile device may be virtually associated with the RGW (as if it was an RNC and NodeB) rather than the actual RNC and NodeB the mobile device is on). The RGW connects with the IP Relay but the IP Relay can be treated as a mobile device on the actual NodeB and RNC. The IP Relay then handles routing of packets from that point outward (to the mobile device). In accordance with some aspects, the break-out alternative can mitigate the latency of looping back into the GGSN and processing can be off-loaded from the core network.

In accordance with some aspects, aggregation is utilized. Aggregation consists of using a connection between the IP Relay and the Relay Gateway for the traffic of multiple End User mobile devices (either for the downlink, the uplink or both). For the downlink, the Relay Gateway multiplexes user traffic into one (or more) flow(s) to the IP Relay where the IP Relay de-multiplexes and sends the individual users' data to mobile devices. For the uplink, the IP Relay receives data from individual mobile devices, multiplexes user traffic into one (or more) flow(s) to the IP Relay where the Relay Gateway de-multiplexes. The IP Relay and Relay Gateway do not necessarily need to aggregate or to aggregate all users into one flow. They can aggregate groups of users or groups of flows across users, such as users with similar QoS requirements or user flows with similar QoS requirements. Furthermore, they can statistically aggregate on pre-allocated aggregate flow connections (with pre-configured QoS settings), thus statistically avoiding usage of all (or almost) all resources by one user and mitigating connection some setup times (for the aggregate flow across NodeB, RNC, SGSN, and so forth).

In accordance with some aspects, IP Relay, can include memory operatively coupled (internally or externally) to IP Relay. A processor can be coupled to memory and can be configured to execute instructions retained in memory. Memory can retain instructions related to utilizing base station protocols to communicate as a base station to a served mobile device and mobile device protocols to communicate with an intermediary base station as a mobile device. Memory can also retain instructions related to carrying data transparently across at least one intermediary network element.

In accordance with some aspects, a relay gateway is connected to a first support node. The data to or from the mobile device is communicated to or from the relay gateway though a relay self-backhaul internet protocol. The relay self-backhaul internet protocol carries the data to or from the mobile device and to or from the relay gateway transparently across the at least one intermediary network element. According to some aspects, the relay gateway is connected to a second support node, wherein the data to or from the mobile device is communicated to or from a destination through the second support node.

According to some aspects, IP Relay includes at least one processor (operatively connected to memory). Processor includes a first module that communicates with base station protocols to communicate as a base station to a served mobile device and with mobile device protocols to communicate with an intermediary base station as a mobile device. Processor also includes a second module that carries data transparently across at least one intermediary network element.

In view of exemplary systems shown and described above, methodologies that may be implemented in accordance with the disclosed subject matter, will be better appreciated with reference to various flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram. Further, the various methods disclosed herein can include employing a processor executing computer executable instructions stored on a computer readable storage medium to implement the methods.

Figure 29:
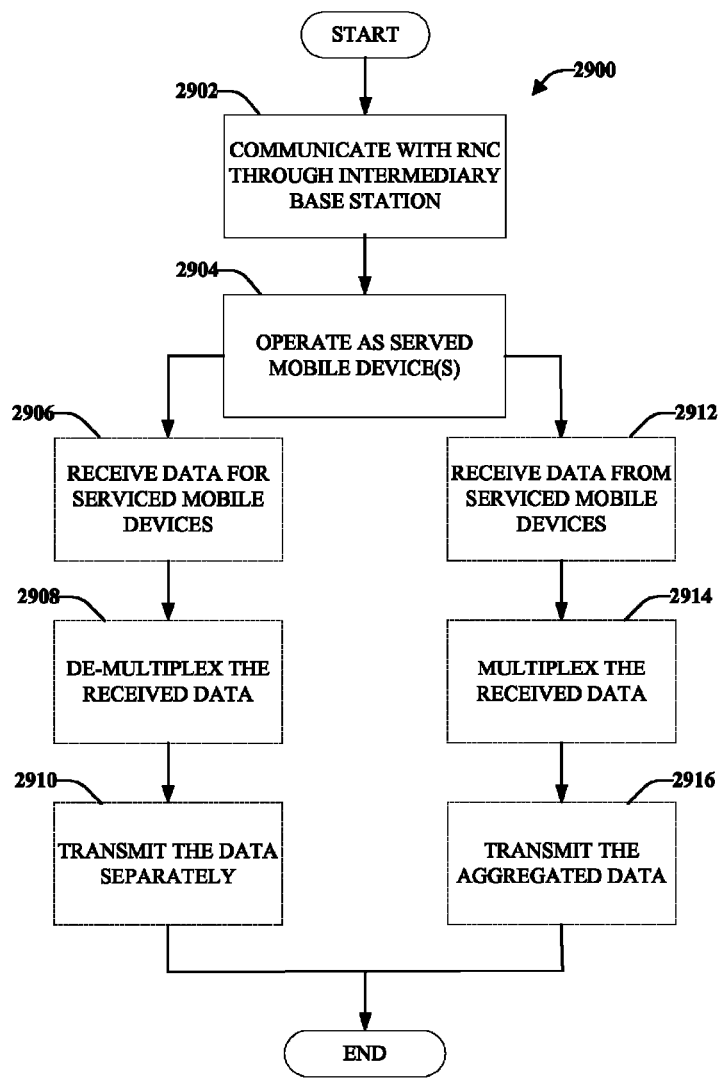
FIG. 29 illustrates a method for routing data in a multihop communication network.

FIG. 29 illustrates a method 2900 for routing data in a multihop communication network. Method 2900 can be performed by a relay. Relays, as disclosed herein provide several advantages. For example, relays can be provided with no wired backhaul installation and/or low maintenance costs. Relays can be fixed, portable, or mobile. Relays might have better antennas as compared to mobile devices. Further, relays can have architectures that are transparent to mobile devices and/or NodeBs. Higher-layer relays can be compatible with and have the potential to improve position location (and E911) trilateration. Additionally, a FDD relay is compatible with and/or facilitated by multi-carrier HSPA+.

Method 2900 starts, at 2902, by communicating with a radio network controller through an intermediary base station on behalf of a mobile device. The communicating can be a same signaling method as a signaling method used between the radio network controller and the intermediary base station.

Method 2900 continues, at 2904, by operating as at least one served mobile device. The operating can include using a first set of lower layer air interface protocol instances for a self-backhaul link between the relay and the intermediary base station. In accordance with some aspects, self-backhaul link can be wireless. Additionally, the relay can act as one or more mobile devices on behalf of the mobile devices served by the relay. The operating can also include using a second set of lower layer air interface protocol instances for a wireless access link to the at least one served mobile device.

In accordance with some aspects, method 2900 can continue, at 2906, with receiving data for the at least one service mobile device and at least a second served mobile device (or for multiple flows). The data can be received from an intermediary base station. The data can be received as a single flow. At 2908, the data received as the single flow is de-multiplexed. At 2910, the data is transmitted separately to the at least one served mobile device and the at least the second served mobile device.

Additionally or alternatively, method 2900 can continue, at 2912, when data is received from at least one served mobile device and at least a second served mobile device (or from multiple flows). At 2914, the data is multiplexed to create an aggregated data. The aggregated data is transmitted, at 2916, to the intermediary base station. Transmitting the aggregated data can include acting as one mobile device (or as one user flow).

According to some aspects, radio network controller and intermediary base station can utilize a first backhaul communication protocol. Radio network controller can include a second backhaul protocol above first backhaul protocol for communication with intermediary base station. Second backhaul can be embedded in the data transfer of first backhaul protocol and can be terminated at the relay instead of at the intermediary base station.

In accordance with some aspects, relay contains NodeB protocols (clients for the backhaul link and server instances for the access links to mobile devices). Relay can also contain the RNC interfacing functionality, similar to a NodeB but having distinctions relating to flow mapping and/or relaying and coordination according to alternatives aspects.

In accordance with some aspects, method 2900 can be included in a computer program product that includes a computer-readable medium (e.g., memory) that comprises codes for carrying out various aspects. Computer readable storage medium can include a first set of codes for causing a computer to communicate on behalf of a mobile device with a radio network controller through an intermediary base station. Computer readable storage medium can also include a second set of codes for causing the computer to operate as at least one served flow using a first set of lower layer air interface protocol instances and a second set of lower layer air interface protocol instances.

In accordance with some aspects, the computer readable storage medium includes a third set of codes for causing the computer to receive data as a single flow for the at least one served flow and at least a second served flow and a fourth set of codes for causing the computer to de-multiplex the data received as the single flow. Computer readable storage medium can also include a fifth set of codes for causing the computer to transmit the data separately to the at least one served flow and the at least the second served flow.

According to some aspects, the computer readable storage medium includes a third set of codes for causing the computer to receive data from at least two user flows. Also included is a fourth set of codes for causing the computer to multiplex the data to create an aggregated data and a fifth set of codes for causing the computer to convey the aggregated data to the intermediary base station.

Figure 30:
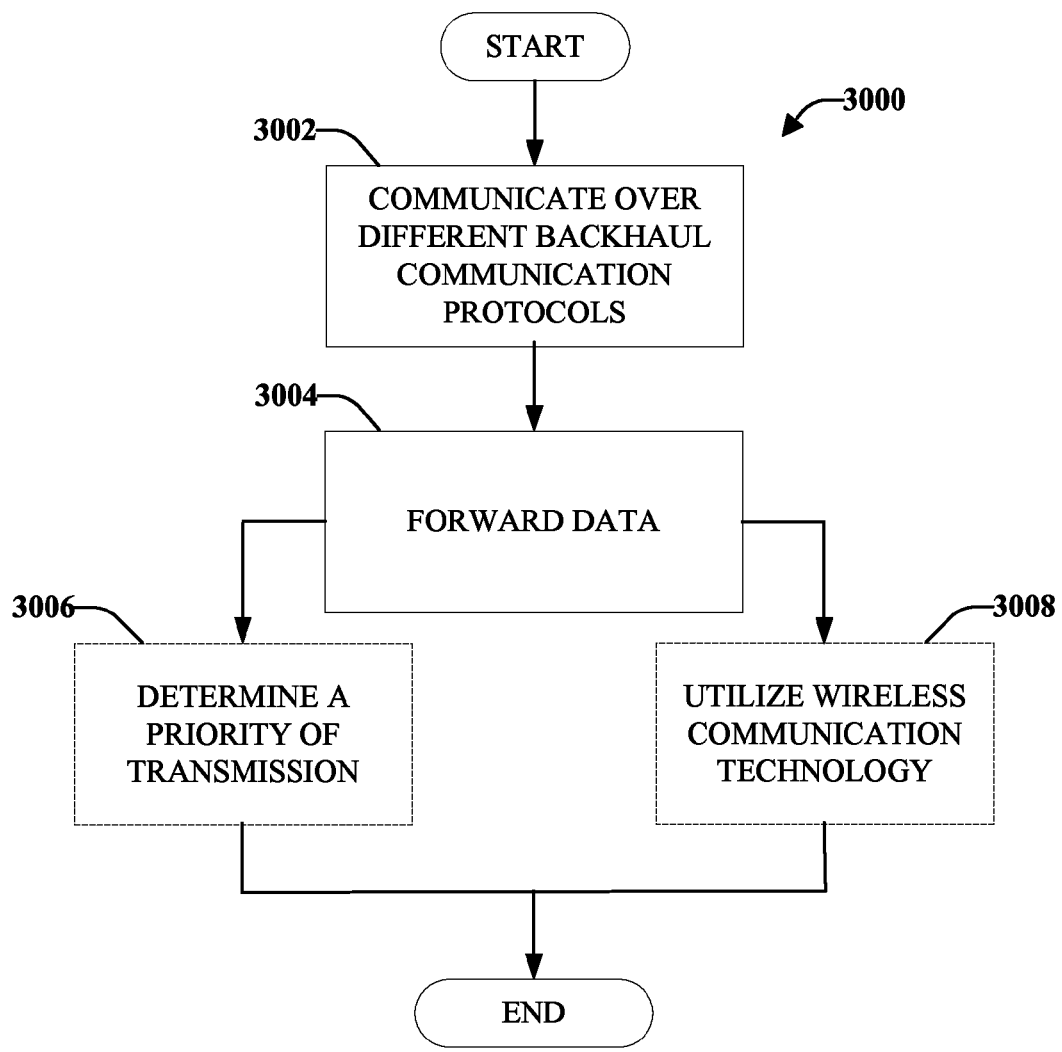
FIG. 30 illustrates a method for communicating in a multihop communication network.

FIG. 30 illustrates a method 3000 for communicating in a multihop communication network. Method 3000 can be performed by a base station. Method 3000 starts, at 3002, by communicating with a radio network controller with a first backhaul communication protocol and communicating with a relay with a second backhaul communication protocol. First backhaul communication protocol can include data (or signaling) between the relay and the radio network controller. Method 3000 continues, at 3004, with forwarding data (or generating signaling) for the relay on the second backhaul communication protocol based on information included in the first backhaul communication protocol (or vice versa). In accordance with some aspects, the intermediary base station is an intermediary agent for the radio network controller.

In accordance with some aspects, method 3000 continues, at 3006, by determining a priority of transmission to the relay as a function of priorities of one or more mobile devices served by the relay or as a function of a number of mobile devices served by the relay. For example, a relay is supporting three mobile devices and there are an additional three mobile devices reporting directly to NodeB (that hosts the relay). Thus, there are a total of six mobile devices. NodeB might not know there is a relay and might treat that relay as a mobile device (in this case, NodeB believes there are only four mobile devices, not six). Thus, the mobile devices served by the relay will not be served equally since relay will only receive a fourth of the priority, when it should have half of the priority (since there are three mobile devices served by relay and three served by NodeB). To overcome this, the relay can be treated with a higher priority relative to the number of mobile devices that relay is serving. This priority can be set by the RNC, according to some aspects. According to other aspects, the relay might have different priorities for its flow, thus, relay might obtain proportionally more service. In accordance with some aspects, intermediary base station performs the scheduling based on priority for a relay, which might be based on the number of mobile devices served by the relay.

Additionally or alternatively, at 3008, a wireless communication technology can be utilized by intermediary base station to communicate with multihop communication network. In accordance with some aspects, a different communication can be utilized, wherein a first wireless communication technology is utilized to communicate with the multihop communication network and a second wireless communication technology is utilized to communicate with the radio network controller. According to some aspects, the wireless communication technology can be HSPA from a mobile device to the relay and HSPA from the relay to NodeB and microwave can be utilized to transmit to the RNC. However, it should be understood that other wireless communication technologies can be utilized with the disclosed aspects and two or more wireless communication technologies can be utilized in a single network.

Figure 31:
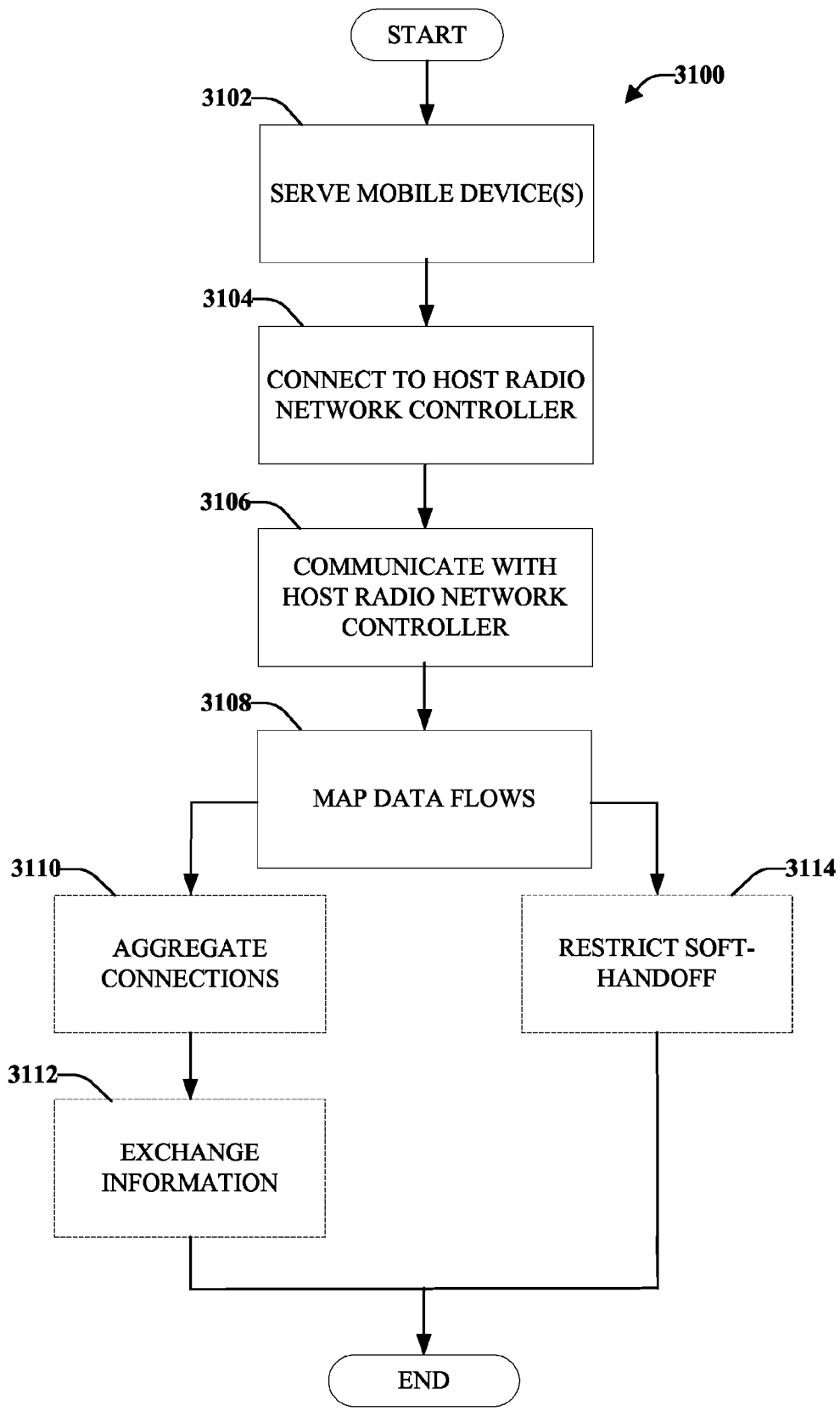
FIG. 31 illustrates a method for conveying data in a wireless communications network.

FIG. 31 illustrates a method 3100 for conveying data in a wireless communications network. Method 3100 can be performed by a relay. Method 3100 starts, at 3102, when at least one mobile device is served over a wireless access link. Serving the at least one mobile device can include using a first physical layer, data link layer protocol stack and radio resource control server.

Method 3100 continues, at 3104, with connecting to a host radio network controller with a second physical layer, data link layer protocol stack and a radio resource control client. The connection can be over a wireless backhaul link to an intermediary base station. In accordance with some aspects, the data link layer protocol stack for the (access and/or backhaul) link includes radio link control protocol including flow control.

At 3106, method 3100 communicates with the host radio network controller with a remote radio network control protocol that is transparent to the intermediary base station. Data flows are mapped between the wireless backhaul link and the wireless access link, at 3108. The mapping is performed with coordination information communicated over the remote radio network control protocol.

In accordance with some aspects, method 3100 continues, at 3110, with aggregating a connection to a served mobile device with another connection over a backhaul link. At 3112, information is exchanged with the host radio network controller to map non-aggregated access links for connections to an aggregated backhaul link.

In accordance with some aspects, host radio network controller can manage radio resource control for the backhaul link. This can include prioritization for the intermediary base station scheduling. Host radio network controller can communicate the prioritization to the relay. Further, the relay can manage radio resource control, including prioritization for scheduling for the access link consistent with the prioritization used by the host radio network controller.

According to some aspects, measurements reports (and controls) of relay conditions are communicated to host radio network controller. Host radio network controller determines whether mobile device should be handed off from a base station (not necessarily the intermediary base station) to the relay (or vice versa).

According to other aspects, measurements report (and controls) of conditions of radio resources controlled by host radio network controller are communicated from host radio network controller to relay. Relay determines whether mobile device should be handed off from a base station (not necessarily the intermediary base station) to the relay (or vice versa).

In accordance with some aspects, method 3100 includes receiving, from host radio network controller, lower layer (MAC) frames in advance of those frames being forwarded (by host radio network controller) to a base station (not necessarily the intermediary base station. In this case, method 3100 includes bypassing the upper layers and transmits the lower layer (MAC) frames at substantially the same time as the base station (or vice versa).

According to some aspects, in anticipation of handing off mobile device away from the relay, radio network controller reduces the size of a buffer (or window) for the mobile device data at the relay by communicating to the relay and the handoff delay (or interruption) is thereby mitigated. In accordance with some aspects, the buffer control is communicated over the remote radio network controller protocol and the buffer is the radio link control flow controlled buffer.

Additionally or alternatively, method 3100 includes, restricting a mobile device served by the relay from being in soft-handoff and a mobile device served by a regular base station from being in soft-handoff with a relay. In accordance with some aspects, method 3100 includes restricting a mobile device served by the relay from being in soft-handoff with another regular base station but not another relay. In accordance with some aspects, a host radio network controller can restrict the soft-handoff.

In accordance with some aspects, method 3100 can be included in a computer program product that includes a computer-readable medium (e.g., memory) that comprises codes for carrying out various aspects. Computer readable storage medium can include a first set of codes for causing a computer to serve at least one mobile device over a wireless access link, wherein the serving comprises using a first physical layer, data link layer protocol stack and radio resource control server. Also included can be a second set of codes for causing the computer to connect to a host radio network controller with a second physical layer, data link layer protocol stack and a radio resource control client, wherein the connecting is over a wireless backhaul link to an intermediary base station. Further, computer readable storage medium can include a third set of codes for causing the computer to communicate with the host radio network controller with a remote radio network control protocol that is transparent to the intermediary base station. Also included can be a fourth set of codes for causing the computer to map data flows between the wireless backhaul link and the wireless access link with coordination information communicated over the remote radio network control protocol.

Figure 32:
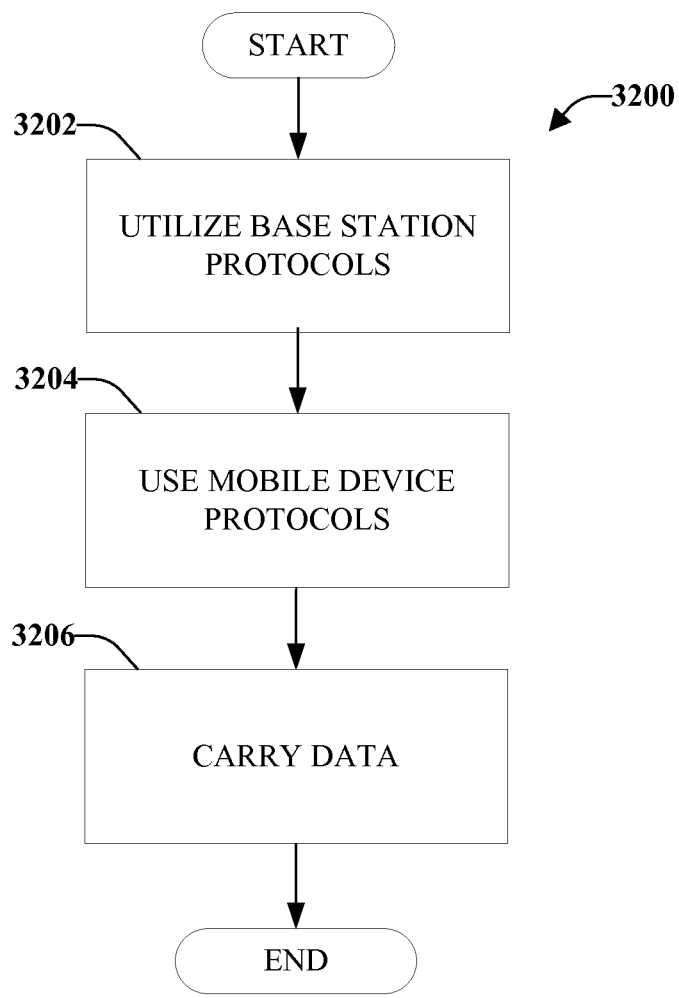
FIG. 32 illustrates a method for conveying relayed data in a wireless communications network.

FIG. 32 illustrates a method 3200 for conveying relayed data in a wireless communications network. Method 3200 can be performed by a relay. Method 3200 starts, at 3202, when base station protocols are utilized to communicate as a base station to a served mobile device. At 3204, mobile device protocols are utilized to communicate (as a mobile device) with an intermediary base station. At 3206, data is carried transparently across at least one intermediary network element. The relay can have a relay self-backhaul internet protocol to carry data to or from the mobile device and to or from a relay gateway transparently across the at least one intermediary network element.

In accordance with some aspects, multi-hop cellular communication network includes a relay gateway with a relay self-backhaul internet protocol when a mobile device is on a relay and pass-through protocols when a mobile device is not on a relay. The relay gateway can be connected between a radio network controller and a support node. Data to or from the mobile device, connected to the relay, can be communicated to or from the relay gateway through the relay self-backhaul internet protocol. Data to or from a mobile device, not connected to the relay, can be communicated to or from the relay gateway without the relay self-backhaul protocol.

In accordance with some aspects, provided is a relay gateway with protocols for coordinating a mobile device communication by a relay though an intermediate base station, wherein the relay gateway processes only data for mobile terminals that are served by relays. The relay gateway can be connected to a first support node and data to or from mobile devices connected to the relay can be communicated to or from the relay gateway by the relay self-backhaul internet protocol. The relay gateway can be connected to a second support node and to or from mobile devices connected to the relay can be communicated to or from the destination by the second support node. In accordance with some aspects, the first support node is the same node as the second support node.

In accordance with some aspects, the relay gateway is connected to a first support node and data to or from mobile devices connected to the relay is communicated to or from the relay gateway by a radio network controller. The radio network controller routes data to the relay gateway if the mobile device is served by the relay and the relay gateway is connected to a second support node and to or from mobile devices connected to the relay is communicated to or from the destination by the second support node. In accordance with some aspects, the first support node is the same node as the second support node.

In accordance with some aspects, method 3200 can be included in a computer program product that includes a computer-readable medium (e.g., memory) that comprises codes for carrying out various aspects. Computer readable storage medium can include a first set of codes for causing a computer to communicate, as a base station, with base station protocols and to communicate as a mobile device, with mobile device protocols. Computer readable storage medium can also include a second set of codes for causing the computer to relay data transparently across at least one intermediary network element.

Figure 33:
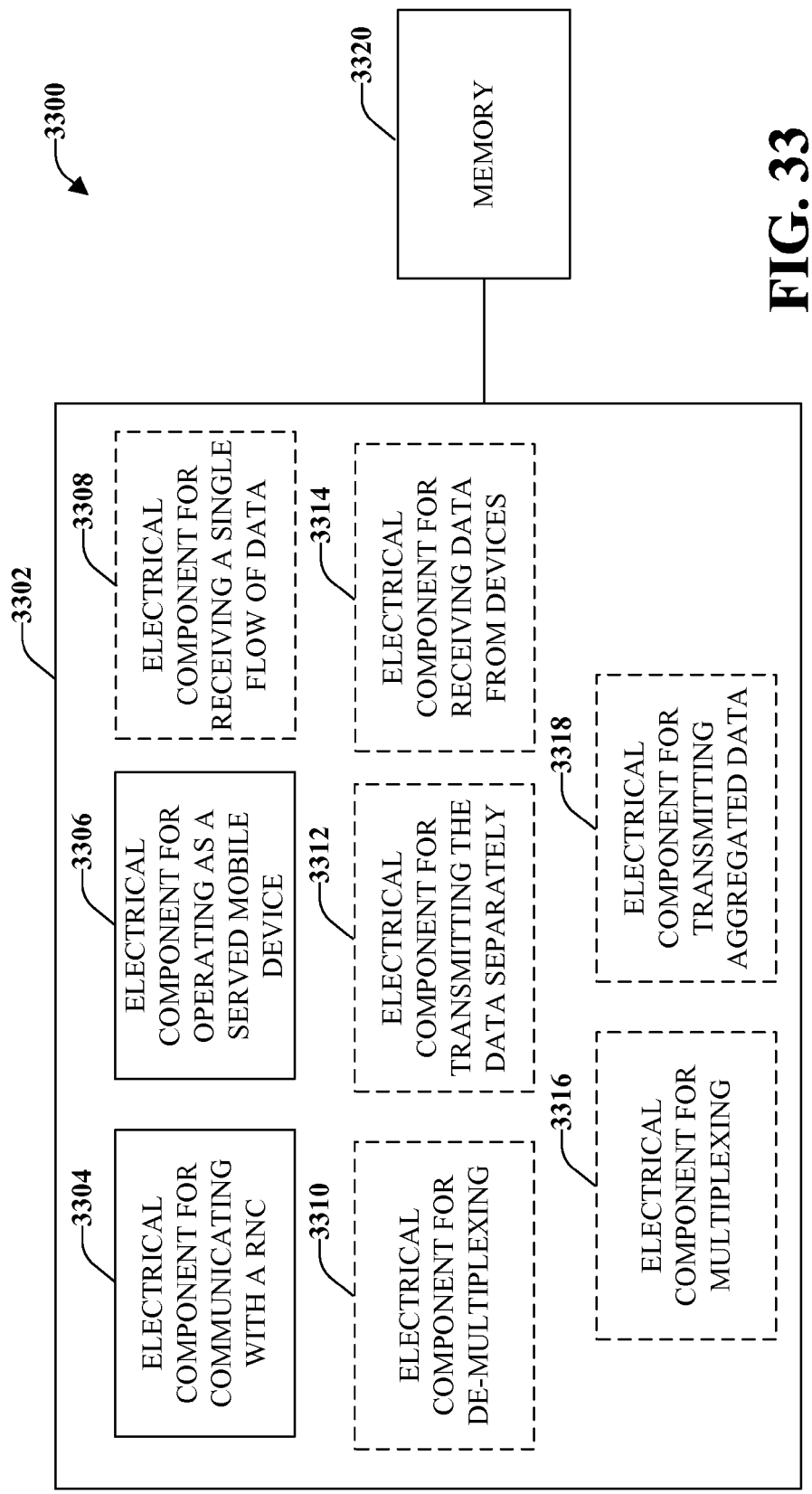
FIG. 33 illustrates an example system that facilitates routing data in a multihop communication network, according to an aspect.

With reference to FIG. 33, illustrated is an example system 3300 that facilitates routing data in a multihop communication network, according to an aspect. System 3300 may reside at least partially within a relay and is represented as including functional blocks, which may be functional blocks that represent functions implemented by a processor, software, or combination thereof (e.g., firmware).

System 3300 includes a logical grouping 3302 of electrical components that can act separately or in conjunction. Logical grouping 3302 includes an electrical component 3304 for communicating with a radio network controller though an intermediary base station on behalf of a mobile device. Electrical component 3304 can communicate using a same signaling method as the signaling method used between the radio network controller and the intermediary base station.

Logical grouping 3302 also includes an electrical component 3306 for operating as at least one served mobile device. Electrical component 3306 can use a first set of lower layer air interface protocol instances for a self-backhaul link between a relay and intermediary base station and a second set of lower layer air interface protocol instances for a wireless access link to the at least one served mobile device.

In accordance with some aspects, logical grouping 3302 includes an electrical component 3308 or receiving, from the intermediary base station, data for the at least one served mobile device and at least a second served mobile device. The data is received as a single flow. Also included is an electrical component 3310 for de-multiplexing the data received as the single flow and an electrical component 3312 for transmitting the data separately to the at least one served mobile device and the at least the second served mobile device.

According to some aspects, logical grouping 3302 includes an electrical component 3314 for receiving data from the at least one served mobile device and the at least a second served mobile device. Also included is an electrical component 3316 for multiplexing the data to create an aggregated data and an electrical component 3318 for transmitting the aggregated data to the intermediary base station.

Additionally, system 3300 can include a memory 3320 that retains instructions for executing functions associated with electrical components 3304, 3306, 3308, 3310, 3312, 3314, 3316, and 3318 or other components. While shown as being external to memory 3320, it is to be understood that one or more of electrical components 3304, 3306, 3308, 3310, 3312, 3314, 3316, and 3318 can exist within memory 3320.

Figure 34:
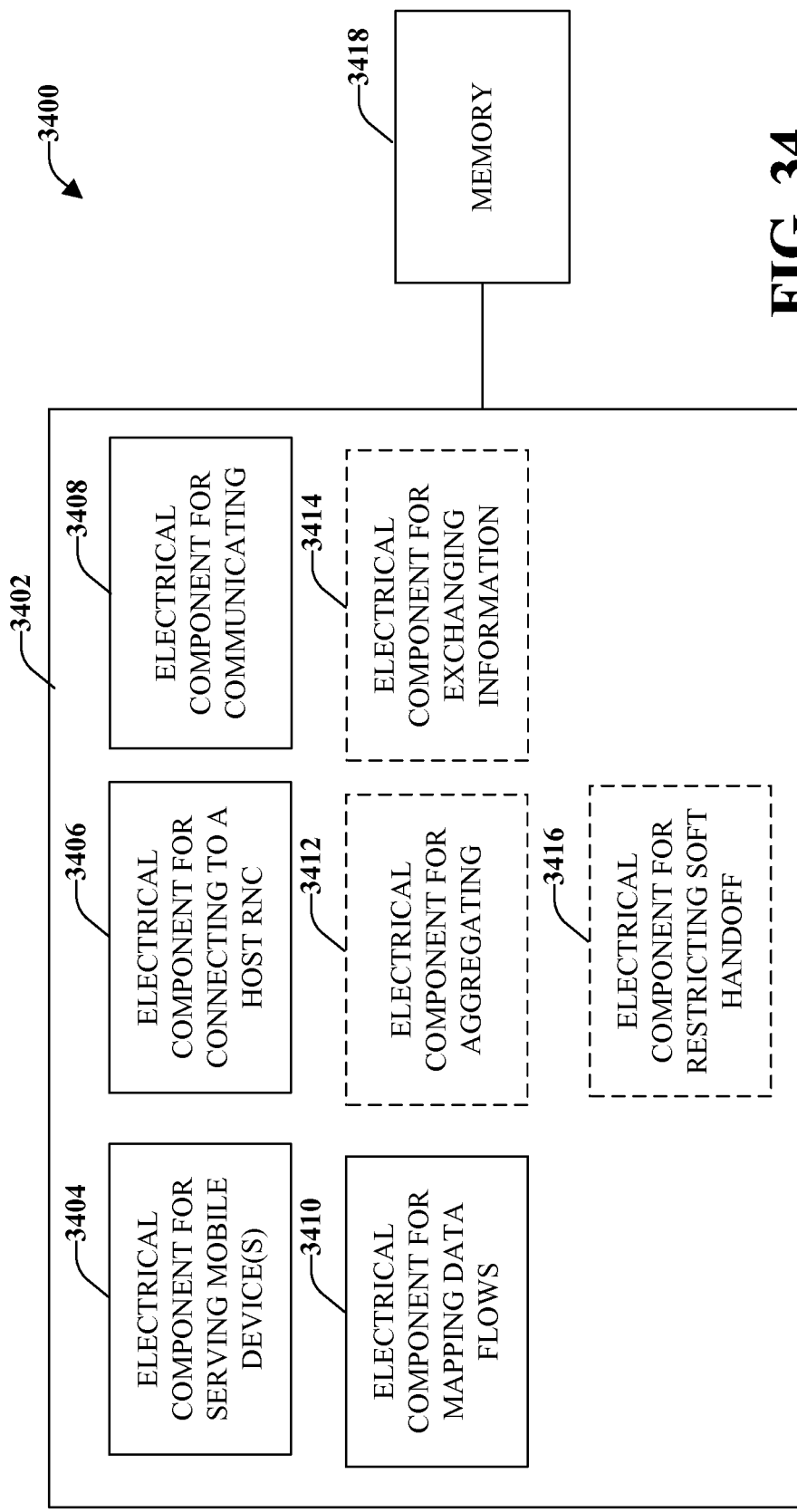
FIG. 34 illustrates an example system that facilitates conveying data in a wireless communications network, according to an aspect.

FIG. 34 illustrates an example system 3400 that facilitates conveying data in a wireless communications network, according to an aspect. System 3400 may reside at least partially within a relay and is represented as including functional blocks in a logical grouping 3402, which may be functional blocks that represent functions implemented by a processor, software, or combination thereof (e.g., firmware). The electrical components can act separately or in conjunction.

Logical grouping 3402 includes an electrical component 3404 for serving at least one mobile device over a wireless access link though use of a first physical layer, data link layer protocol stack and radio resource control server. Also included is an electrical component 3406 for connecting to a host radio network controller with a second physical layer, data link layer protocol stack and a radio resource control client over a wireless backhaul link to an intermediary base station.

Further, logical grouping 3404 includes an electrical component 3408 for communicating with the host radio network controller with a remote radio network control protocol that is transparent to the intermediary base station. Also included is an electrical component 3410 for mapping data flows between the wireless backhaul link and the wireless access link with coordination information communicated over the remote radio network control protocol.

In accordance with some aspects, logical grouping 3402 includes an electrical component 3412 for aggregating a connection to a served mobile device with another connection over a backhaul link and an electrical component 3414 for exchanging information with the host radio network controller to map non-aggregated access links for connections to an aggregated backhaul link. Additionally or alternatively, logical grouping 3402 includes an electrical component 3416 for restricting at least one served mobile device from being in soft-handoff and a mobile device served by a base station from being in soft-handoff with a relay.

Additionally, system 3400 can include a memory 3418 that retains instructions for executing functions associated with electrical components 3404, 3406, 3408, 3410, 3412, 3414, 3416, and 3418 or other components. While shown as being external to memory 3418, it is to be understood that one or more of electrical components 3404, 3406, 3408, 3410, 3412, 3414, and 3416, and 3418 can exist within memory 3418.

Figure 35:
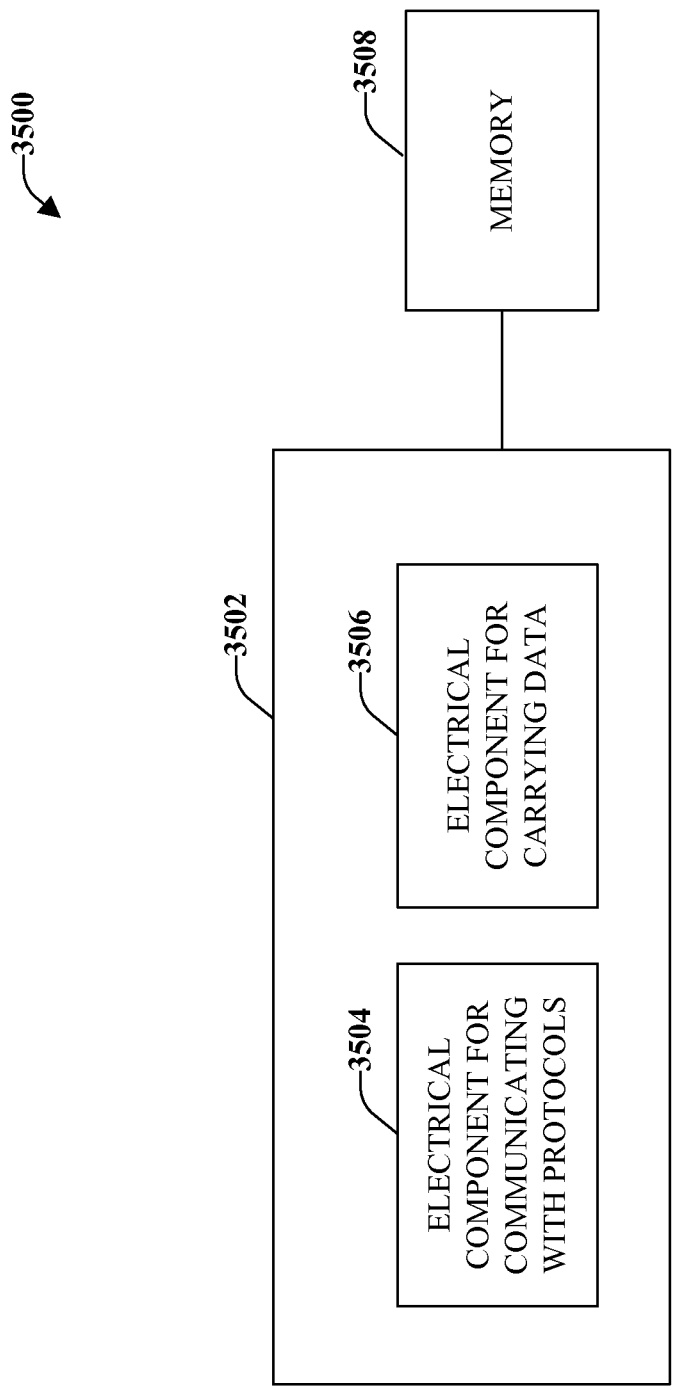
FIG. 35 illustrates an example system that facilitates conveying relayed data in a wireless communications network, according to an aspect.

FIG. 35 illustrates an example system 3500 that facilitates conveying relayed data in a wireless communications network, according to an aspect. System 3500 may reside at least partially within a relay and is represented as including functional blocks in a logical grouping 3502, which may be functional blocks that represent functions implemented by a processor, software, or combination thereof (e.g., firmware). The electrical components can act separately or in conjunction.

Logical grouping 3502 includes an electrical component 3504 for communicating with different protocols. Base station protocols are used to communicate as a base station to a served mobile device and mobile device protocols are used to communicate with an intermediary base station as a mobile device. Logical grouping 3502 also includes an electrical component 3506 for carrying data transparently across at least one intermediary network element. In accordance with some aspects, system 3500 comprises a relay self-backhaul internet protocol that carries data to or from the mobile device and to or from a relay gateway transparently across the at least one intermediary network element.

System 3500 can include a memory 3508 that retains instructions for executing functions associated with electrical components 3404 and 3406. While shown as being external to memory 3508, it is to be understood that one or more of electrical components 3404 and 3406 can exist within memory 3508.

Figure 36:
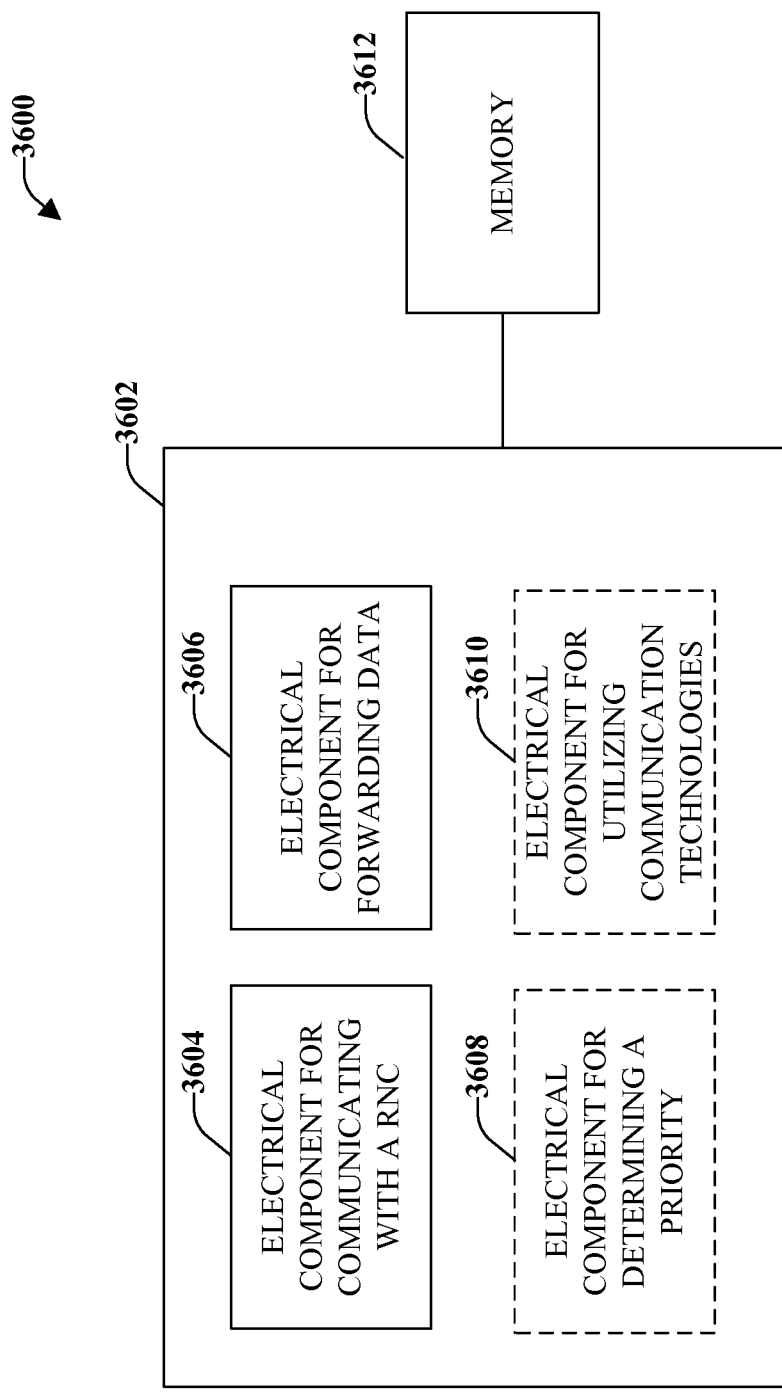
FIG. 36 illustrates an example system that facilitates conveying relayed data in a wireless communications network, according to an aspect.

FIG. 36 illustrates an example system 3600 that facilitates conveying relayed data in a wireless communications network, according to an aspect. System 3600 may reside at least partially within a base station and is represented as including functional blocks in a logical grouping 3602, which may be functional blocks that represent functions implemented by a processor, software, or combination thereof (e.g., firmware). The electrical components can act separately or in conjunction.

Logical grouping 3602 includes an electrical component 3604 for communicating with a radio network controller with a first backhaul communication protocol and with a relay with a second backhaul communication protocol. The first backhaul communication protocol includes data between the relay and the radio network controller. Also included is an electrical component 3606 for forwarding the data for the relay on the second backhaul communication protocol based on information included in the first backhaul communication protocol.

In accordance with some aspects, logical grouping 3602 includes an electrical component 3608 for determining a priority of transmission to the relay as a function of priorities of one or more mobile devices served by the relay or as a function of a number of mobile devices served by the relay. Additionally or alternatively, logical grouping 3602 includes an electrical component 3610 for utilizing a first wireless communication technology to communicate with the multihop communication network and a second wireless communication technology to communicate with the radio network controller.

System 3600 can include a memory 3612 that retains instructions for executing functions associated with electrical components 3604, 3606, 3608, and 3610. While shown as being external to memory 3612, it is to be understood that one or more of electrical components 3604, 3606, 3608, and 3610 can exist within memory 3612.

Figure 37:
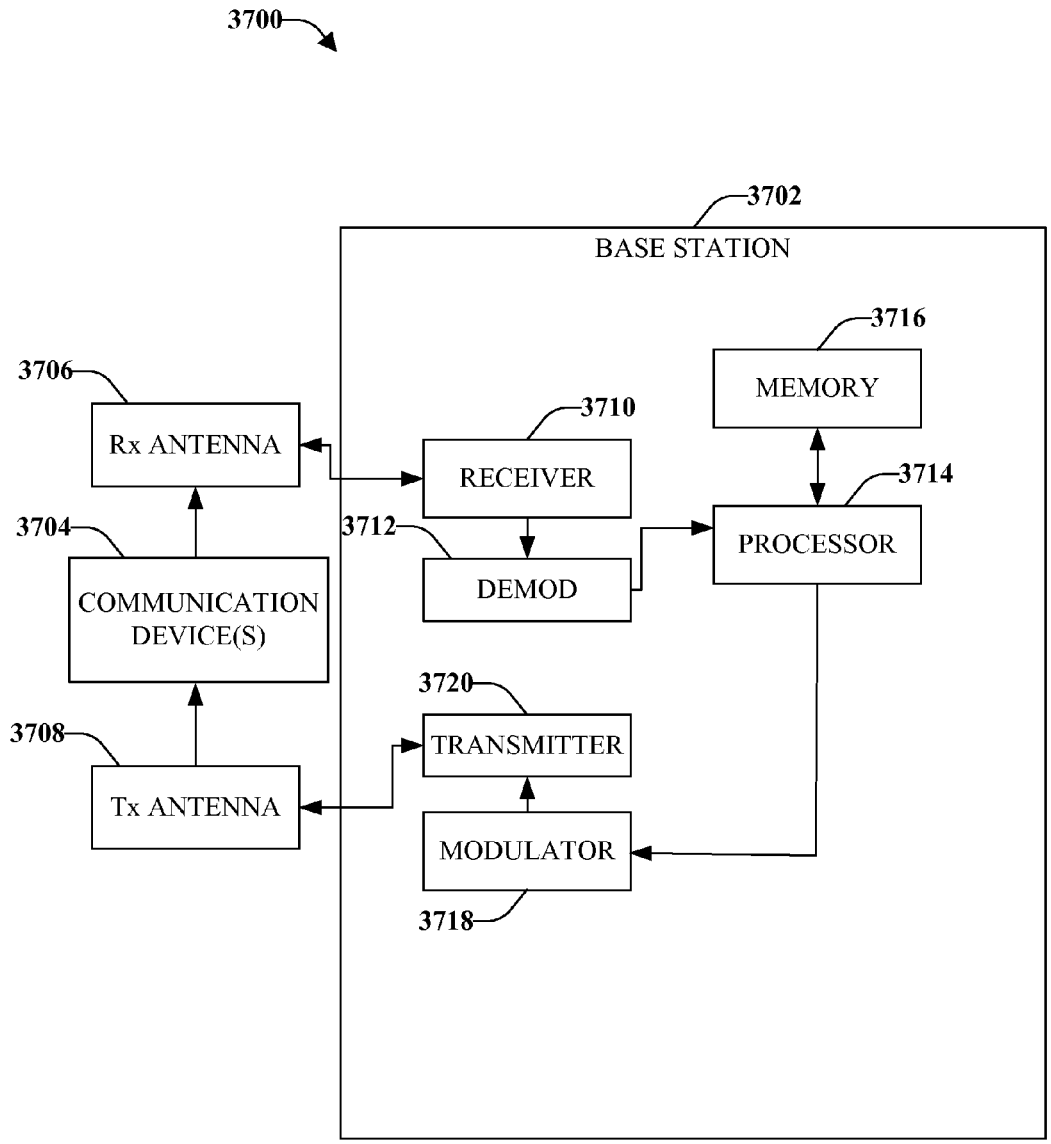
FIG. 37 illustrates a system that facilitates relaying in a multi-hop cellular communications system, in accordance with one or more of the disclosed aspects.

FIG. 37 is an illustration of a system 3700 that facilitates routing data in accordance with various aspects presented herein. System 3700 comprises a base station or access point 3702. However, in accordance with some aspects, system 3700 can be included in a relay, as discussed herein. As illustrated, base station 3702 receives signal(s) from one or more communication devices 3704 (e.g., user device) by a receive antenna 3706, and transmits to the one or more communication devices 3704 through a transmit antenna 3708.

Base station 3702 comprises a receiver 3710 that receives information from receive antenna 3706 and is operatively associated with a demodulator 3712 that demodulates received information. Demodulated symbols are analyzed by a processor 3714 that is coupled to a memory 3716 that stores information related to inter-radio access technology interworking. A modulator 3718 can multiplex the signal for transmission by a transmitter 3720 through transmit antenna 3708 to communication devices 3704.

In accordance with some aspects, system 3700 can be a computer program product that includes a computer-readable medium (e.g., memory 3716) that comprises codes for carrying out various aspects. Memory 3710 can store information related to coordinating communications and any other suitable information. Memory 3710 can additionally store protocols associated with relaying data.

Memory 3710 can retain instructions related to communicating with a radio network controller with a first backhaul communication protocol and with a relay with a second backhaul communication protocol, wherein the first backhaul communication protocol includes data between the relay and the radio network controller. Memory 3710 can also retain instructions related to forwarding the data for the relay on the second backhaul communication protocol based on information included in the first backhaul communication protocol.

In accordance with some aspects, memory 3710 retains further instructions related to determining a priority of transmission to the relay as a function of priorities of one or more mobile devices served by the relay or as a function of a number of mobile devices served by the relay. According to some aspects, memory 3170 retains further instructions related to utilizing a first wireless communication technology to communicate with the multihop communication network and a second wireless communication technology to communicate with the radio network controller.

It will be appreciated that data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the various aspects is intended to comprise, without being limited to, these and any other suitable types of memory. User device can further comprise a symbol modulator 3712, wherein transmitter 3708 transmits the modulated signal.

Figure 38:
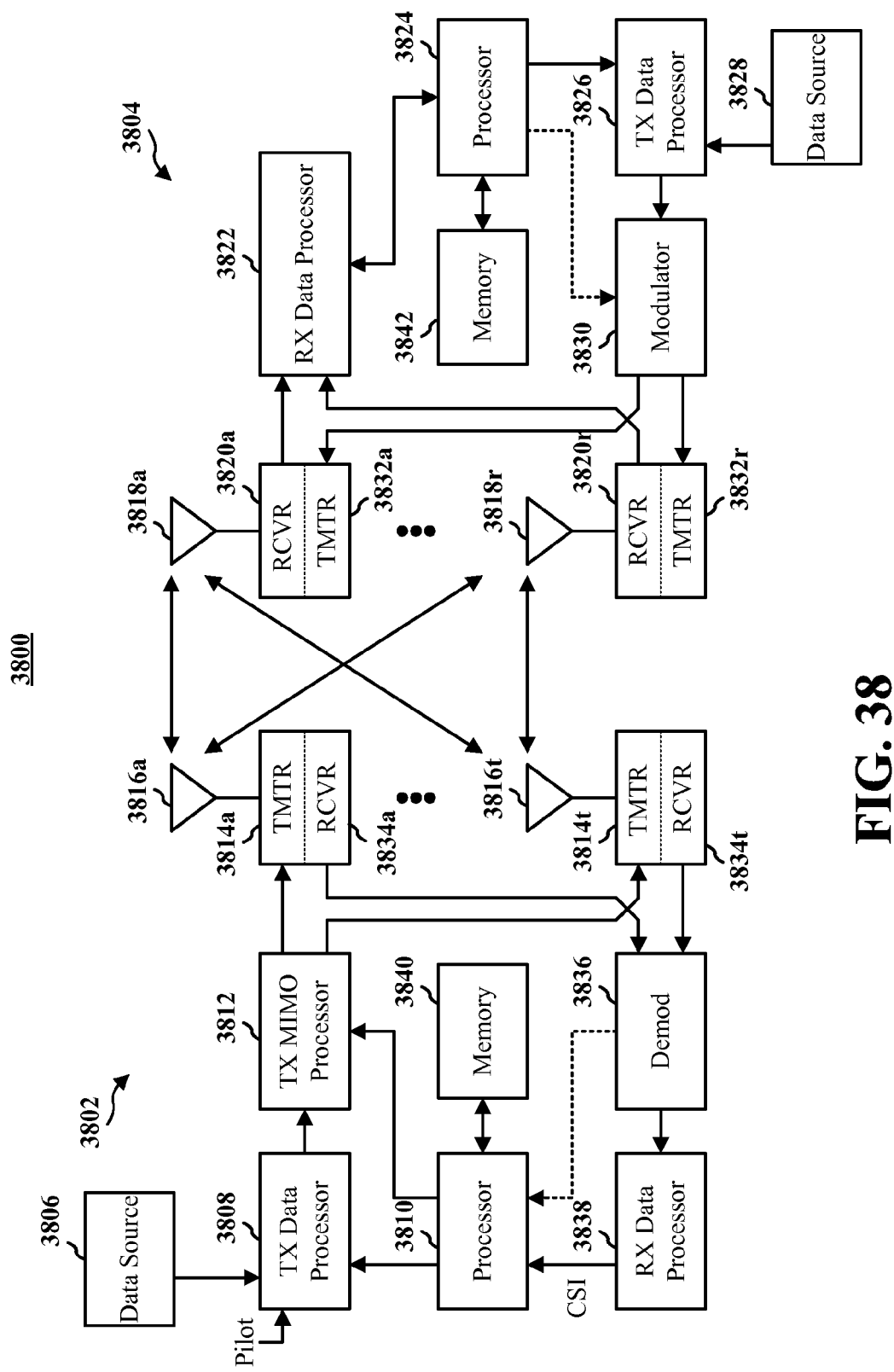
FIG. 38 illustrates an exemplary wireless communication system, according to various aspects.

FIG. 38 illustrates an example wireless communication system 3800. The wireless communication system 3800 depicts one base station 3802 and one mobile device 3804 for sake of brevity. However, it is to be appreciated that system 3800 can include more than one base station and/or more than one mobile device, wherein additional base stations and/or mobile devices can be substantially similar or different from example base station 3802 and mobile device 3804 described below. In addition, it is to be appreciated that base station 3802 and/or mobile device 3804 can employ the systems and/or methods described herein to facilitate wireless communication there between.

At base station 3802, traffic data for a number of data streams is provided from a data source 3806 to a transmit (TX) data processor 3808. According to an example, each data stream can be transmitted over a respective antenna. TX data processor 3808 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 3804 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 3810.

The modulation symbols for the data streams can be provided to a TX MIMO processor 3812, which can further process the modulation symbols (e.g., for OFDM). TX MIMO processor 3812 then provides NT modulation symbol streams to NT transmitters (TMTR) 3814a through 3814t. In various embodiments, TX MIMO processor 3812 applies beamforming weights to the symbols of the data streams and to the antenna from which the symbol is being transmitted.

Each transmitter 3814 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 3814a through 3814t are transmitted from NT antennas 3816a through 3816t, respectively.

At mobile device 3804, the transmitted modulated signals are received by NR antennas 3818a through 3818r and the received signal from each antenna 3818 is provided to a respective receiver (RCVR) 3820a through 3820r. Each receiver 3820 conditions (e.g., filters, amplifies, and downconverts) a respective signal, digitizes the conditioned signal to provide samples, and further processes the samples to provide a corresponding "received" symbol stream.

An RX data processor 3822 can receive and process the NR received symbol streams from NR receivers 3820 based on a particular receiver processing technique to provide NT "detected" symbol streams. RX data processor 3822 can demodulate, deinterleave, and decode each detected symbol stream to recover the traffic data for the data stream. The processing by RX data processor 3822 is complementary to that performed by TX MIMO processor 3812 and TX data processor 3808 at base station 3802.

A processor 3824 can periodically determine which precoding matrix to utilize as discussed above. Further, processor 3824 can formulate a reverse link message comprising a matrix index portion and a rank value portion.

The reverse link message can comprise various types of information regarding the communication link and/or the received data stream. The reverse link message can be processed by a TX data processor 3826, which also receives traffic data for a number of data streams from a data source 3828, modulated by a modulator 3830, conditioned by transmitters 3832a through 3832r, and transmitted back to base station 3802.

At base station 3802, the modulated signals from mobile device 3804 are received by antennas 3816, conditioned by receivers 3834a though 3834t, demodulated by a demodulator 3836, and processed by a RX data processor 3838 to extract the reverse link message transmitted by mobile device 3804. Further, processor 3810 can process the extracted message to determine which precoding matrix to use for determining the beamforming weights.

Processors 3810 and 3824 can direct (e.g., control, coordinate, manage, etc.) operation at base station 3802 and mobile device 3804, respectively. Respective processors 3810 and 3824 can be associated with memory 3840 and 3842 that store program codes and data. Processors 3810 and 3824 can also perform computations to derive frequency and impulse response estimates for the uplink and downlink, respectively. Software codes may be stored in memory unit and executed by processors 3810 and 3824.

It is to be understood that aspects described herein may be implemented by hardware, software, firmware or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the steps and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of described aspects and/or embodiments as defined by the appended claims. Accordingly, described aspects are intended to embrace all such alterations, modifications and variations that fall within scope of appended claims. Furthermore, although elements of described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method performed by a relay for routing data in a multihop communication network, comprising:
   communicating, via at least one processor, with a radio network controller through an intermediary base station on behalf of a plurality of mobile devices using a same interface protocol level as the interface protocol level used between the radio network controller and the intermediary base station; and
   configuring, by the relay, a first set of lower layer air interface protocol instances for a self-backhaul link with the intermediary base station based on a first radio link control and a second set of lower layer air interface protocol instances for a wireless access link with each of the plurality of mobile devices based on a second radio link control, wherein each of the first and second radio link controls is configured to at least manage user data traffic flows independently.

2. The method of claim 1, further comprising:
   receiving, from the intermediary base station, data for a first served mobile device and a second served mobile device, wherein the data is received as a single flow;
   de-multiplexing the data received as the single flow; and
   transmitting the data separately to the first served mobile device and the second served mobile device.

3. The method of claim 2, further comprising:
   receiving data from the first served mobile device and the second served mobile device;
   multiplexing the data to create an aggregated data flow; and
   transmitting the aggregated data flow to the intermediary base station.

4. A wireless communications apparatus, comprising:
   a memory that retains instructions related to:
   communicating on behalf of a plurality of mobile devices with a radio network controller through an intermediary base station using a same interface protocol level as the interface protocol level used between the radio network controller and the intermediary base station, and
   configuring a first set of lower layer air interface protocol instances for a self-backhaul link with the intermediary base station based on a first radio link control and a second set of lower layer air interface protocol instances for a wireless access link with each of the plurality of mobile devices based on a second radio link control, wherein each of the first and second radio link controls is configured to at least manage user data traffic flows independently; and
   a processor, coupled to the memory, configured to execute the instructions retained in the memory.

5. The wireless communications apparatus of claim 4, wherein the memory retains further instructions related to receiving data as a single flow for a first served flow and second served flow, de-multiplexing the data received as the single flow, and transmitting the data separately to the first served flow and the second served flow.

6. The wireless communications apparatus of claim 4, wherein the memory retains further instructions related to receiving data from at least two user flows, multiplexing the data to create an aggregated data flow, and transmitting the aggregated data flow to the intermediary base station.

7. A wireless communications apparatus, comprising:
   means for communicating with a radio network controller through an intermediary base station on behalf of a plurality of mobile devices using a same interface protocol level as the interface protocol level used between the radio network controller and the intermediary base station; and
   means for configuring a first set of lower layer air interface protocol instances for a self-backhaul link with the intermediary base station based on a first radio link control and a second set of lower layer air interface protocol instances for a wireless access link with each of the plurality of mobile devices based on a second radio link control, wherein each of the first and second radio link controls is configured to at least manage user data traffic flows independently.

8. The wireless communications apparatus of claim 7, further comprising:
   means for receiving, from the intermediary base station, data for a first served mobile device and a second served mobile device, wherein the data is received as a single flow;
   means for de-multiplexing the data received as the single flow; and
   means for transmitting the data separately to the first served mobile device and the second served mobile device.

9. The wireless communications apparatus of claim 7, further comprising:
   means for receiving data from the first served mobile device and the second served mobile device;
   means for multiplexing the data to create an aggregated data flow; and
   means for transmitting the aggregated data to the intermediary base station.

10. A computer program product, comprising:
a non-transitory computer readable storage medium comprising:
- a first set of codes for causing a computer to communicate on behalf of a plurality of mobile devices with a radio network controller through an intermediary base station using a same interface protocol level as the interface protocol level used between the radio network controller and the intermediary base station; and
- a second set of codes for causing the computer to configure a first set of lower layer air interface protocol instances for a self-backhaul link with the intermediary base station based on a first radio link control and a second set of lower layer air interface protocol instances for a wireless access link with each of the plurality of mobile devices based on a second radio link control, wherein each of the first and second radio link controls is configured to at least manage user data traffic flows independently.

11. The computer program product of claim 10, wherein the non-transitory computer readable storage medium further comprises:
- a third set of codes for causing the computer to receive data as a single flow for a first served flow and a second served flow;
- a fourth set of codes for causing the computer to de-multiplex the data received as the single flow; and
- a fifth set of codes for causing the computer to transmit the data separately to the first served flow and the second served flow.

12. The computer program product of claim 10, wherein the non-transitory computer readable storage medium further comprises:
- a third set of codes for causing the computer to receive data from at least two user flows;
- a fourth set of codes for causing the computer to multiplex the data to create an aggregated data flow; and
- a fifth set of codes for causing the computer to convey the aggregated data flow to the intermediary base station.

13. At least one processor of a relay for routing data in a multihop communication network, comprising:
- a first module that communicates with a radio network controller through an intermediary base station on behalf of a plurality of mobile devices using a same interface protocol level as the interface protocol level used between the radio network controller and the intermediary base station; and
- a second module that configures a first set of lower layer air interface protocol instances for a self-backhaul link between the relay and the intermediary base station based on a first radio link control and a second set of lower layer air interface protocol instances for a wireless access link with each of the plurality of mobile devices based on a second radio link control, wherein each of the first and second radio link controls is configured to at least manage user data traffic flows independently.

* * * * *